(12) United States Patent
Sampath et al.

(10) Patent No.: US 11,920,796 B2
(45) Date of Patent: Mar. 5, 2024

(54) COMBUSTOR FOR A GAS TURBINE ENGINE

(71) Applicant: General Electric Company, Schenectady, NY (US)

(72) Inventors: Karthikeyan Sampath, Bangalore (IN); Pradeep Naik, Bangalore (IN); Veeraraju Vanapalli, Bangalore (IN); Perumallu Vukanti, Bangalore (IN); Shai Birmaher, Cincinnati, OH (US); Daniel J. Kirtley, Blue Ash, OH (US); Deepak Ghiya, Bangalore (IN); Rimple Rakeshkumar Rangrej, Bangalore (IN); Saket Singh, Bangalore (IN); Ravindra Shankar Ganiger, Bangalore (IN); Hiranya Kumar Nath, Bangalore (IN); Michael Anthony Benjamin, Cincinnati, OH (US); Rajendra Mahadeorao Wankhade, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 8 days.

(21) Appl. No.: 17/340,856

(22) Filed: Jun. 7, 2021

(65) Prior Publication Data

US 2022/0390115 A1 Dec. 8, 2022

(51) Int. Cl.
*F23R 3/60* (2006.01)
*F23R 3/06* (2006.01)
*B33Y 80/00* (2015.01)

(52) U.S. Cl.
CPC .............. *F23R 3/60* (2013.01); *F23R 3/06* (2013.01); *B33Y 80/00* (2014.12);
(Continued)

(58) Field of Classification Search
CPC .... F23R 3/60; F23R 3/06; F23R 2900/00012; F23R 2900/00017; F23R 2900/00018
See application file for complete search history.

(56) References Cited

U.S. PATENT DOCUMENTS 3,545,202 A 12/1970 Batt et al.
3,593,518 A * 7/1971 Gerrard ..................... F23R 3/06
60/39.23
(Continued)

FOREIGN PATENT DOCUMENTS

EP 2463582 A2 6/2012
EP 3447381 A1 2/2017
(Continued)

*Primary Examiner* — Arun Goyal
*Assistant Examiner* — Henry Ng
(74) *Attorney, Agent, or Firm* — Venable LLP; Elizabeth C. G. Gitlin; Michele V. Frank

(57) ABSTRACT

A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor including: a forward liner segment; an aft liner segment disposed downstream from the forward liner segment relative to a direction of flow through the combustor, the forward and aft liner segments at least partially defining a combustion chamber; and an intermediate member disposed at least partially between the forward and aft liner segments and extending in the circumferential direction.

17 Claims, 25 Drawing Sheets

(52) U.S. Cl.
CPC .............. *F23R 2900/00012* (2013.01); *F23R 2900/00017* (2013.01); *F23R 2900/00018* (2013.01)

(56) References Cited

U.S. PATENT DOCUMENTS

| | | | |
|---|---|---|---|
| 3,974,647 A | 8/1976 | Lewis et al. | |
| 3,978,662 A | 9/1976 | DuBell et al. | |
| 4,485,630 A | 12/1984 | Kenworthy | |
| 4,622,821 A | 11/1986 | Madden | |
| 4,896,510 A | 1/1990 | Foltz | |
| 4,901,522 A | 2/1990 | Commaret et al. | |
| 4,916,906 A | 4/1990 | Vogt | |
| 5,235,805 A * | 8/1993 | Barbier | F23R 3/26 60/39.23 |
| 6,553,767 B2 | 4/2003 | Farmer et al. | |
| 7,032,386 B2 | 4/2006 | Mandai et al. | |
| 7,059,133 B2 | 6/2006 | Gerendas | |
| 7,246,993 B2 | 7/2007 | Bolms et al. | |
| 7,726,131 B2 | 6/2010 | Sze et al. | |
| 7,802,431 B2 | 9/2010 | Parker | |
| 8,109,099 B2 | 2/2012 | Tu et al. | |
| 8,276,391 B2 | 10/2012 | Berry et al. | |
| 8,307,656 B2 | 11/2012 | Tuthill | |
| 8,307,657 B2 | 11/2012 | Chila | |
| 9,010,121 B2 | 4/2015 | Taylor et al. | |
| 9,182,122 B2 | 11/2015 | Matthews et al. | |
| 9,310,079 B2 | 4/2016 | Uskert | |
| 9,718,735 B2 | 8/2017 | Delvaux et al. | |
| 9,765,968 B2 | 9/2017 | Gage et al. | |
| 10,094,564 B2 | 10/2018 | Lebel | |
| 10,107,128 B2 | 10/2018 | Romanov et al. | |
| 10,337,737 B2 | 7/2019 | Holdcraft et al. | |
| 10,520,192 B2 | 12/2019 | Shim et al. | |
| 10,533,746 B2 | 1/2020 | Rimmer et al. | |
| 10,577,944 B2 | 3/2020 | Clark et al. | |
| 10,634,350 B2 | 4/2020 | Harding et al. | |
| 10,684,017 B2 | 6/2020 | Moura et al. | |
| 10,718,521 B2 | 7/2020 | Quach et al. | |
| 10,731,858 B2 | 8/2020 | Bouldin et al. | |
| 10,801,726 B2 | 10/2020 | Stevens et al. | |
| 10,801,727 B2 | 10/2020 | DeBruhl et al. | |
| 10,830,143 B2 | 11/2020 | Choi | |
| 11,054,136 B2 * | 7/2021 | Hu | F23R 3/002 |
| 2007/0227149 A1 * | 10/2007 | Biebel | F23R 3/06 60/752 |
| 2008/0134682 A1 * | 6/2008 | Garry | F23R 3/06 60/752 |
| 2008/0271457 A1 | 11/2008 | McMasters et al. | |
| 2010/0192587 A1 * | 8/2010 | Hessler | F23R 3/16 60/752 |
| 2010/0272953 A1 | 10/2010 | Yankowich et al. | |
| 2013/0255265 A1 * | 10/2013 | Rudrapatna | F23R 3/16 29/889.22 |
| 2013/0269359 A1 | 10/2013 | Hughes | |
| 2014/0033723 A1 * | 2/2014 | Doerr | F23R 3/045 60/737 |
| 2015/0135719 A1 | 5/2015 | Gerendas | |
| 2016/0131364 A1 | 5/2016 | Burd | |
| 2016/0178199 A1 | 6/2016 | Burd | |
| 2016/0209033 A1 | 7/2016 | Burd | |
| 2016/0327271 A1 * | 11/2016 | Sandoval | F23R 3/002 |
| 2018/0039254 A1 * | 2/2018 | North | B33Y 50/00 |
| 2018/0306440 A1 | 10/2018 | Spence et al. | |
| 2019/0024894 A1 | 1/2019 | Mongillo et al. | |
| 2019/0063320 A1 | 2/2019 | Choi | |
| 2019/0101289 A1 | 4/2019 | Mongillo, Jr. et al. | |
| 2019/0170352 A1 | 6/2019 | Wilson et al. | |
| 2019/0226680 A1 * | 7/2019 | North | F23R 3/34 |
| 2020/0024993 A1 * | 1/2020 | Kumar | F23R 3/50 |
| 2020/0355369 A1 * | 11/2020 | Hu | F23R 3/007 |
| 2022/0316707 A1 * | 10/2022 | D'Alessandro | F23R 3/06 |

FOREIGN PATENT DOCUMENTS

| | | |
|---|---|---|
| EP | 3412972 A1 | 12/2018 |
| GB | 2569449 A | 6/2019 |
| KR | 101759707 B1 | 7/2017 |
| WO | WO2008137201 A1 | 11/2018 |

\* cited by examiner

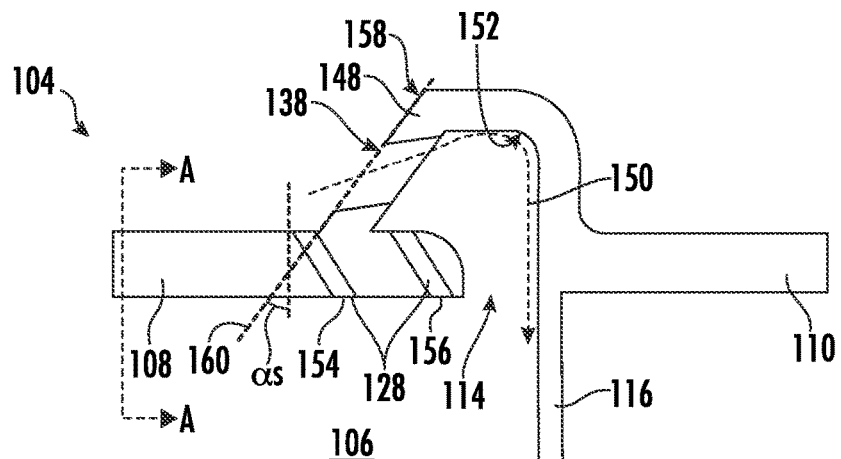
FIG. 11
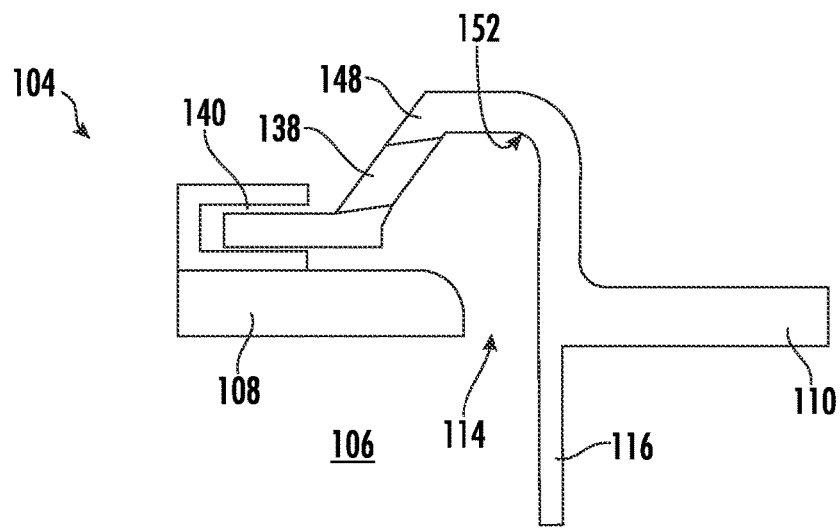
FIG. 12
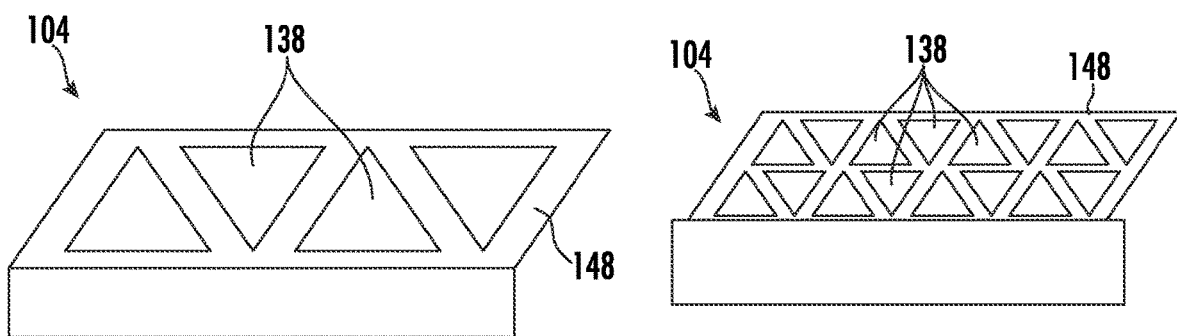
FIG. 13
FIG. 14

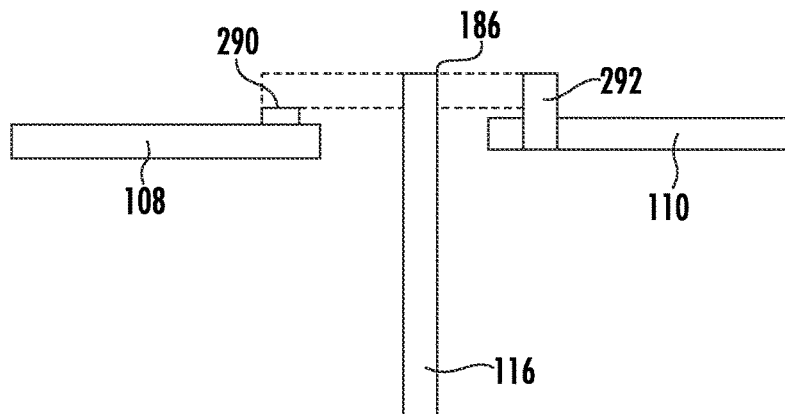
FIG. 49
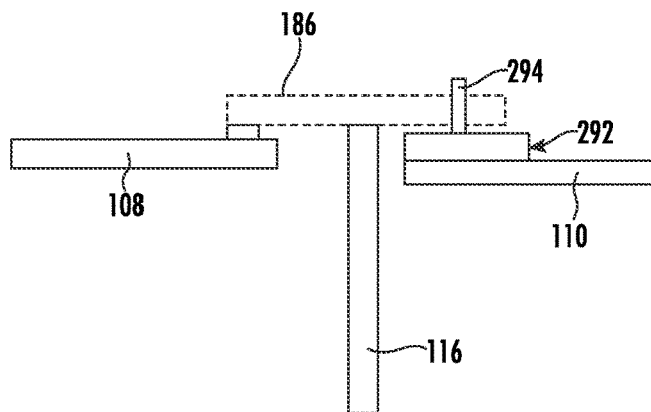
FIG. 50
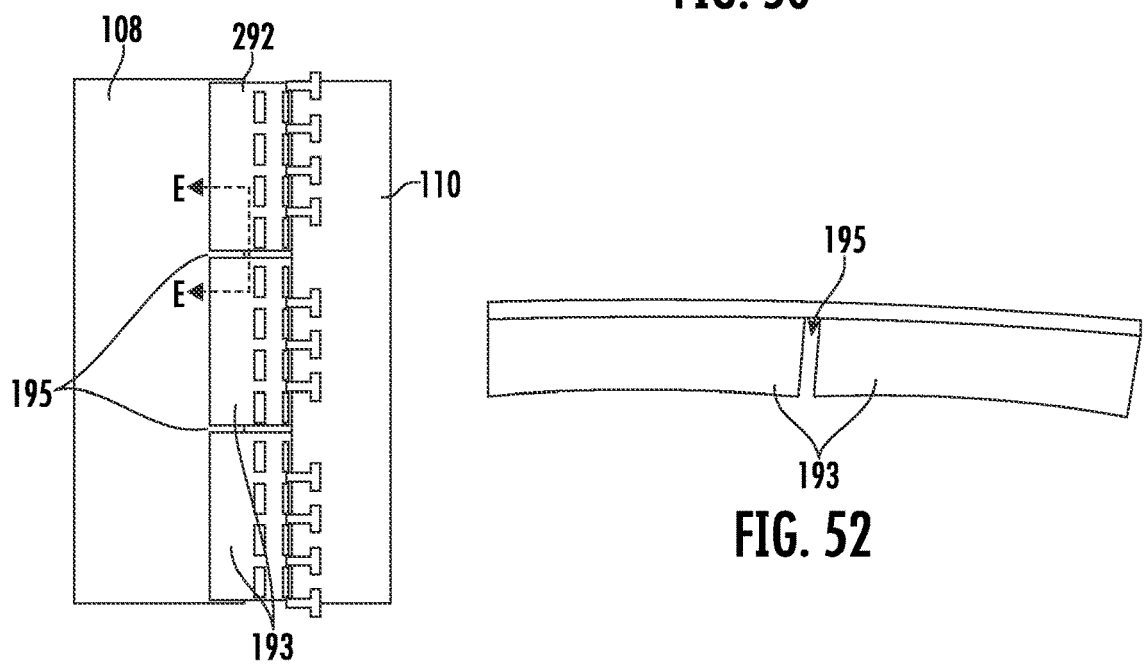
FIG. 51
FIG. 52

COMBUSTOR FOR A GAS TURBINE ENGINE

FIELD

The present disclosure generally pertains to gas turbine engines, and, more specifically, to a combustor for a gas turbine engine.

BACKGROUND

A gas turbine engine generally includes a compressor section, a combustion section, and a turbine section. More specifically, the compressor section progressively increases the pressure of air entering the gas turbine engine and supplies this compressed air to the combustion section. The compressed air and fuel are mixed and burned within the combustion section to generate high-pressure and high-temperature combustion gases. The combustion gases flow through the turbine section before exiting the engine. In this respect, the turbine section converts energy from the combustion gases into rotational mechanical energy. This mechanical energy is, in turn, used to rotate one or more shafts, which drive the compressor section and/or a fan assembly of the gas turbine engine.

In general, the combustor section includes an annular combustor. Each combustor, in turn, includes an inner liner, an outer liner, and a plurality of fuel nozzles. Specifically, the inner and outer liners define a combustion chamber therebetween. As such, the fuel nozzle(s) supply the fuel and air mixture to the combustion chamber for combustion therein to generate combustion gasses.

In some configurations, the inner and/or outer liners define a plurality of dilution holes positioned downstream of the fuel nozzle(s). The dilution holes, in turn, supply additional air to the combustion chamber to mix with the combustion products coming from the primary zone of the combustion chamber and complete the combustion process rapidly, thereby reducing $NO_x$ (oxides of nitrogen) emissions. However, such dilution holes may not provide a desired amount mixing with the combustion gasses.

Accordingly, an improved combustor for a gas turbine engine would be welcomed in the technology.

BRIEF DESCRIPTION

Aspects and advantages of the disclosure will be set forth in part in the following description, or may be obvious from the description, or may be learned through practice of the disclosure.

In one aspect, the present subject matter is directed to a combustor for a gas turbine engine. The gas turbine engine, in turn, defines a longitudinal centerline extending in a longitudinal direction, a radial direction extending orthogonally outward from the longitudinal centerline, and a circumferential direction extending concentrically around the longitudinal centerline, the combustor comprising: a forward liner segment; an aft liner segment disposed downstream from the forward liner segment relative to a direction of flow through the combustor, the forward and aft liner segments at least partially defining a combustion chamber; and an intermediate member disposed at least partially between the forward and aft liner segments and extending in the circumferential direction.

In another aspect, the present subject matter is directed to a gas turbine engine defining a longitudinal centerline extending in a longitudinal direction, a radial direction extending orthogonally outward from the longitudinal centerline, and a circumferential direction extending concentrically around the longitudinal centerline, the combustor having a forward liner segment and an aft liner segment, the forward and aft liner segments at least partially defining a combustion chamber, the intermediate member comprising: an annular body configured to be disposed at least partially within a gap formed between the forward and aft liner segments.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the preferred embodiments, including the best mode thereof, directed to one of ordinary skill in the art, is set forth in the specification, which makes reference to the appended figures, in which:

FIG. 11 is a cross-sectional view of an outer liner of a combustion section of a gas turbine engine in accordance with an exemplary embodiment of the present disclosure;

FIG. 12 is a cross-sectional view of an outer liner of a combustion section of a gas turbine engine in accordance with an exemplary embodiment of the present disclosure;

FIG. 13 is a view of a scooped interface of an outer liner as seen in a longitudinal direction along Line A-A in FIG. 11 in accordance with an exemplary embodiment of the present disclosure;

FIG. 14 is a view of a scooped interface of an outer liner as seen in a longitudinal direction along Line A-A in FIG. 11 in accordance with an exemplary embodiment of the present disclosure;

FIG. 49 a cross-sectional view of an outer liner and intermediate member of a combustion section of a gas turbine engine in accordance with an exemplary embodiment of the present disclosure;

FIG. 50 a cross-sectional view of an outer liner and intermediate member of a combustion section of a gas turbine engine in accordance with an exemplary embodiment of the present disclosure;

FIG. 51 is a cross-sectional view of an outer liner and a fence of a combustion section of a gas turbine engine in accordance with an exemplary embodiment of the present disclosure;

FIG. 52 is a cross-sectional view of an outer liner and a fence of a combustion section of a gas turbine engine in accordance with an exemplary embodiment of the present disclosure;

Figure 1:
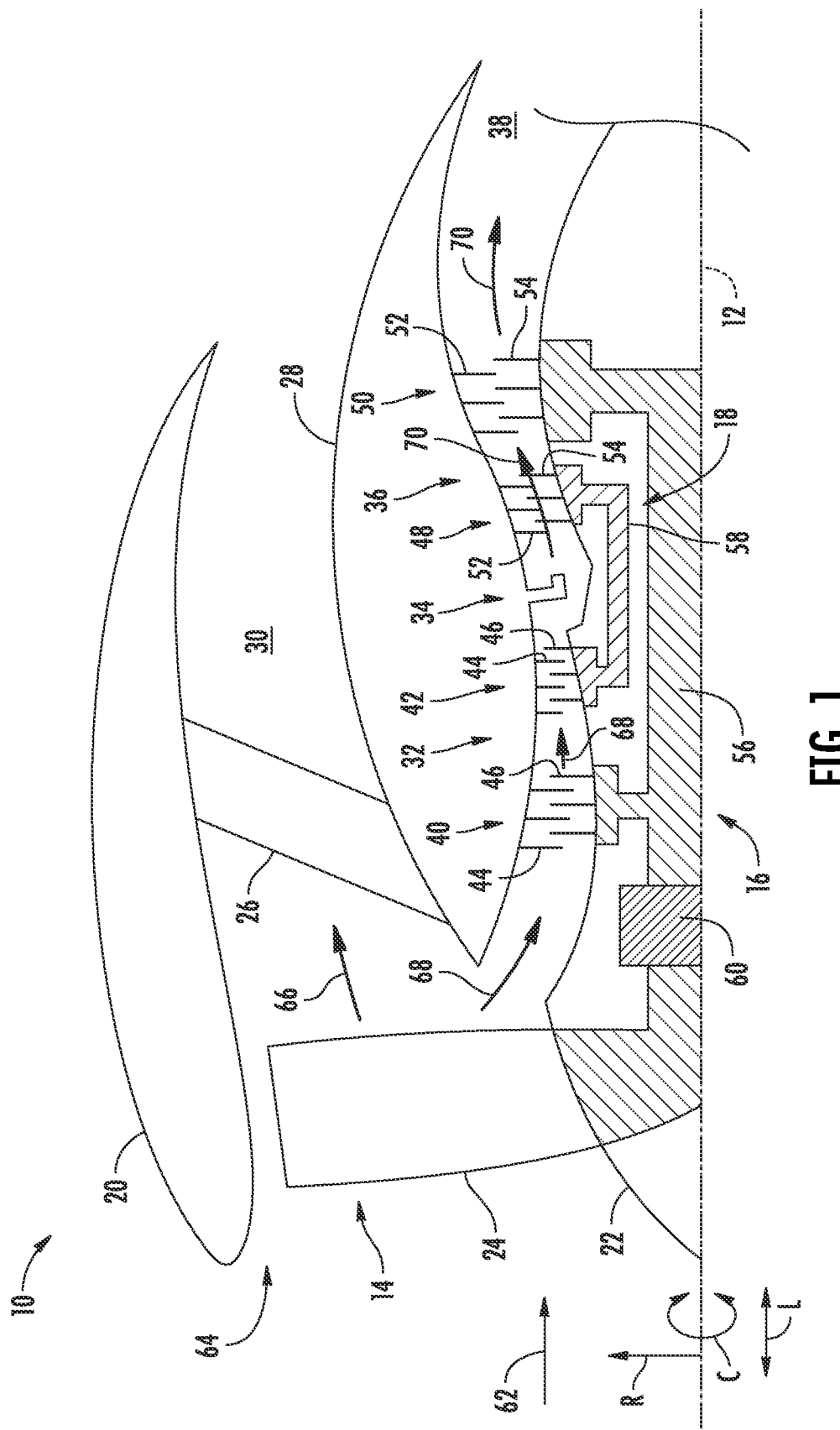
FIG. 1 is a schematic cross-sectional view of a gas turbine engine in accordance with an exemplary embodiment of the present disclosure.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a combustor for a gas turbine engine. As will be described below, the combustor includes a forward liner segment and an aft liner segment positioned downstream of the forward liner segment. In this respect, the forward and aft liner segments at least partially define a combustion chamber in which a fuel and air mixture is burned to generate combustion gases.

In an embodiment, the combustor includes one or more dilution slots positioned between the forward and aft liners along a longitudinal centerline of the engine. In an embodiment, the dilution slots can be spaced apart from each other along a circumferential direction of the engine. In one or more embodiments, the dilution slots can be longer (e.g., at least three times longer) in the circumferential direction than in the longitudinal direction. As such, unlike conventional combustors, which provide discrete jets of the dilution air to the combustion chamber, the dilution slots disclosed herein provide an annular ring of dilution air to the combustion chamber. This annular ring of dilution air, in turn, reduces the formation of hot spots within the combustion chamber, thereby allowing a greater reduction in $NO_x$ emissions.

Additionally, in some embodiments, the combustor includes a fence positioned adjacent to the dilution slots. More specifically, the fence can extend along a radial direction into the combustion chamber. As such, the fence directs the dilution air entering the combustion chamber via the dilution slots toward the center of the combustion chamber. Furthermore, the fence increases the turbulence within the combustion chamber. In this respect, the fence provides quicker and more uniform mixing of the dilution air and the combustor gases, thereby further reducing $NO_x$ emissions.

Moreover, in certain exemplary embodiments, an intermediate member can be disposed at least partially between the forward and aft liner segments. The intermediate member can include a discrete element separate from the forward or aft liner segments. The intermediate member can affect a flow path of cooling medium into the dilution slot(s) between the forward and aft liner segments. For instance, the intermediate member may include the fence configured to adjust the flow path of the cooling medium to penetrate deeper into the combustion chamber. Use of an intermediate member according to one or more embodiments described herein can permit advanced control of the dilution air flow path(s). Advanced control of the dilution air flow path(s) can occur, for example, as a result of design features (e.g., internal passageways, shaped surfaces, and the like) which might not otherwise be possible with designs utilizing these features integrally built into one or both of the forward or aft liner segments.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to a longitudinal centerline 12 of the engine 10, the radial direction R extends orthogonally outward from the longitudinal centerline 12, and the circumferential direction C extends generally concentrically around the longitudinal centerline 12.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22.

In this respect, the fan blades 24 are spaced apart from each other along the circumferential direction C and extend outward from the fan rotor 22 along the radial direction R. Moreover, the LP and HP spools 16, 18 are positioned downstream from the fan 14 along the longitudinal centerline 12 (i.e., in the longitudinal direction L). As shown, the LP spool 16 is rotatably coupled to the fan rotor 22, thereby permitting the LP spool 16 to rotate the fan 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the longitudinal centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the longitudinal centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air 62 enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
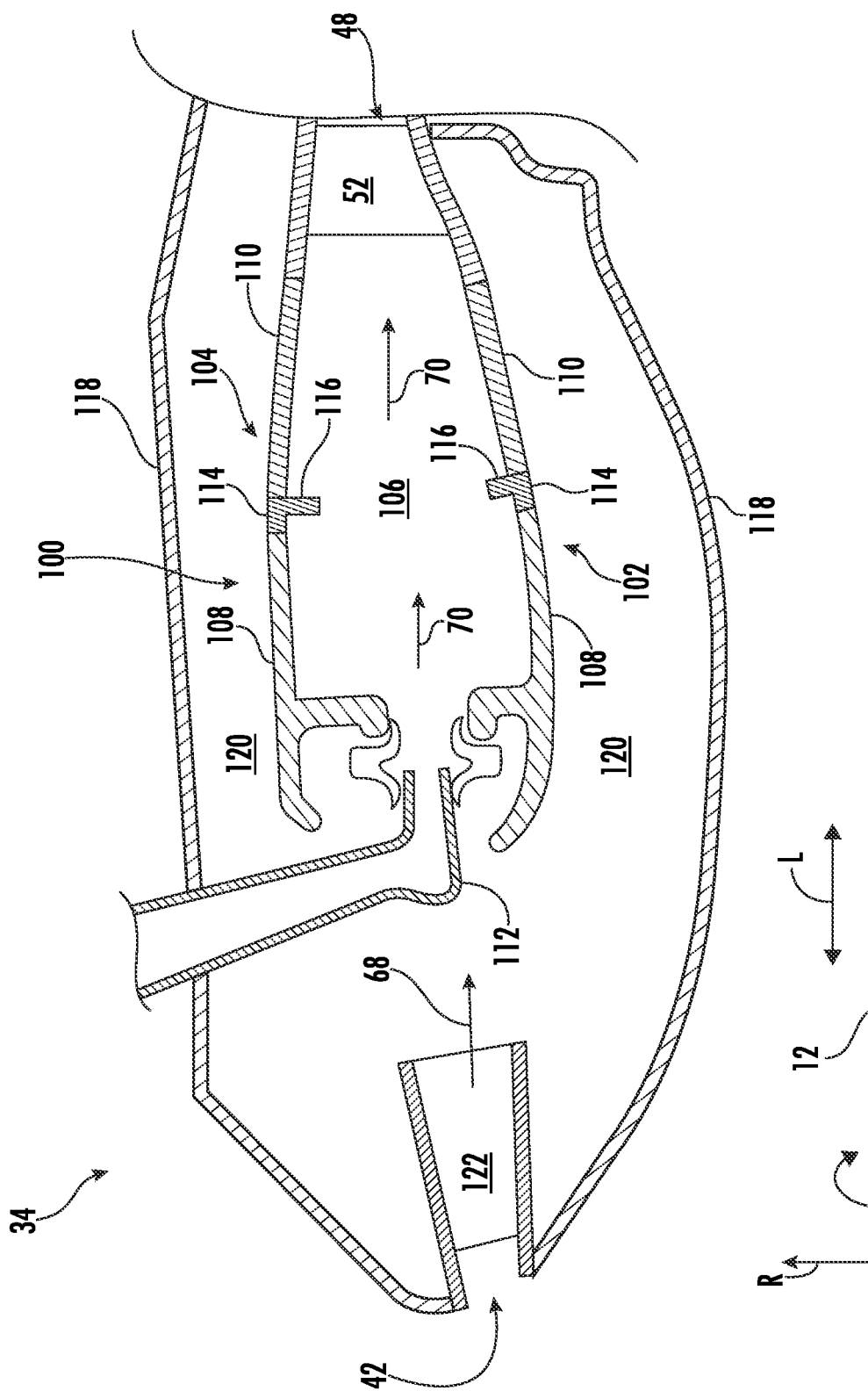
FIG. 2 is a cross-sectional side view of a combustion section of a gas turbine engine in accordance with an exemplary embodiment of the present disclosure.

FIG. 2 is a cross-sectional view of one embodiment of the combustion section 34 of the gas turbine engine 10. As shown, the combustion section 34 includes an annular combustor 100. The combustor 100, in turn, includes an inner liner 102 and an outer liner 104 positioned outward from the inner liner 102 along the radial direction R. In this respect, the inner and outer liners 102, 104 define a combustion chamber 106 therebetween. Each liner 102, 104, in turn, includes a forward liner segment 108 and an aft liner segment 110 positioned downstream of the forward liner segment 108 relative to the direction of flow of the combustion gases 70 through the combustor 100. In certain instances, the forward and aft liner segments 108 and 110 can form a unitary outer liner 104. That is, the forward and aft liner segments 108 and 110 can each be parts of a single, discrete element. Moreover, the combustor 100 includes one or more fuel nozzles 112, which supply a mixture of fuel and air 68 to the combustion chamber 106. The fuel and air mixture burns within the combustion chamber 106 to generate the combustion gases 70. Although FIG. 2 illustrates a single annular combustor 100, the combustion section 34 may, in other embodiments, include a plurality of combustors 100.

In several embodiments, the combustor 100 includes one or more dilution slots 114 and/or one or more fences 116 positioned adjacent to the dilution slot(s) 114. As will be described below, the dilution slot(s) 114 allows dilution air to enter the combustion chamber 106 during operation, which reduces the $NO_x$ emissions of the engine 10. Furthermore, as will be described below, the fence(s) 116 directs the dilution air toward the center of the combustion chamber 106 and increases the turbulence within the combustion chamber 106, thereby further reducing the $NO_x$ emissions of the engine 10. As shown, in the illustrated embodiment, the combustor 100 includes one dilution slot 114 positioned between the forward and aft liner segments 108, 110 of the inner liner 102 and another dilution slot 114 positioned between the forward and aft liner segments 108, 110 of the outer liner 104. Moreover, in the illustrated embodiment, the combustor 100 includes one fence 116 extending outward in the radial direction R from the inner liner 102 and another fence 116 extending inward in the radial direction R from the outer liner 104. The fence 116 can define an annular body which can extend continuously in the circumferential direction. In alternative embodiments, the combustor 100 may include any other suitable number of dilution slots 114 and/or fences 116.

Additionally, in several embodiments, the combustion section 34 includes a compressor discharge casing 118. In such embodiments, the compressor discharge casing 118 at least partially surrounds or otherwise encloses the combustor(s) 100 in the circumferential direction C. In this respect, a compressor discharge plenum 120 is defined between the compressor discharge casing 118 and the liners 102, 104. The compressor discharge plenum 120 is, in turn, configured to supply compressed air to the combustor(s) 100. Specifically, as shown, the air 68 exiting the HP compressor 42 is directed into the compressor discharge plenum 120 by an inlet guide vane 122. The air 68 within the compressor discharge plenum 120 is then supplied to the combustion chamber(s) 106 of the combustor(s) 100 by the fuel nozzle(s) 112 for use in combusting the fuel.

Figure 3:
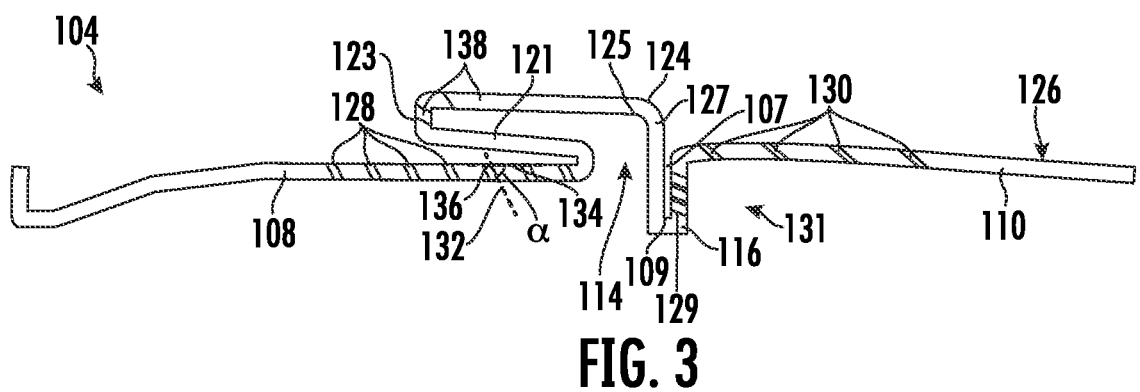
FIG. 3 is a cross-sectional view of an outer liner of a combustion section of a gas turbine engine in accordance with an exemplary embodiment of the present disclosure.

FIG. 3 illustrates a cross-sectional view of the outer liner 104 in accordance with an exemplary embodiment of the present disclosure. It should be understood that while reference made hereinafter is with regards to the outer liner 104, in other embodiments, one or more of the features described herein can be incorporated into the inner liner 102 or both the inner liner 102 and the outer liner 104.

In an embodiment, the outer liner 104 can define a looped feature 124 disposed between the forward liner segment 108 and the aft liner segment 110. The looped feature 124 can include a portion of the outer liner 104 which is bent to form an airflow feature configured to affect airflow in the combustion chamber 106. By way of example, the looped feature 124 may include a plurality of portions with bends therebetween. For instance, as illustrated in FIG. 3, the looped feature 124 can include a first portion 121, a second portion 123, a third portion 125, and a fourth portion 127. In certain instances, the first, second, third, and fourth portions 121, 123, 125, and 127 can be integral with one another and separated by bends in the outer liner 104. In other instances, at least one of the first, second, third, and fourth portions 121, 123, 125, and 127 can include a discrete component attached to the outer liner 104.

The looped feature 124 can extend in the longitudinal direction. The looped feature 124 can be formed from portions 121, 123, and 125. The first portion 121 can extend generally along the longitudinal direction substantially parallel to the third portion 125 (e.g., within ±30 degrees of parallel, such as within ±15 degrees of parallel). In an embodiment, the first and third portions 121 and 125 can be angularly offset from one another by a relative angle. The first and third portions 121 and 125 can be joined together by the second portion 123. As illustrated in FIG. 3, the second portion 123 can be disposed upstream (in the longitudinal direction) of the dilution slot 114. In another embodiment, the second portion 123 can be disposed downstream of the dilution slot 114. In this regard, the looped feature 124 can extend longitudinally with respect to the dilution slot 114. In other embodiments, the looped feature 124 may additionally or alternatively extend in the radial direction. In such a manner, the looped feature 124 can extend away from the combustion chamber 106 so as to capture and redirect airflow passing by the combustion chamber 106 into the combustion chamber 106.

The looped feature 124 depicted in FIG. 3 is exemplary only. The looped feature 124 can include fewer or greater number of portions. Moreover, in certain instances, at least one pair of adjacent portions (e.g., the second and third portions 123 and 125) can be joined together by a connection interface, e.g., a weld, between the forward liner segment 108 and the aft liner segment 110. The looped feature 124 may depart from the shape of the neighboring outer liner 104. For example, the looped feature 124 may extend from neighboring portions of the outer liner 104 in the radial direction, the longitudinal direction, or both the radial and longitudinal directions.

At least a portion of the looped feature 124 can extend in a direction generally away from the outer liner 104 in a direction radially outward from the longitudinal centerline 12 of the engine 10. The looped feature 124 can be disposed at, or adjacent to, the dilution slots 114. In a particular embodiment, a straight line extending from the longitudinal centerline 12 in the radial direction can intersect both the dilution slots 114 and the looped feature 124.

In the illustrated embodiment, the looped feature 124 is integral with the forward liner segment 108 and the aft liner segment 110. That is, the looped feature 124, forward liner segment 108, and aft liner segment 110 can be formed from a single piece. The looped feature 124 can be shaped into the outer liner 104, for example, by bending a portion of the liner material at one or more locations, such as at two or more locations, such as at three or more locations, such as at four or more locations, such as at five or more locations, such as at six or more locations, such as at seven or more locations, such as at eight or more locations. In certain instances, the looped feature 124 may extend continuously around the combustor 100. In a particular embodiment, the looped feature 124 can define a constant, or generally constant, cross-sectional shape or size at all circumferential locations of the combustor 100. In another embodiment, the looped feature 124 may extend continuously around the combustor 100 while having a variable cross-sectional shape or size. In other instances, the looped feature 124 may be discontinuous around the combustor 100. That is, the looped feature 124 may include looped feature segments which are spaced apart from one another in the circumferential direction. In this regard, the looped feature 124 may provide airflow benefits only at specific locations along the combustor 100.

The looped feature 124 can provide several advantageous performance and emissions benefits, including increasing aerodynamic performance of the engine 10, reducing $NO_X$ emissions, and increasing durability and operational lifespan of the outer liner 104. In an embodiment, the looped feature 124 can define one or more windows 138 extending through the looped feature 124. In the illustrated embodiment, the looped feature 124 includes two windows 138, a front window and a radially outer window. In other embodiments, the looped feature 124 can include at least three windows as viewed in cross section, such as at least four windows, such as at least five windows. The relative dimensions of the windows 138 can vary from window to window. For instance, the front window can have a smaller aerial size than the radially outer window. Alternatively, the front window can have a larger aerial size than the radially outer window. Moreover, in certain embodiments, at least one of the front and radially outer windows can include a plurality of windows, e.g., arranged in one or more rows around the circumference of the combustor 100.

Sizing of the windows 138 relative to the dilution slot 114 can vary. For instance, the dilution slot 114 can define an area, $A_{DS}$, as measured in the circumferential and longitudinal directions. The windows 138 can define a total area, $A_W$, as measured in the circumferential, longitudinal, and radial directions. In an embodiment, $A_W$ can be greater than $A_{DS}$. For example, $A_W$ can be within a range of 2 $A_{DS}$ and 20 $A_{DS}$, such as in a range of 4 $A_{DS}$ and 15 $A_{DS}$, such as in a range of 6 $A_{DS}$ and 10 $A_{DS}$. In another embodiment, $A_W$ can be less than $A_{DS}$. In this regard, $A_W$ can meter flow of cooling medium through the dilution slot 114. In certain instances, the number of windows 138 can vary relative to the number of fuel nozzles 112 in the engine 10. In an embodiment, a ratio of windows 138 to fuel nozzles 112 [windows:fuel nozzles] can be in a range of 1:5 and 2:1.

In an embodiment, the fence 116 can be part of the looped feature 124. The fence 116 can extend radially inward toward the center (core) of the combustion chamber 106. In an embodiment, the fence 116 can be disposed downstream of at least one of, such as all of, the windows 138. Cooling medium entering the looped feature 124 through the windows 138 can be guided by the fence 116 to penetrate deeper into the combustion chamber 106. As used herein, "cooling medium" can include fluid, such as gas (e.g., air). Cooling medium can include ambient air passing through the gas turbine engine 10. Cooling medium can define a temperature generally less than a working temperature of the combustion chamber 106. In such a manner, cooling medium can cool the combustion chamber 106. Cooling of the combustion chamber 106, particularly at areas close to the outer liner 104, can increase engine performance and efficiency. Additionally, cooling of the combustion chamber 106 can reduce $NO_X$ emissions.

In an embodiment, the fence 116 of the looped feature 124 can define one or more internal cooling holes 129 which are configured to discharge cooling medium to a location 131 behind the fence 116 to reduce $NO_X$ formation at the location 131. In the illustrated embodiment, the fence 116 includes a bent segment of the looped feature 124 that defines a trough 107. The cooling holes 129 of the fence 116 can be in fluid communication with the trough 107 such that air entering the trough 107 passes through the cooling holes 129. In an embodiment, at least some of the cooling holes 129 can be disposed along a longitudinal face of the trough 107 (such as illustrated in FIG. 3). In another embodiment, at least some of the cooling holes 129 can be disposed along a bottom 109 of the trough 107 (see, e.g., FIG. 21).

The cooling holes 129 can be arranged in one or more rows which extend continuously or discontinuously around the circumference of the combustor 100. In certain instances, the cooling holes 129 can be angled relative to the longitudinal centerline 12 of the of the engine 10 (FIG. 1). For instance, the cooling holes 129 can be canted at a relative angle with respect to the longitudinal centerline 12 by at least 1°, such as at least 10°, such as at least 15°, such as at least 20°. In such a manner, the flow path of the cooling medium can be controlled and directed to a desired location.

In an embodiment, the outer liner 104 can further include one or more cooling holes extending through the outer liner 104 from an outer surface 126 of the outer liner 104 spaced apart from the looped feature 124. The cooling holes can include, for example, a first group of cooling holes 128 disposed upstream of the looped feature 124 and a second group of cooling holes 130 disposed downstream of the looped feature 124. In an embodiment, at least one of the first or second groups of cooling holes 128 or 130 can include at least one row of cooling holes, such as at least two rows of cooling holes, such as at least three rows of cooling holes, such as at least four rows of cooling holes, such as at least five rows of cooling holes, such as at least six rows of cooling holes, such as at least seven rows of cooling holes. In the illustrated embodiment, the first group of cooling holes 128 includes seven rows of cooling holes and the second group of cooling holes 130 includes four rows of cooling holes. The number of cooling holes of the first and second groups of cooling holes 128 and 130 can be the same as one another or different from one another. In certain instances, the rows of cooling holes in the first or second group of cooling holes 128 or 130 can be staggered.

In certain instances, the cooling holes can be canted relative to the outer surface 126 of the outer liner 104. For example, as shown in FIG. 3, at least one of the cooling holes of the first or second groups of cooling holes 128 or 130 can have a centerline 132 that is angularly offset by an angle, α, from a plane 134 oriented tangential to the outer surface 126 of the outer liner 104 at the entrance 136 of the cooling hole. By way of non-limiting example, a can be at least 1°, such as at least 5°, such as at least 15°, such as at least 30°, such as at least 45°. In certain instances, the offset angles of the cooling holes can vary, i.e., at least two cooling holes have different angular offsets as compared to one another. By way of example, the first group of cooling holes 128 may define a first angular offset that is different than an angular offset of the second group of cooling holes 130. In another embodiment, at least two of the cooling holes within the first group of cooling holes 128 can have different angular offsets as compared to one another. In a further embodiment, at least two of the cooling holes within the second group of cooling holes 130 can have different angular offsets as compared to one another. The cooling holes can introduce cooling medium through the outer liner 104, reducing the likelihood of overheating.

Figure 4:
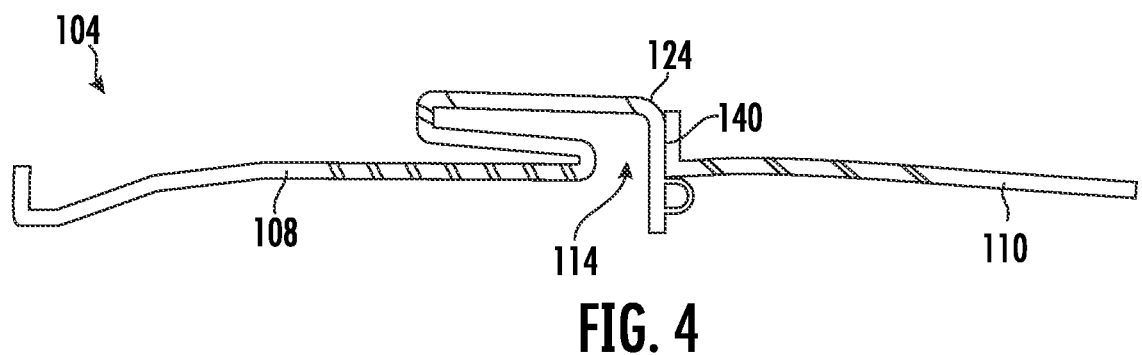
FIG. 4 is a cross-sectional view of an outer liner of a combustion section of a gas turbine engine in accordance with an exemplary embodiment of the present disclosure.

FIG. 4 illustrates another embodiment of the outer liner 104 including a multi-part, e.g., two-part, construction. The outer liner 104 includes a disconnected forward liner segment 108 and aft liner segment 110 defining the dilution slot 114 therebetween. Unlike the embodiment illustrated in FIG. 3, the forward and aft liner segments 108 and 110 are joined together at, or adjacent to, the looped feature 124. More particularly, in the illustrated embodiment, the looped feature 124 is formed from the forward liner segment 108. The aft liner segment 110 can be coupled to the looped feature 124 at a downstream location. In another embodiment, the looped feature 124 can be part of the aft liner segment 110 and the forward liner segment 108 can be coupled to the looped feature 124, e.g., upstream of the looped feature 124.

In the illustrated embodiment, the aft liner segment 110 is coupled to the looped feature 124 at an interface 140. The aft liner segment 110 can be coupled to the looped feature 124 at the interface 140, for example, using a brazing technique, welding, a fastener, or the like. Looped features 124 with multi-part construction may facilitate easier construction, assembly, or both.

Figure 5:
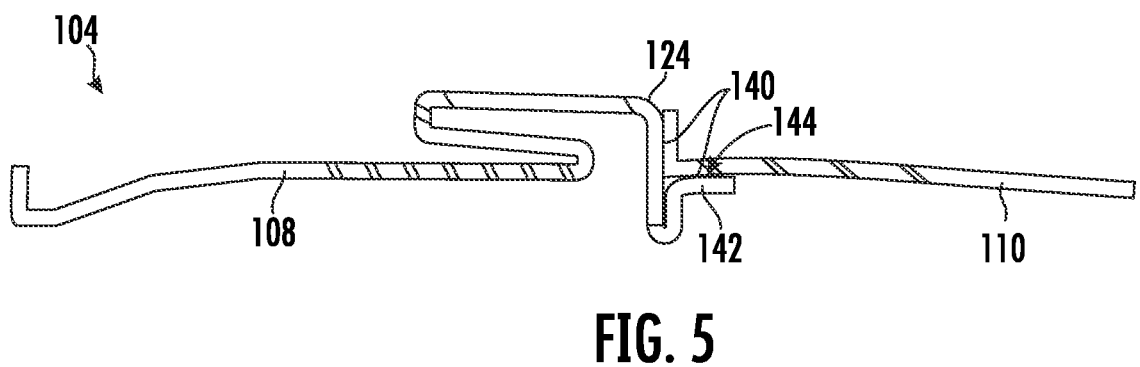
FIG. 5 is a cross-sectional view of an outer liner of a combustion section of a gas turbine engine in accordance with an exemplary embodiment of the present disclosure.

FIG. 5 illustrates another embodiment of the outer liner 104 including a two-part construction with the aft liner segment 110 coupled to the looped feature 124 downstream of the fence. In the illustrated embodiment, the looped feature 124 includes a flange 142 extending in the longitudinal direction. The flange 142 can define a support surface 144 against which the aft liner segment 110 can be supported upon, or even be mounted to. The flange 142 may be integrally formed as part of the looped feature 124. For instance, the flange 142 may be formed by bending the forward liner segment 108. In an embodiment, the flange 142 can be part of, or extend from, the fence 116. Similar to the embodiment illustrated in FIG. 4, the aft liner segment 110 can be coupled to the looped feature 124 at interface 140, for example, using a brazing technique, welding, a fastener, or the like. However, unlike the embodiment illustrated in FIG. 4, in the embodiment illustrated in FIG. 5, the interface 140 can occur at or along the flange 142, or along the flange 142 and a backside of the fence 116.

Figure 6:
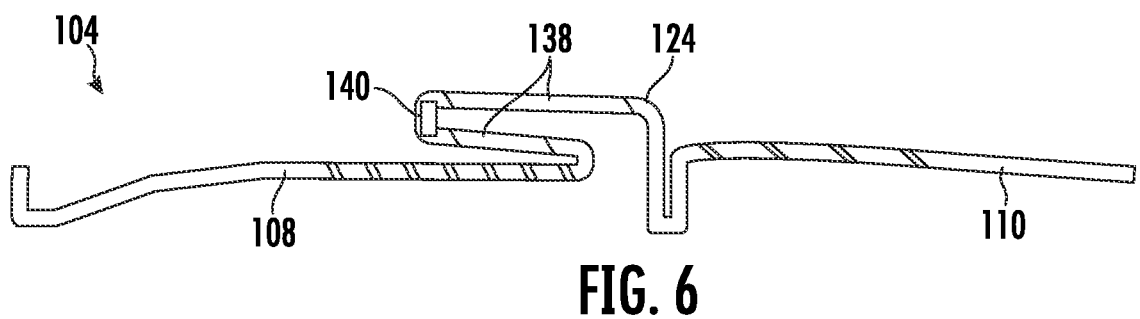
FIG. 6 is a cross-sectional view of an outer liner of a combustion section of a gas turbine engine in accordance with an exemplary embodiment of the present disclosure.

FIG. 6 illustrates yet another embodiment of the outer liner 104 including a two-part construction. The outer liner 104 includes a separate forward liner segment 108 and aft liner segment 110. Unlike the embodiment illustrated in FIGS. 4 and 5, the looped feature 124 illustrated in FIG. 6 is formed at least in part by the forward liner segment 108 and at least in part by the aft liner segment 110. That is, a portion of the looped feature 124 can be defined by the forward liner segment 108 and another portion of the looped feature 124 can be defined by the aft liner segment 110. The forward and aft liner segments 108 and 110 can be joined together at an interface 140 defined within the looped feature 124. For instance, the interface 140 depicted in FIG. 6 is disposed between two windows 138 along a forward end of the looped feature 124. The interface can be formed, for example, using a brazing technique, welding, a fastener, or the like. Forming the looped feature 124 may occur through bending both the forward and aft liner segments 108 and 110 to form two shaped portions which can be joined together to form the looped feature 124. In certain instances, the step of joining the two shaped portions of the looped feature 124 can be performed prior to installation of the outer liner 104. In other instances, the step of joining the two shaped portions can be performed in situ, on the combustor 100.

FIGS. 7 to 10 illustrate cross-sectional views of the outer liner 104 in accordance with other embodiments of the present disclosure.

Figure 7:
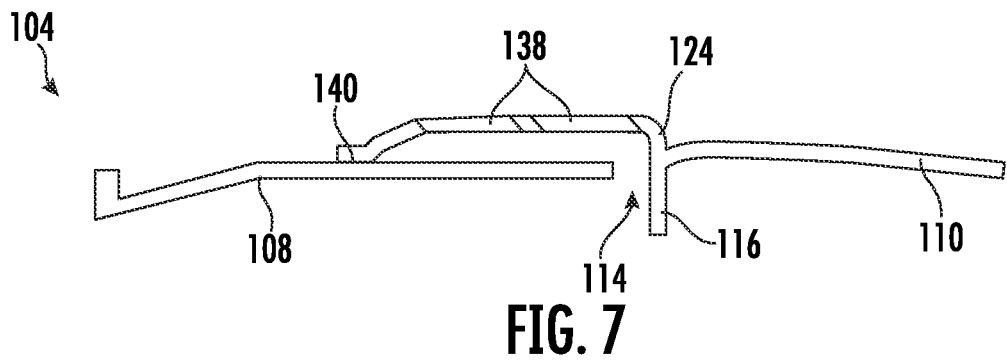
FIG. 7 is a cross-sectional view of an outer liner of a combustion section of a gas turbine engine in accordance with an exemplary embodiment of the present disclosure.

FIG. 7 depicts an embodiment where the aft liner segment 110 includes the fence 116 and the looped feature 124. In an embodiment, one or both of the fence 116 or looped feature 124 can be integral with the aft liner segment 110. The aft liner segment 110 can thus be coupled to the forward lining segment 108 at interface 140 formed between the looped feature 124 and the forward liner segment 108. In certain instances, the interface 140 can be a fixed interface. That is, the interface 140 can include a fixed (i.e., non-dynamic) coupling between the forward and aft liner segments 108 and 110. For example, the interface 140 can be coupled using a brazing technique, welding, a fastener, or the like. In other instances, the interface 140 can be dynamic whereby the looped feature 124 is moveable (e.g., slidable) with respect to the forward liner segment 108.

Figure 8:
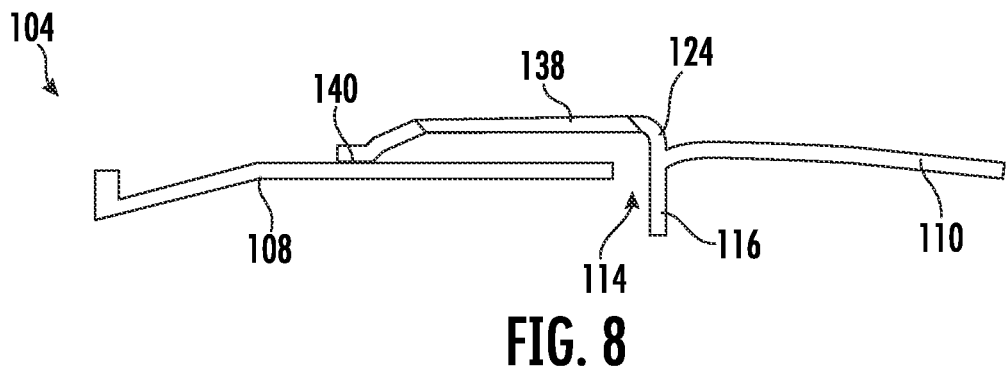
FIG. 8 is a cross-sectional view of an outer liner of a combustion section of a gas turbine engine in accordance with an exemplary embodiment of the present disclosure.

The looped feature 124 can include one or more of the aforementioned windows 138. For instance, referring to FIG. 7, the looped feature 124 can include two windows 138 spaced apart from one another in the longitudinal direction. Referring to FIG. 8, the looped feature 124 can alternatively include a single window 138. In an embodiment, the fence 116 can include a discrete component that is coupled with the aft liner segment 110 separate from the looped feature 124. That is, the fence 116 can be separately connected with the aft liner segment 110.

Figure 9:
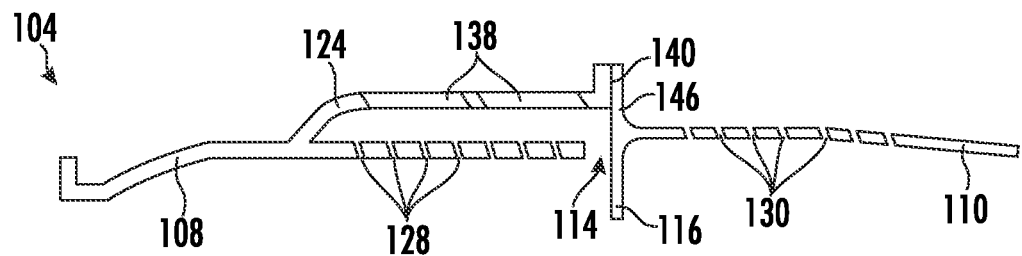
FIG. 9 is a cross-sectional view of an outer liner of a combustion section of a gas turbine engine in accordance with an exemplary embodiment of the present disclosure.
Figure 10:
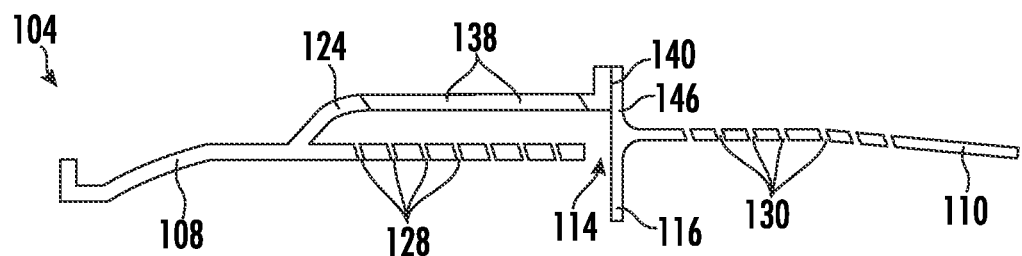
FIG. 10 is a cross-sectional view of an outer liner of a combustion section of a gas turbine engine in accordance with an exemplary embodiment of the present disclosure.

FIGS. 9 and 10 illustrate embodiments of the outer liner 104 in which the looped feature 124 is part of the forward liner segment 108. In such embodiments, the looped feature 124 can extend across the dilution slots 114 and be joined to the aft liner segment 110 at an interface 140 disposed downstream of the dilution slots 114. In an embodiment, the aft liner segment 110 can include an extension 146 to which the looped feature 124 can be attached. In an embodiment, the extension 146 can extend in a radial, or generally radial, direction away from the longitudinal centerline 12. The extension 146 can be disposed at a longitudinal end of the aft liner segment 110. More particularly, the extension 146 can be disposed adjacent to the dilution slots 114. In an embodiment, the extension 146 can be disposed adjacent to the fence 116. In a more particular embodiment, the extension 146 and fence 116 can lie along a generally same plane extending in the radial direction. As described with respect to FIGS. 7 and 8, the looped feature 124 can include one or more windows 138 fluidly coupling the combustion chamber 106 with cooling medium passing through the engine 10 external to the combustor 100. FIG. 9 depicts the looped feature 124 with two windows 138 spaced apart from one another in the longitudinal direction. FIG. 10 depicts the looped feature 124 with a single window 138.

The embodiments illustrated in FIGS. 9 and 10 include first and second groups of cooling holes 128 and 130. In an embodiment, the first group of cooling holes 128 can be disposed in longitudinal alignment with the one or more windows 138 of the looped feature 124. That is, a straight line extending in the radial direction can intersect both the first group of cooling holes 128 and the one or more windows 138. It should be understood that while illustrated without cooling holes, the embodiments depicted in FIGS. 7 and 8 can alternatively include one or more of the first and second groups of cooling holes 128 or 130. Moreover, the embodiments depicted in FIGS. 9 and 10 can alternatively be formed without one or both of the first and second groups of cooling holes 128 or 130. In certain instances, at least the first group of cooling holes 128 may increase formation of turbulence within the combustion chamber 106 while the dilution slots 114 form a dilution air film layer that is guided into the combustion chamber 106 by the fence 116. While the cooling medium passing through cooling holes 128 may be turbulent, the dilution air film layer can include a thin sheet of cooling medium which is less turbulent, resulting in deeper penetration into the center (core) of the combustion chamber 106. Upstream turbulence caused by cooling medium passing through the first group of cooling holes 128 may permit further penetration of the dilution air film layer into the center (core) of the combustion chamber 106.

FIG. 11 illustrates an embodiment of the outer liner 104 in accordance with another embodiment. The outer liner 104 includes a scooped interface 148 configured to capture passing cooling medium and redirect the cooling medium towards the combustion chamber 106, e.g., in a more radial direction. In certain instances, the scooped interface 148 can generate a film of airflow 150 that passes along the fence 116. The formation of the film of airflow 150 against the fence 116 can enhance mixing within the combustion chamber 106 by pushing the airflow deeper into the combustion chamber 106.

In an embodiment, the scooped interface 148 can define a scooped surface 152 against which the film of airflow 150 is redirected, e.g., turned, towards the combustion chamber 106. The scooped surface 152 can define a curved surface having a minimum radius of curvature in a range of 0.1 mm and 50 mm.

Cooling medium can enter the scooped interface 148 through window 138 and pass through the dilution slot 114 as the cooling medium enters the combustion chamber 106. In the illustrated embodiment, the outer liner 104 includes the first group of cooling holes 128. The first group of cooling holes 128 is depicted with a first cooling hole 154 disposed upstream of the window 138 and a second cooling hole 156 disposed downstream of the window 138. In an embodiment, the first cooling hole 154 can include a plurality of first cooling holes 154 of the first group of cooling holes 128. In another embodiment, the second cooling hole 156 can include a plurality of second cooling holes 156 of the first group of cooling holes 128. In an embodiment, the first and second cooling holes 154 or 156, alone or together, can improve operational longevity of the outer liner 104.

In an embodiment, the scooped interface 148 can define an inclined leading edge surface 158. The inclined leading edge surface 158 can lie along a straight line, a curved line, or a segmented line. In an embodiment, the inclined leading edge surface 158 can lie along a line 160, or a best fit line, that is angularly offset from the radial direction by an angle, as, that is at least 1°, such as at least 5°, such as at least 15°, such as at least 30°, such as at least 45°. The inclination of the leading edge surface 158 can direct the film of airflow 150 in a controlled manner to increase the effectiveness of the film of airflow 150 along the fence 116.

The outer liner 104 depicted in FIG. 11 has a single-piece construction. That is, the forward and aft liner segments 108 and 110 are integral with one another. FIG. 12 illustrates an exemplary embodiment of the outer liner 104 including the scooped interface 148 where the forward and aft liner segments 108 and 110 comprise discrete pieces. The forward and aft liner segments 108 and 110 can be joined together at an interface 140. In an embodiment, the interface 140 can define a dynamic (moveable) interface, e.g., a sliding interface, whereby the forward and aft liner segments 108 and 110 can move relative to one another. By way of non-limiting example, thermal loading which occurs during use of the engine 10 may cause one or both of the forward or aft liner segments 108 or 110 to deflect in at least the longitudinal direction. The moveable interface 140 can permit the forward and aft liner segments 108 and 110 to move relative to each other, at least in the longitudinal direction. As such, the buildup of stress on the outer liner 104 can be reduced. That is, the moveable interface 140 can define one or more thermal expansion features configured to accommodate thermally-induced stress. Referring again to FIGS. 3 to 10, the looped feature 124 can form a thermal expansion feature. As stress is introduced to the outer liner 104 as a result of thermal expansion, the looped feature 124 can accommodate, e.g., deflect to absorb, relative spatial changes to the outer liner. In such a manner, the looped feature 124 can absorb deflection caused in another part of the outer liner 104, or over the entirely of the outer liner 104. This may reduce liner wear and increase operational longevity. In certain instances, the scooped interface 148 (or another arrangement described herein) may not be configured to accommodate such relative spatial changes to the outer liner 104. Use of the moveable interface 140 can provide the same, or similar, benefit by permitting relative movement between the forward and aft liner segments 108 and 110.

FIGS. 13 and 14 illustrate views of the scooped interface 148 as seen in the longitudinal direction along Line A-A in FIG. 11. The window 138 of FIG. 11 is illustrated as a row of windows including a plurality of windows 138 extending around the outer liner 104 in the circumferential direction. The plurality of windows 138 depicted in FIG. 13 each share a common shape and size as compared to one another. In another embodiment, at least two of the plurality of windows 138 can have relatively different sizes or shapes as compared to one another. The windows 138 can have generally arcuate or linear shapes, as viewed in the longitudinal direction. Exemplary shapes for the windows 138 include polygons such as triangles, squares, pentagons, and the like; arcuate shapes such as circles, ovals, and the like; alphanumeric shapes; segmented shapes including a plurality of different segments some of which can be linear and others of which can be arcuate; or any other known shape in the art for passing fluid between two or more locations. The embodiment illustrated in FIG. 13 includes a single row of windows 138. Meanwhile, the embodiment illustrated in FIG. 14 includes a plurality of rows of windows 138. More particularly, the embodiment illustrated in FIG. 14 includes two rows of windows 138. However, in other embodiments, the windows 138 can be arranged in at least three rows, such as at least four rows, such as at least five rows, such as at least six rows, and the like. Use of a plurality of rows while maintaining the same overall size of the window 138 in the radial direction can create a better film of airflow 150 which permits a more uniform flow structure to feed the dilution slot 114.

Figure 15:
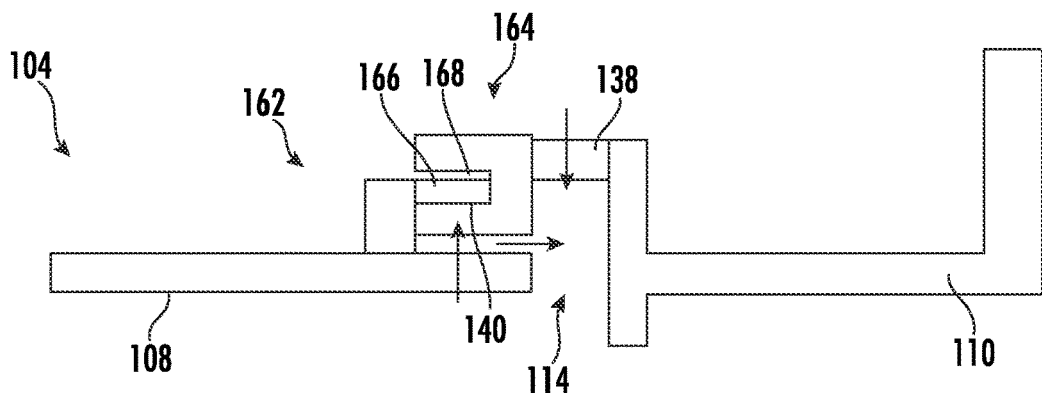
FIG. 15 is a cross-sectional view of an outer liner of a combustion section of a gas turbine engine in accordance with an exemplary embodiment of the present disclosure.

FIG. 15 illustrates a view of the outer liner 104 in accordance with another embodiment. In the depicted embodiment, the forward liner segment 108 and aft liner segment 110 are coupled together at an interface 140 located upstream of the dilution slot 114. The aft liner segment 110 can include the one or more windows 138 into the dilution slot 114.

In the illustrated embodiment, the forward liner segment 108 includes a first interface feature 162 and the aft liner segment 110 includes a second interface feature 164 configured to interface with the first interface feature 162 at the location of the interface 140. The interface 140 can define a dynamic (e.g., sliding) interface whereby the first and second interface features 162 and 164 can move (e.g., slide) relative to one another, e.g., along the longitudinal axis. By way of example, the first interface feature 162 can include an extension 166 extending in the longitudinal direction. The second interface feature 164 can include an extension receiving area 168 extending in the longitudinal direction and configured to receive the extension 166. In certain instances, the first and second interface features 162 and 164 can define a moveable interface whereby the forward liner segment 108 and aft liner segment 110 can move relative to one another, e.g., during thermal deflection.

The interface 140 between the first and second interface features 162 and 164 can be formed, for example, by press fit. In certain embodiments, one or both of the forward and aft liner segments 108 or 110 can be subjected to a thermal differential prior to interfacing. For instance, in an embodiment, one of the forward and aft liner segments 108 or 110 can be cooled with liquid nitrogen to allow the first and second interface features 162 and 164 to fit together easier during assembly. In a particular embodiment, use of different materials for the forward and aft liner segments 108 and 110 may be possible using the embodiment illustrated in FIG. 15. Exemplary materials include metals, alloys, ceramic-matrix composites (CMC), and the like.

Figure 16:
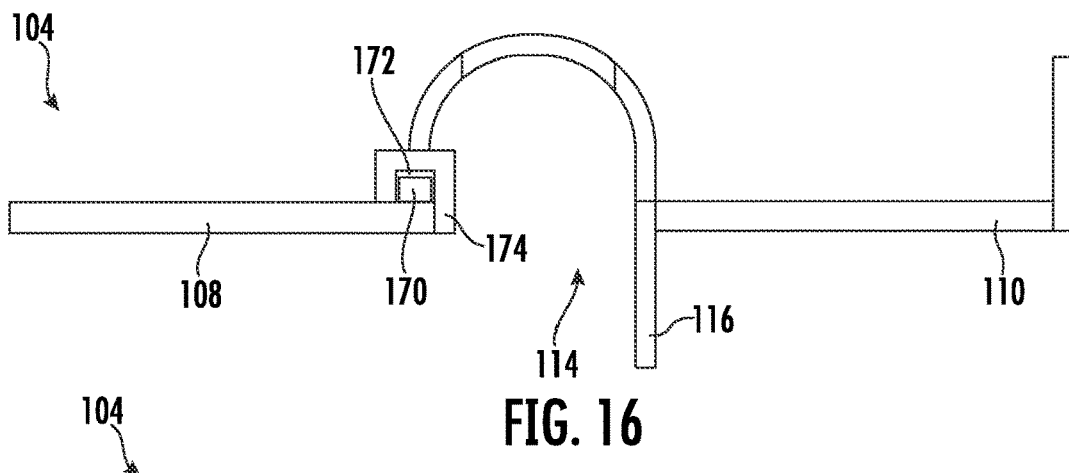
FIG. 16 is a cross-sectional view of an outer liner of a combustion section of a gas turbine engine in accordance with an exemplary embodiment of the present disclosure.

FIG. 16 illustrates another embodiment of the outer liner 104 where the use of different materials for the forward and aft liner segments 108 and 110 may be possible while also permitting relative deformation and deflection therebetween. In the embodiment illustrated in FIG. 16, at least one of the forward or aft liner segments 108 or 110 can include a piston seal 170 configured to move relative to the other of the forward or aft liner segments 108 or 110. The piston seal 170 can include, for instance, an annular seal ring configured to extend in around the combustor 106 in the circumferential direction. In an embodiment, the piston seal 170 can be disposed in a piston seal receiving area 172 of the at least one of the forward or aft liner segments 108 or 110. The piston seal 170 can project from the piston seal receiving area 172 so as to contact the forward or aft liner segment 108 or 110. In certain embodiments, at least one of the forward or aft liner segments 108 or 110 can include a stop feature 174 configured to prevent the forward and aft liner segments 108 and 110 from deflecting beyond a prescribed limit set by the stop feature 174. In the illustrated embodiment, the stop feature 174 includes a wall extending parallel, or generally parallel, with the fence 116. During deformation, e.g., caused by thermal expansion, the forward liner segment 108 can contact the stop feature 174 to prevent undesirable reduction in size of the dilution slots 114.

In an embodiment, the piston seal 170 can maintain a fluid seal between the forward and aft liner segments 108 and 110. In another embodiment, the piston seal 170 can maintain a low friction interface between the forward and aft liner segments 108 and 110.

Figure 17:
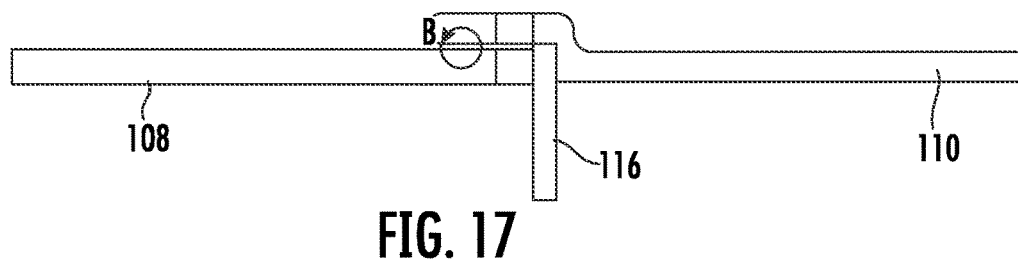
FIG. 17 is a cross-sectional view of an outer liner of a combustion section of a gas turbine engine in accordance with an exemplary embodiment of the present disclosure.
Figure 18:
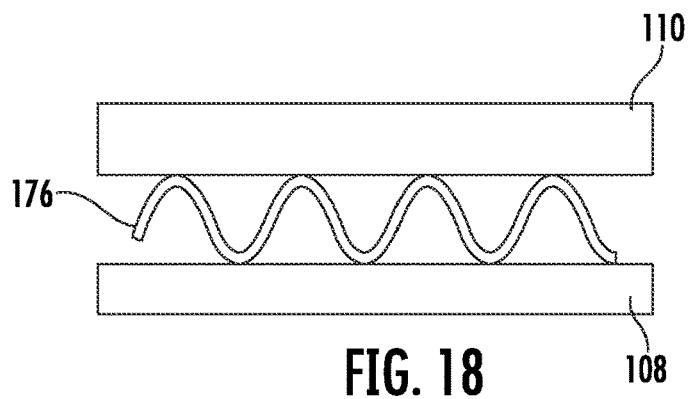
FIG. 18 is an enlarged view of the outer liner of FIG. 17 as seen in Box B in accordance with an exemplary embodiment of the present disclosure.

FIGS. 17 and 18 illustrate the outer liner 104 in accordance with another embodiment. FIG. 17 illustrates a cross-sectional view of the outer liner 104. FIG. 18 illustrates an enlarged view of a portion of the outer liner 104 of FIG. 17 as seen in Circle B. In the illustrated embodiment, interfacing portions of the forward and aft liner segments 108 and 110 are spaced apart in the radial direction by a spacer 176. Similar to the piston seal 170, the spacer 176 can maintain a fluid seal between the forward and aft liner segments 108 and 110. Moreover, in certain instances the spacer 176 can maintain a low friction interface between the forward and aft liner segments 108 and 110. The spacer 176 can be configured to deform under loading, e.g., loading exhibited on the spacer 176 by the forward and aft liner segments 108 and 110 in the radial direction. In an embodiment, the spacer 176 can include an annular ring, or segmented annular ring including a plurality of segments together defining an annular, or generally annular ring. The annular ring can define a plurality of riffles, curves, grooves, or the like to absorb radial loading. The annular ring can be made from a resilient material, e.g., spring steel.

Figure 19:
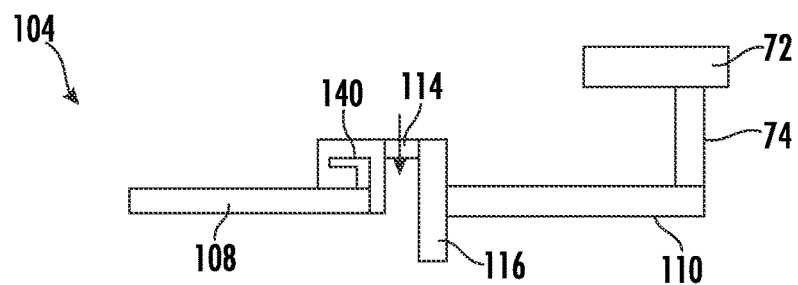
FIG. 19 is a cross-sectional view of an outer liner of a combustion section of a gas turbine engine in accordance with an exemplary embodiment of the present disclosure.

FIG. 19 illustrates a cross-sectional view of the outer liner 104 in accordance with yet another embodiment. In the depicted embodiment, the forward and aft liner segments 108 and 110 are coupled together at the interface 140 through a swaging process. The resulting outer liner 104 can be coupled to a case 72 of the gas turbine engine 10. In a more particular embodiment, the aft liner segment 110 can be coupled to the case 72. In an embodiment, the outer liner 104 can be indirectly coupled to the case 72, e.g., through one or more connecting members 74. In another embodiment, the outer liner 104 can be directly coupled to the case 72. For instance, the outer liner 104 can include an integral member extending to and coupled with the case 72. In certain instances, the outer liner 104 can be removably coupled to the case 72. For example, the outer liner 104 can be fastened to the case 72 through one or more fasteners, such as threaded fastener(s) (not shown).

Figure 20:
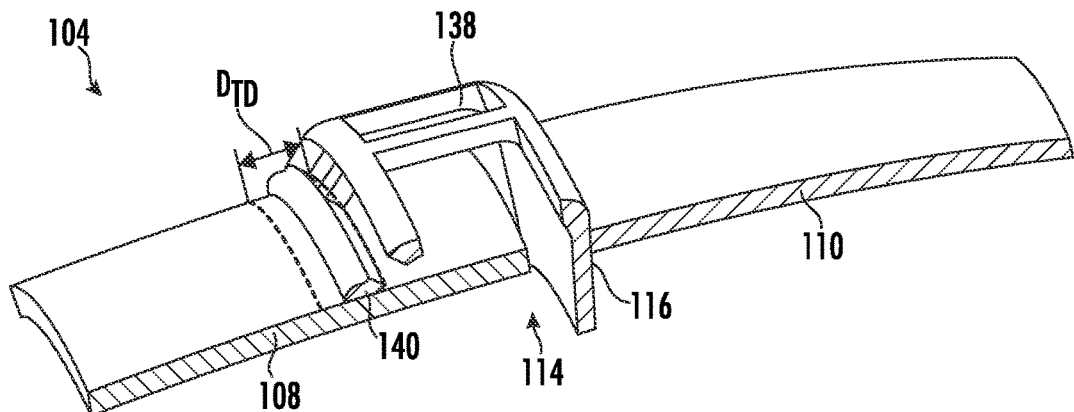
FIG. 20 is a cross-sectional view of an outer liner of a combustion section of a gas turbine engine in accordance with an exemplary embodiment of the present disclosure.

FIG. 20 illustrates the outer liner 104 in accordance with another embodiment. The outer liner 104 depicted in FIG. 20 includes the fence 116 extending through the dilution slot 114 radially into the combustion chamber 106. The outer liner 104 further includes one or more windows 138 in fluid communication with the dilution slot 114. The interface 140 between the forward liner segment 108 and the aft liner segment 110 is dynamic so as to permit relative movement therebetween. Relative movement between the forward and aft liner segments 108 and 110 can occur, for example, as thermal gradients exhibited on the outer liner 104 cause the thermal deflection. By way of non-limiting example, thermal deflection may cause the aft liner segment 110 to move forward or expand forward in the longitudinal direction relative to the forward liner segment 108 by a thermal deflection distance, $D_m$. In certain instances, the interface 140 can include a piston seal, such as the piston seal 170 described above with respect to FIG. 16. In other instances, the interface 140 can include a spacer, such as the spacer 176 described above with respect to FIG. 18.

Figure 21:
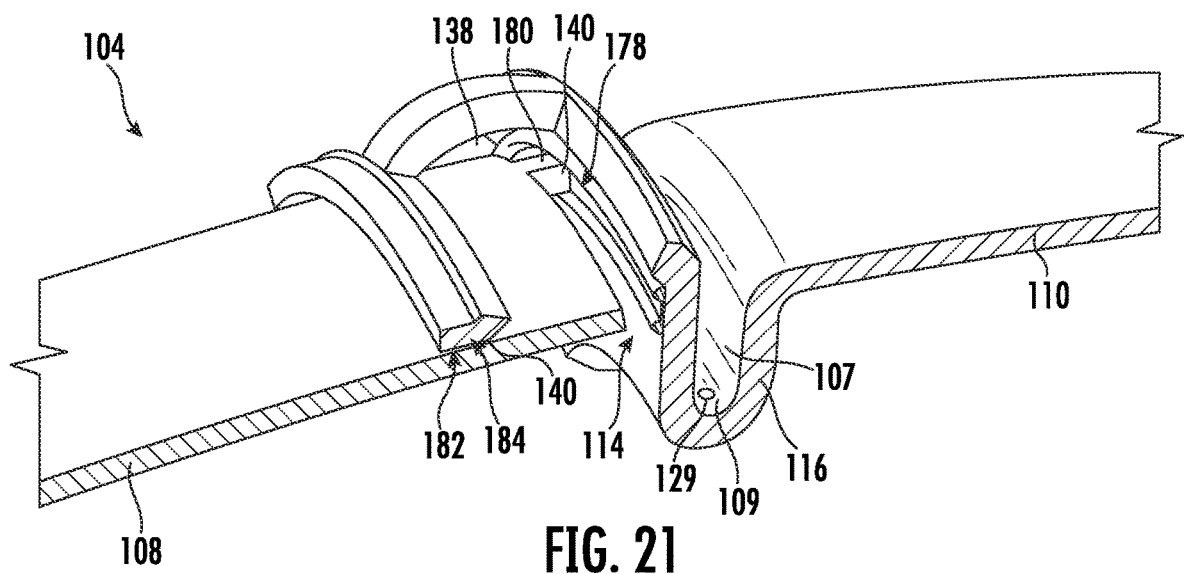
FIG. 21 is a cross-sectional view of an outer liner of a combustion section of a gas turbine engine in accordance with an exemplary embodiment of the present disclosure.

FIG. 21 illustrates a further embodiment of the outer liner 104 configured to absorb relative deflection between the forward and aft liner segments 108 and 110 in at least the longitudinal direction. In the illustrated embodiment, the outer liner 104 further includes a longitudinal interface 178 disposed between the forward and aft liner segments 108 and 110. The longitudinal interface 178 can provide one or more beneficial attributes to the interface 40 formed between the forward and aft liner segments 108 and 110. For example, in instances where contact between the forward and aft liner segments 108 and 110 is desired or may occur, such as in the embodiment of FIG. 21, the longitudinal interface 178 can be configured to reduce wear between the forward and aft liner segments 108 and 110. This may be performed, for example, by including a wear resistant coating on one or both of the forward or aft liner segments 108 or 110. In certain configurations, the wear resistant coating may be a material defining a greater hardness than a material of the remaining portions of the forward or aft liner segments 108 or 110. In the illustrated embodiment, a longitudinally extending projection 180 of the forward liner segment 108 is in contact with the longitudinal interface 178 of the aft liner segment 110. The longitudinally extending projection 180 and longitudinal interface 178 can provide a positive stop between the forward and aft liner segments 108 and 110 when deflecting in the longitudinal direction due to, e.g., thermal growth of the components. This is one example illustrating a size control feature formed by the projection 180 and longitudinal interface 178. Other size control features can be utilized which control the size of the dilution slot 114, particularly when the forward and aft liner segments 108, 110 are moveable relative to one another along the longitudinal direction. In some embodiments, size control can be fixed. That is, the size control feature can only provide one controlling function. For example, in the depicted embodiment in FIG. 21, the projection 180 has a relatively rigid construction limiting the size control of the dilution slot 114 to the length of the projection 180. In one or more non-illustrated embodiments, size control may be variable. That is, the size control feature can variably control the size of the dilution slot 114. By way of non-limiting example, this may include use of a varied geometry for the longitudinal interface 178, or a moveable or deformable projection 180 configured to provide a plurality of size controls, e.g., under varied operating conditions.

In the illustrated embodiment, the windows 138 define a circumferential dimension that is greater than the windows 138 of the exemplary embodiment depicted, for example, in FIG. 20. That is, the relative dimension of the windows 138 in the circumferential dimension can vary and is not intended to be limited to the embodiments described herein. For instance, in certain embodiments, the windows 138 can all have the same relative sizes or shapes. In other embodiments, at least two of the windows 138 can have different relative sizes or shapes as compared to one another. By way of another example, the embodiment depicted in FIG. 20 includes two rows of windows 138 while the embodiment depicted in FIG. 21 includes a single row of windows 138. The relative sizes and shapes of the window(s) 138 can vary in view of design requirements, neighboring engine architecture, and the like. For instance, as described above with respect to FIGS. 11 and 12, use of a scooped interface 148 may displace dilution air flow further into the combustion chamber 106 which can reduce $NO_X$ and increase engine performance.

In certain instances, the longitudinal interface 178 described above may form one part of the interface 140 between the forward and aft liner segments 108 and 110. In other instances, the interface 140 can further include a secondary interface, such as a radial interface 182, disposed between the forward and aft liner segments 108 and 110 in, e.g., the radial direction. In the illustrated embodiment, the radial interface 182 is depicted upstream of the dilution slot 114. In embodiments where the forward liner segment 108 bridges the gap formed by the dilution slot 114, the radial interface 182 can be disposed downstream of the dilution slot 114. Other arrangements and combinations of designs and locations of the longitudinal and radial interface 178 and 182 are possible.

The radial interface 182 can include a press fit interface between the forward and aft liner segments 108 and 110. In the illustrated embodiment, the press fit is formed between a longitudinal extension 184 of the aft liner segment 110 and a radially outer surface of the forward liner segment 108. In certain instances, the radial interface 182 can provide one or more beneficial attributes to an interface formed between the forward and aft liner segments 108 and 110. For example, the radial interface 182 can be configured to reduce wear between the forward and aft liner segments 108 and 110. This may be performed, for example, by including a wear resistant coating on one or both of the forward or aft liner segments 108 or 110. In an embodiment, the wear resistant coating can be further configured to reduce sliding resistance between the forward and aft liner segments 108 and 110.

The fence 116 depicted in FIG. 21 includes a curved segment of the aft liner segment 110. The curved segment can define a trough 107 which can extend around at least a portion of the circumference of the aft liner segment 110. The trough 107 can define a bottom 109 which can include a plurality of cooling holes 129 configured to pass cooling medium into the combustion chamber 106. In certain instances, the cooling holes 129 can be configured to transmit between approximately 20% and 50% of total dilution air. Use of the cooling holes 129 may increase air turbulence which results in better fuel air mixing. This can reduce $NO_X$ formation and improve the combustor exit profile and pattern. The use of the trough 107 may further help cool at least the forwardmost surface of the fence 116. As cooling medium passes through the cooling holes 129 at, or near, the bottom 109 of the trough 107, the cooling medium can pass by the forwardmost surface of the fence 116 to provide additional cooling thereto. Additional cooling to the forwardmost surface of the fence 116 may be desirable as the forwardmost surface of the fence 116 will experience the highest temperatures during operation.

Figure 22:
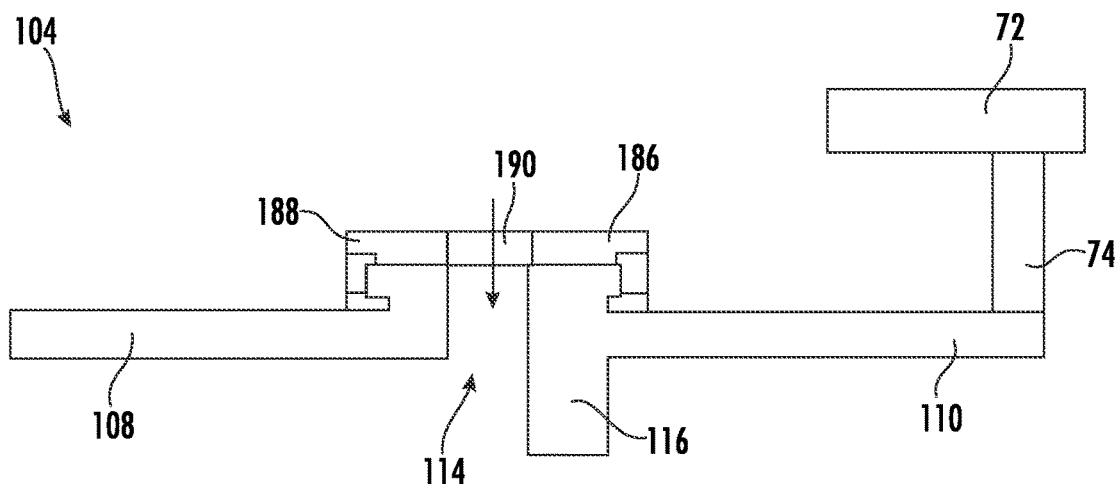
FIG. 22 is a cross-sectional view of an outer liner and intermediate member of a combustion section of a gas turbine engine in accordance with an exemplary embodiment of the present disclosure.
Figure 23:
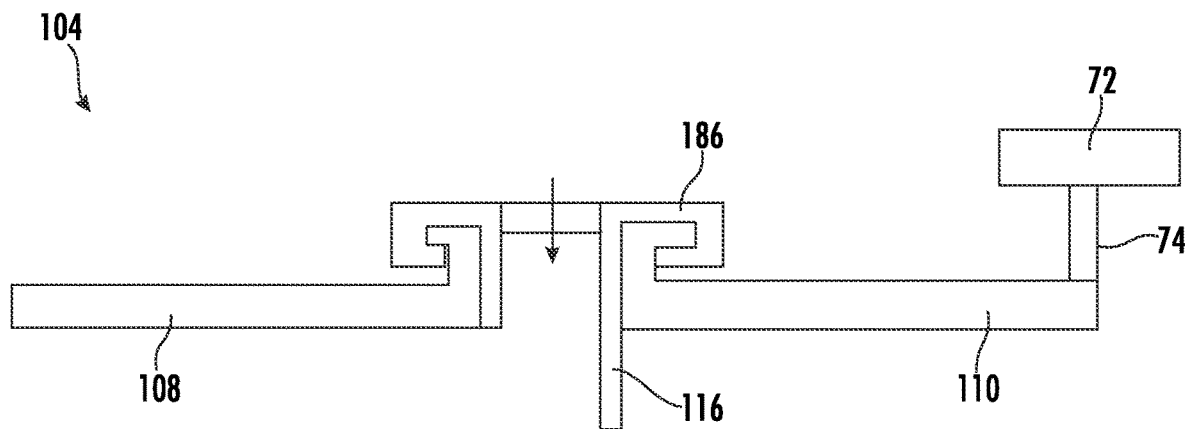
FIG. 23 is a cross-sectional view of an outer liner and intermediate member of a combustion section of a gas turbine engine in accordance with an exemplary embodiment of the present disclosure.

In certain instances, the engine 10 can further include an intermediate member having at least a portion disposed longitudinally between the forward and aft liner segments 108 and 110. The intermediate member can include a discrete component, separate from the forward and aft liner segments 108 and 110 that can be attached to either or both of the forward and aft liner segments 108 or 110, the engine frame, or float freely. FIGS. 22 and 23 illustrate cross-sectional views of two exemplary embodiments of the outer liner 104 including an intermediate member 186. In FIG. 22 the intermediate member 186 includes a body 188 coupled to at least one, such as both, of the forward or aft liner segments 108 or 110. The body 188 can include an annular body (single piece or multi-piece construction) which can extend around the combustion chamber 106. By way of example, the body 188 can be coupled to at least one of the forward or aft liner segments 108 or 110 through a swaged interface. The body 188 can define one or more windows 190 configured to communicate cooling medium to the dilution slot 114. The fence 116 depicted in FIG. 22 is integral with the aft liner segment 110. FIG. 23 depicts an embodiment of the intermediate member 186 where the fence 116 is integral therewith. That is, the fence 116 is formed by the intermediate member 186. In certain instances, only a portion of the fence 116 may be formed by the intermediate member 186. That is, in a particular embodiment the fence 116 can be formed by both the intermediate member 186 and one or both of the forward or aft liners 108 or 110.

The intermediate member 186 can be formed, for example, using additive manufacturing processes such as 3D printing, machining, forging, casting, stamping, or the like and can include one or more parts attached together through welding, brazing, swaging, bolting, or the like. The intermediate member 186 may be unitary or include a plurality of pieces coupled together. In certain instances, the intermediate member 186 may be at least partially assembled prior to being operatively positioned relative to the outer liner 104. In a particular instance, the intermediate member 186 may be fully assembled prior to being operatively positioned relative to the outer liner 104. In yet another instance, the intermediate member 186 may be assembled at the site of operation relative to the outer liner 104. For example, the intermediate member 186 can be at least partially assembled at the while being operatively positioned relative to the outer liner 104.

Figure 24:
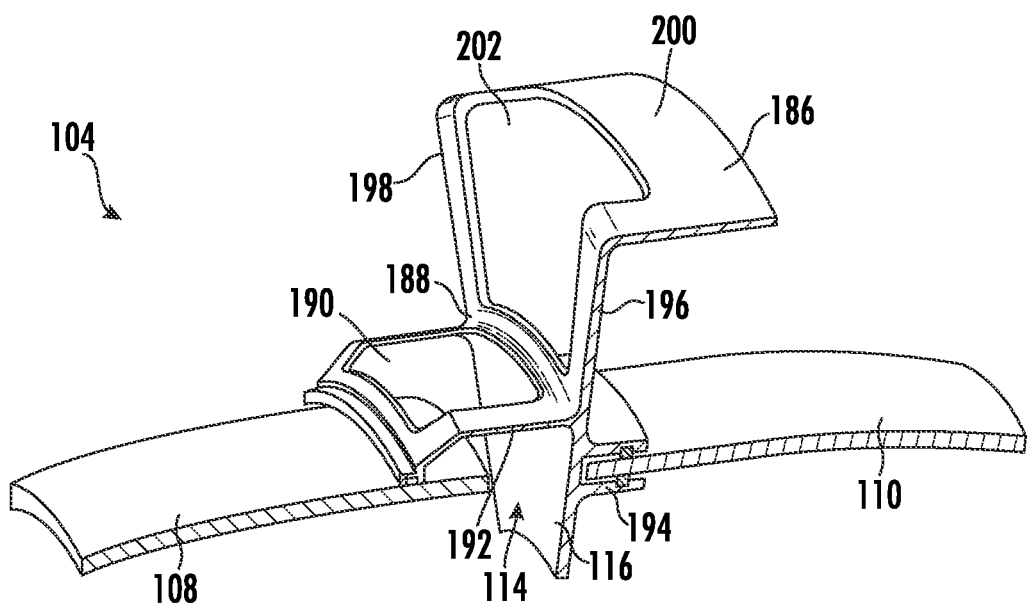
FIG. 24 is a partial perspective view of an outer liner and intermediate member of a combustion section of a gas turbine engine in accordance with an exemplary embodiment of the present disclosure.

FIG. 24 illustrates a perspective section view of the outer liner 104 including an intermediate member 186 with an integral fence 116. The body 188 of the intermediate member 186 includes a first engagement feature 192 extending towards the forward liner segment 108 and a second engagement feature 194 extending towards the aft liner segment 110. The body 188 depicted in FIG. 24 further includes a connecting member 196 configured to extend from the intermediate member 186 to the case 72 of the gas turbine engine 10. In the illustrated embodiment, the connecting member 196 includes a radial portion 198 extending in a generally radial direction, and a longitudinal portion 200 extending in a generally longitudinal direction. In certain instances, the longitudinal portion 200 of the connecting member 196 may be engageable with the case 72. For instance, the longitudinal portion 200 may be press fit with the case 72 or structure coupled to the case 72, fastened to the case, or the like. One or more windows 202 can extend through the connecting member 196 to enable cooling medium to pass through the intermediate member 186 and prevent all of the cooling medium from entering the dilution slot 114 into the combustion chamber 106.

In an embodiment, the intermediate member 186 (or another intermediate member described in accordance with another embodiment herein) may be retained at a relatively fixed position with respect to at least one of the forward or aft liner segments 108 or 110 by a support (e.g., connecting member 196) extending, for example, between the intermediate member 186 and the case 72. As used herein, retention of the intermediate member 186 at a "relatively fixed position" may refer to static, or generally static, disposition of the intermediate member 186 with respect to another feature. That is, the intermediate member 186 may be retained at a relatively static position with respect to one or more of the forward liner segment 108, the aft liner segment 110, the case 72, another element of the gas turbine engine 10, or any combination thereof. In certain instances, this static position can be absolutely fixed such that no relative movement occurs between the intermediate member 186 and the other feature (e.g., the forward liner segment 108, the aft liner segment 110, or the like). In other instances, the intermediate member 186 may be relatively static such that there is generally no relative movement between the intermediate member 186 and the other feature. With a relatively static engagement, some movement between the intermediate member 186 and other features may be expected, for example, as a result of vibrational frequencies, thermal expansion, and operational stresses. However, the intermediate member 186 is generally restricted from moving when in a relatively fixed position. It should be understood that the intermediate member 186 may also, or alternatively, be maintained in a relative fixed position through a support that is coupled to another section of the gas turbine engine 10 other than the case 72.

Figure 25:
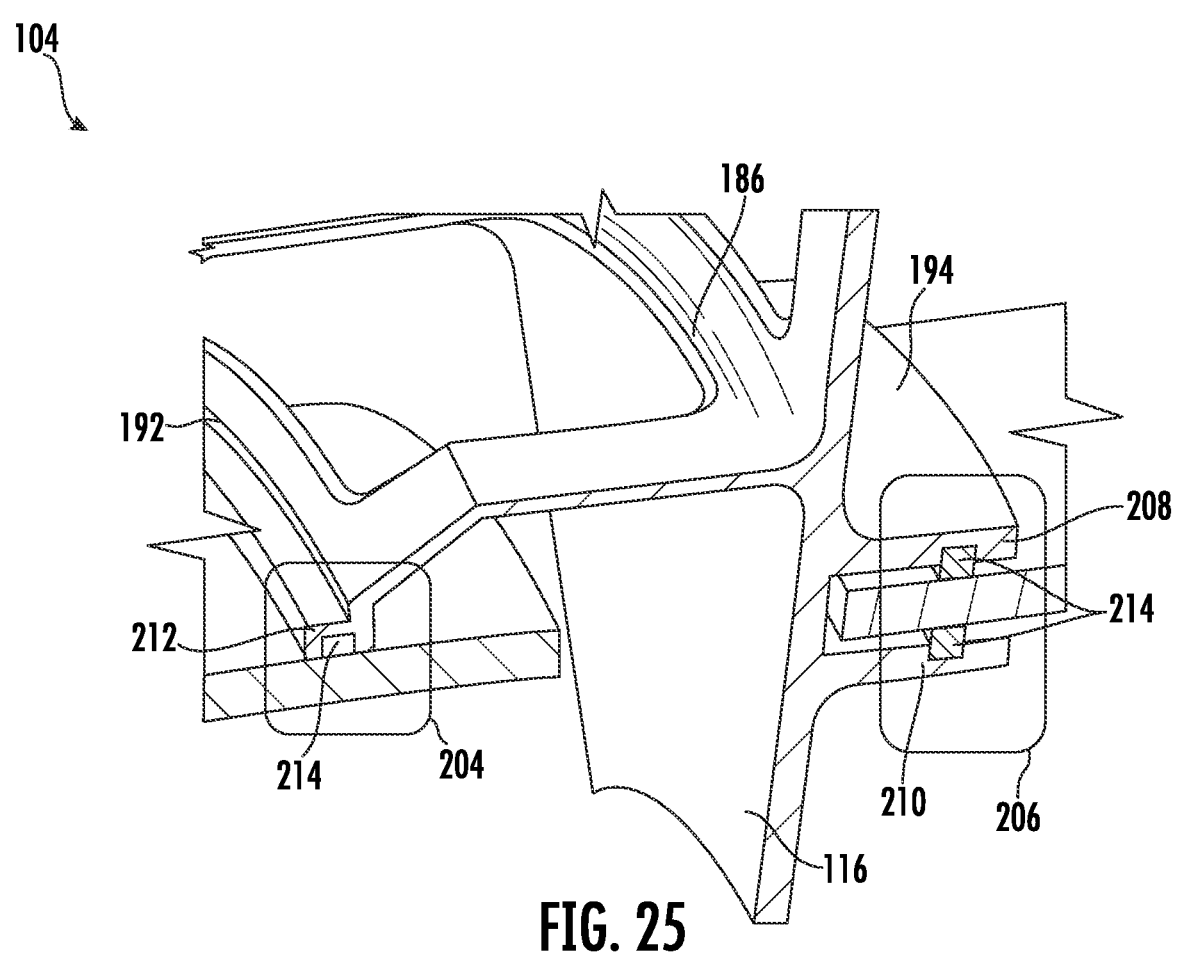
FIG. 25 is a partial enlarged perspective view of an outer liner and intermediate member of a combustion section of a gas turbine engine in accordance with an exemplary embodiment of the present disclosure.

FIG. 25 illustrates a close up view of the outer liner 104 shown in FIG. 24. More particularly, FIG. 25 illustrates sealing portions 204 and 206 of the first and second engagement features 192 and 194, respectively. The sealing portions 204 and 206 of the intermediate member 186 can interface with the forward and aft liner segments 108 and 110, respectively. That is, the sealing portion 204 of the first engagement feature 192 can interface with the forward liner segment 108 and the sealing portion 206 of the second engagement feature 194 can interface with the aft liner segment 110. In an embodiment, at least one of the sealing portions 204 or 206 of the intermediate member 186 can include a multi-seal arrangement whereby the sealing portion 204 or 206 contacts the respective liner segment at or along two or more interfaces. In the embodiment depicted in FIG. 25, the sealing portion 206 of the second engagement feature 194 has a multi-seal arrangement with a first sealing interface 208 disposed along an outside of the aft liner segment 110 and a second sealing interface 210 disposed along an inside of the aft liner segment 110. The sealing portion 204 of the first engagement feature 192 has a single seal arrangement with a sealing interface 212 disposed along an outside of the forward liner segment 108. In an embodiment, one or more of the sealing interfaces 208, 210, or 212 can include a spacer 214. The spacer 214 can be similar to or different from the aforementioned spacer 176. By way of non-limiting example, the spacer 214 can include a piston seal ring, a W-seal connection, a wear resistant coating, or the like. In an embodiment, one or more of the sealing interfaces 208, 210, or 212 can be a press fit connection with the underlying liner segment.

In an embodiment, one or more of the forward liner segment 108, the aft liner segment 110, or the intermediate member 186 can be configured to deflect, for example, as a result of exposure to high temperatures encountered at the combustion chamber 106 during operation of the gas turbine engine 10. To accommodate this deflection, the intermediate member 186 can be configured to move relative to at least one of the forward and aft liner segments 108 or 110. In an embodiment, this deflection can be absorbed at the sealing portions 204 or 206. For instance, the sealing portion 204 of the first engagement feature 192 can be configured to move relative to the forward liner segment 108. For instance, the forward liner segment 108 can elongate in the longitudinal direction and slide relative to the sealing portion 204. In another instance, the sealing portion 206 of the second engagement feature 194 can be configured to move relative to the aft liner segment 110. For instance, the aft liner segment 110 can elongate in the longitudinal direction and slide relative to the sealing portion 206. In such a manner, the intermediate member 186 can absorb deflection of either, or both, of the forward and aft liner segments 108 or 110. In certain instances, the intermediate member 186 may itself deflect, for example, upon longitudinal loading caused by the flow of cooling medium against the fence 116. The interfaces formed between the intermediate member 186 and the forward or aft liner segments 108 or 110 may be configured to absorb at least part of this deflection. In other instances, deflection loading on the intermediate member 186 caused by longitudinal loading may be absorbed by the case 72 or the connecting member 196.

Figure 26:
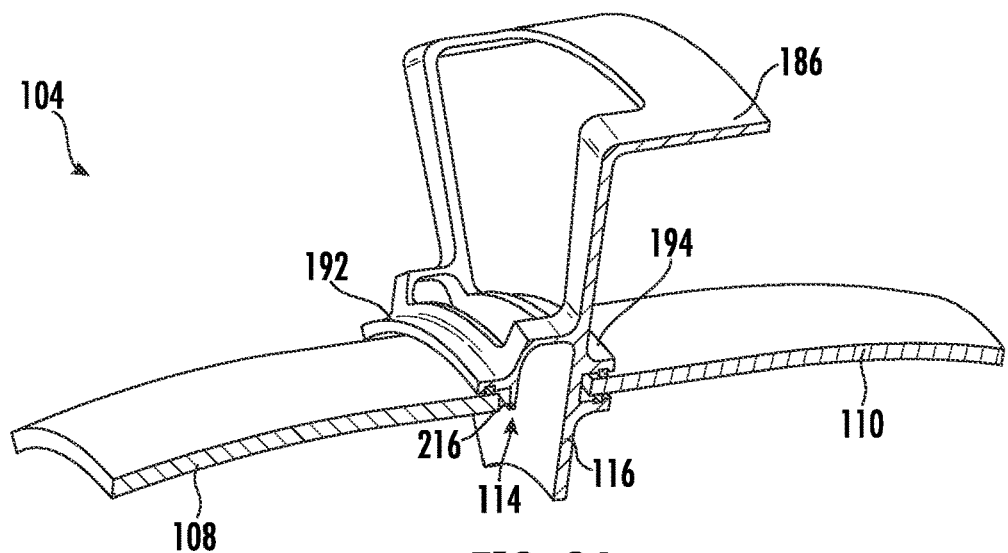
FIG. 26 is a partial perspective view of an outer liner and intermediate member of a combustion section of a gas turbine engine in accordance with an exemplary embodiment of the present disclosure.
Figure 27:
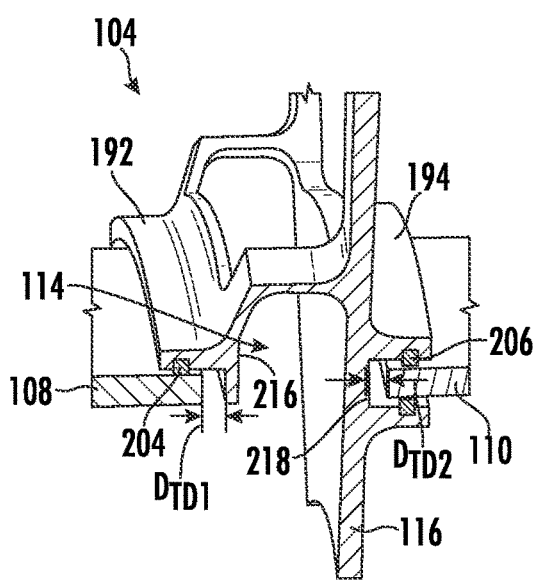
FIG. 27 is a partial enlarged perspective view of an outer liner and intermediate member of a combustion section of a gas turbine engine in accordance with an exemplary embodiment of the present disclosure.

In certain instances, the forward or aft liner segments 108 or 110 may deflect relative to the intermediate member 186 past a desired distance. In these instances, a stop feature can be used to prevent undesired deflection. Referring to FIGS. 26 and 27, a stop feature 216 can extend from the intermediate member 186 and prevent the forward liner segment 108 from deflecting past a prescribed deflection limit. In an embodiment, the stop feature 216 may terminate in the radial direction prior to entering the combustion chamber 106. The stop feature 216 can define a maximum thermal deflection distance, $D_{TD1}$. The sealing portion 206 of the second engagement feature 194 can include a stop feature 218 in addition to, or instead of, the stop feature 216 on the first engagement feature 192. In the illustrated embodiment, the stop feature 218 of the second engagement feature 194 is defined by a back surface of the fence 116. The stop feature 218 can define a maximum thermal deflection distance $D_{TD2}$. Other causes of deflection in addition to the aforementioned thermally-generated deflection can cause the deflection of any one or more of the forward liner segment 108, the aft liner segment 110, or the intermediate member 186.

The stop feature(s) 216 or 218 can limit deformation of the forward or aft liner segments 108 or 110 such that the dilution slot 114 retains its effective size. That is, without the stop feature 216, for example, the forward liner segment 108 may deflect into the dilution slot 114 so as to critically restrict passage of cooling medium. The stop feature 216 can prevent such restriction and thus maintain a more consistent operating dilution airflow.

Figure 28:
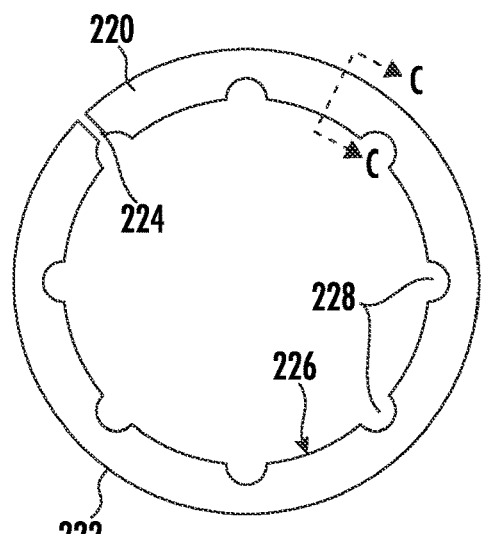
FIG. 28 is a longitudinal front view of a piston seal in accordance with an exemplary embodiment of the present disclosure.
Figure 29:
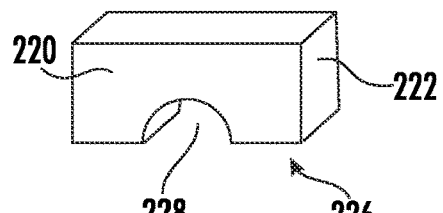
FIG. 29 is a partial perspective view of a piston seal in accordance with an exemplary embodiment of the present disclosure.
Figure 30:
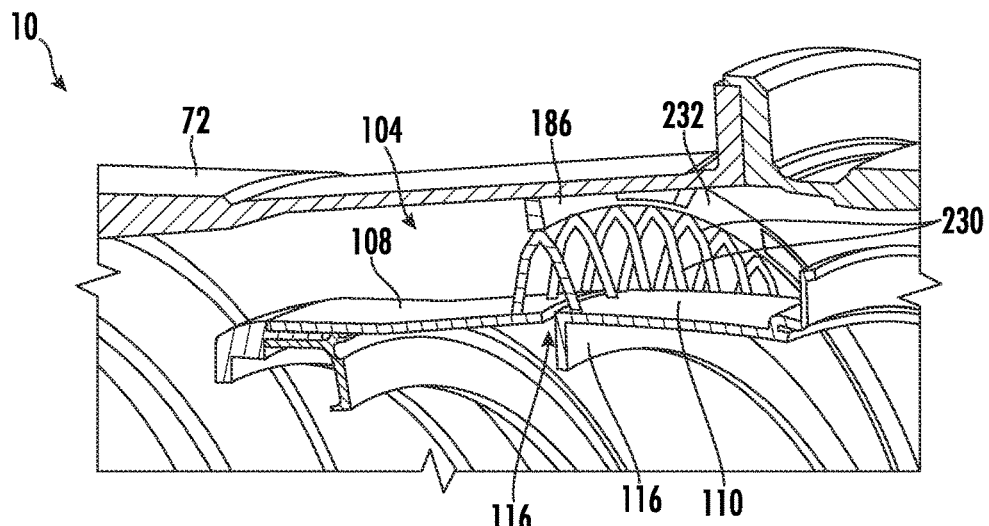
FIG. 30 is a partially cut away perspective view of a gas turbine engine in accordance with an exemplary embodiment of the present disclosure.
Figure 31:
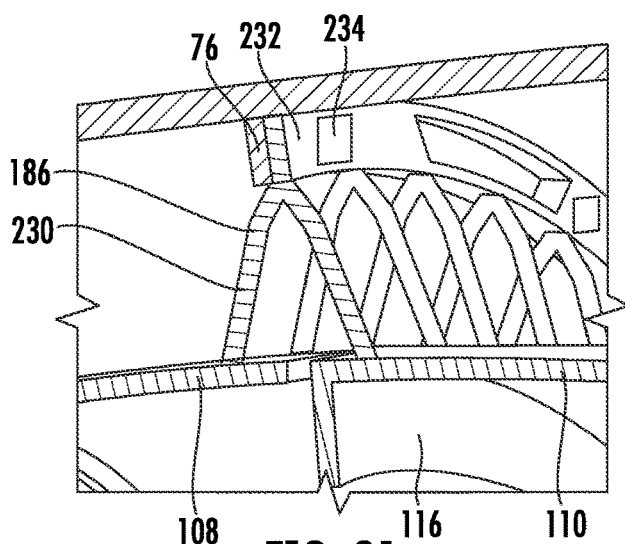
FIG. 31 is an enlarged partially cut away perspective view of the gas turbine engine of FIG. 30 in accordance with an exemplary embodiment of the present disclosure.
Figure 32:
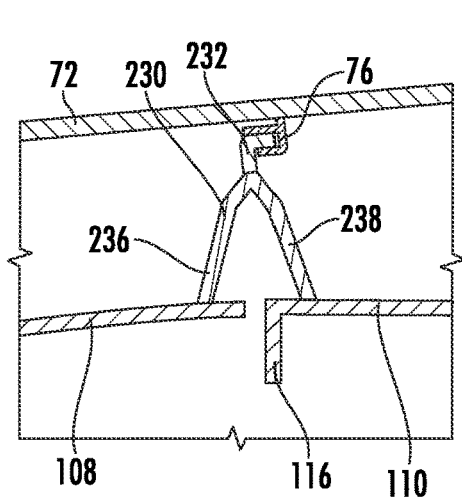
FIG. 32 is a cross-sectional view of spokes and an annular support ring of an intermediate member coupled with an arm of a case of a gas turbine engine in accordance with an embodiment.

FIG. 28 illustrates an embodiment of an exemplary spacer 220 used at the sealing portion 204 or 206 of the first or second engagement feature 192 or 194. FIG. 29 illustrates a cross-sectional view of the spacer 220 as seen along Line C-C in FIG. 28. The spacer 220 depicted is a piston seal having a body 222 with a split 224 extending through the longitudinal direction of the spacer 220. The body 222 defines an inner surface 226 with grooves 228 formed therein. The grooves 228 can permit fluid passage therethrough. For instance, the grooves 228 can be used to assist in controlling airflow during purging, cooling, or the like. The grooves 228 may have arcuate cross-sectional shapes (as depicted), polygonal cross-sectional shapes, or combinations thereof. The grooves 228 can have the same or different relative sizes as compared to one another. In an embodiment, the grooves 228 can be equally spaced apart from one another in the circumferential direction. In another embodiment, at least two grooves 228 can have different spacing as compared to one another.

FIGS. 30 to 33 illustrate another embodiment of the outer liner 104 and intermediate member 186. The intermediate member 186 can include a plurality of spokes 230 extending at least partially over the dilution slot 114, such as between the forward and aft liner segments 108 and 110. In an embodiment, the spokes 230 can be coupled to the case 72, or another element of the gas turbine engine 10, through annular support ring 232. In some instances, the annular support ring 232 and spokes 230 can be discrete pieces that are coupled together. In other instances, the annular support ring 232 and spokes 230 are integral with one another. That is, the annular support ring 232 and spokes 230 can be formed from a single piece. By way of example, the annular support ring 232 and spokes 230 can be formed through an additive manufacturing process. In another embodiment, the annular support ring 232 and spokes 230 can be formed through a subtractive removal process. Exemplary materials include CoCr and Hastalloy alloys, for example. The annular support ring 232 may be fastened to the case 72 by way of one or more threaded or non-threaded fasteners, brazing, welding, and the like. In an embodiment, the annular support ring 232 is bolted to a flange 76 of the case 72 by a plurality of bolts 234.

In an embodiment, at least some of the spokes 230 can be coupled to at least one of the forward or aft liner segments 108 or 110. The spokes 230 can help control thermal deflection of one or both of the forward or aft liner segments 108 or 110. In certain instances, the spokes 230 and annular support ring 232 may combine to couple the forward or aft liner segment 108 or 110 to the case 72. In instances, where one or both of the forward or aft liner segments 108 or 110 include a ceramic material, the spokes 230 can be separate pieces that hung from the case 72.

Figure 33:
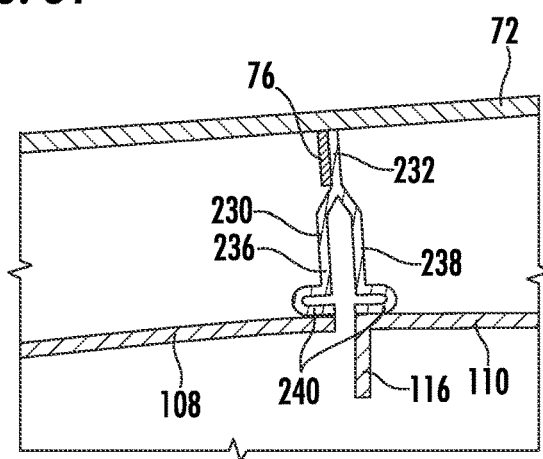
FIG. 33 is a cross-sectional view of spokes and an annular support ring of an intermediate member coupled with an arm of a case of a gas turbine engine in accordance with an embodiment.

The spokes 230 can have several different shapes. For instances, referring to FIG. 32 in particular embodiment, the spokes 230 can form a hook joint having a generally rounded U- or V-shaped cross-sectional profile. The arms 236 or 238 can be tuned to provide desired benefits to the outer liner 104. For instance, the arms 236 or 238 can have a desired spring constant to control axial and radial deformation of the forward and aft liner segments 108 and 110. Referring to FIG. 33, the spokes 230 can further include one or more features 240 configured to further control the tuning of the spokes 230. The features 240 depicted in FIG. 33 are non-linear portions of the arms 236, 238, such as bends (e.g., V-shaped or U-shaped bends) or baffles in the arms 236, 238. More specifically, for the embodiment depicted in FIG. 33, the features 240 are wishbone ends of the arms 236 and 238 configured to tune stiffness of the spokes 230 for desired characteristics.

Figure 34:
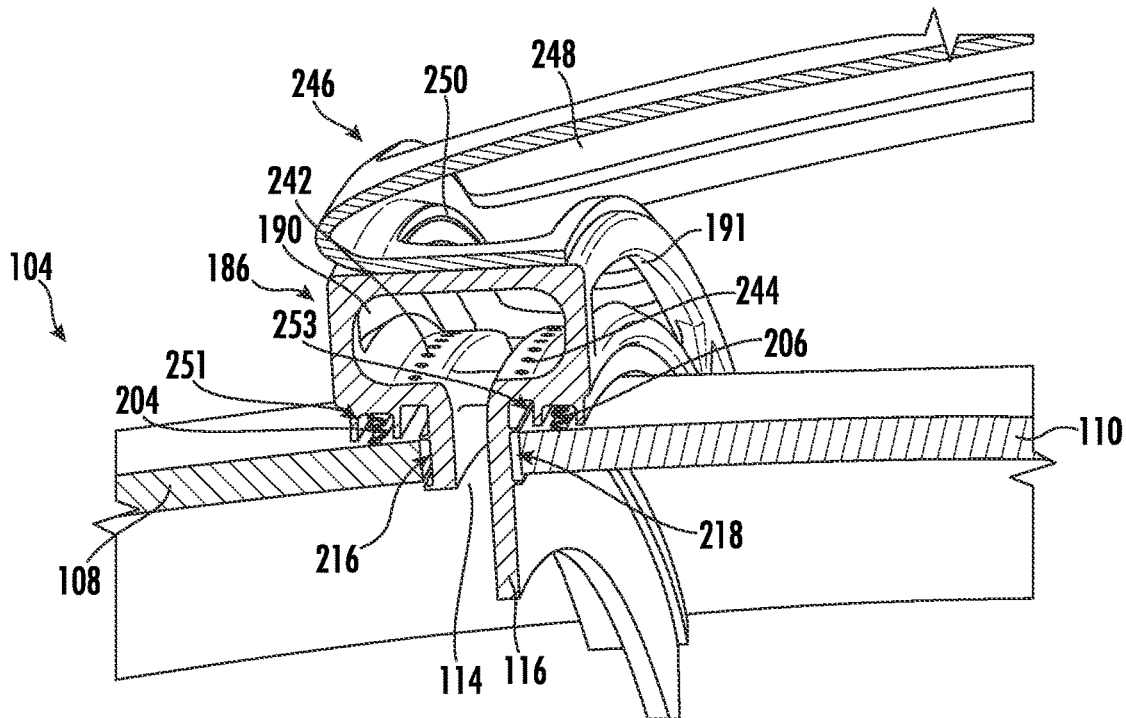
FIG. 34 is a partially cut away cross-sectional view of an outer liner, intermediate member, and support of a combustion section of a gas turbine engine in accordance with an exemplary embodiment of the present disclosure.
Figure 35:
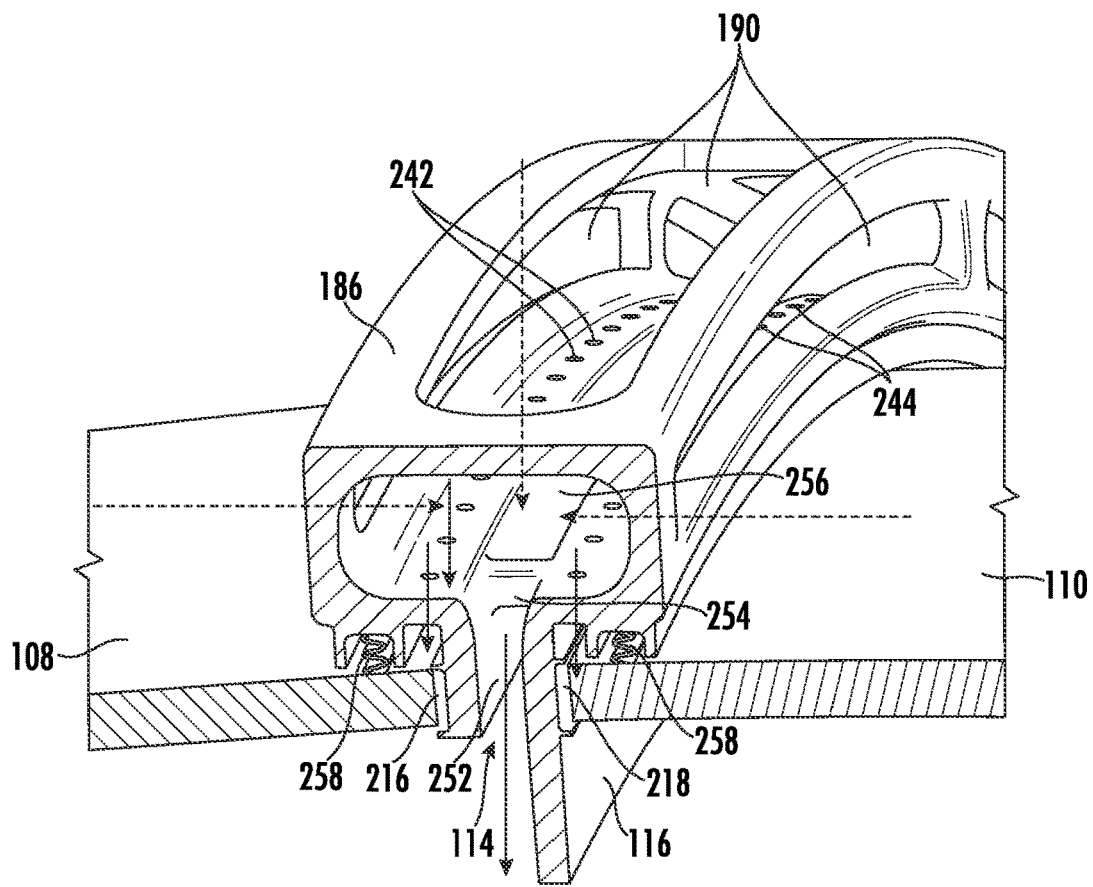
FIG. 35 is a partially cut away cross-sectional view of an outer liner and intermediate member of a combustion section of a gas turbine engine in accordance with an exemplary embodiment of the present disclosure.

FIGS. 34 and 35 illustrate an embodiment of the intermediate member 186 in accordance with another embodiment. The intermediate member 186 depicted in FIG. 34 generally includes the fence 116 extending in the radial direction toward the combustion chamber 106, one or more windows 190, stop features 216 and 218, sealing portions 204 and 206, a first group of cooling holes 242 disposed upstream of the dilution slot 114, and a second group of cooling holes 244 disposed downstream of the first set of cooling holes 242. Sealing interfaces 251 and 253 may be formed between the intermediate member 186 and the forward and aft liner segments 108 and 110, respectively. A support 246 is depicted extending radially from the intermediate member 186. The support 246 can extend to the case 72 or another element within the gas turbine engine 10. In an embodiment, the support 246 can be configured to couple the intermediate member 186 to the case 72. In another embodiment, the support 246 can carry an internal load, such as a spring load, within the support 246, thereby providing a biasing force against the intermediate member 186 in a desired direction. For instance, the support 246 can be configured to bias the intermediate member 186 into the outer liner 104 in a direction along the radial axis.

The support 246 can define a window 248 configured to permit cooling medium to pass longitudinally downstream of the support 246. In certain instances, the support 246 can define a dilution slot window 250 configured to pass cooling medium to the dilution slot 114. The dilution slot window 250 can be in fluid communication with one or more of the windows 190 of the intermediate member 186. For instance, the dilution slot window 250 can be in fluid communication with a radially outer window 190 of the intermediate member 186.

The intermediate member 186 can include only the forward window(s) 190, or only the dilution slot window 250, or only an aft window 191, or only a forward and aft window 190 and 191, or only a forward window 190 and the dilution slot window 250, or only the dilution slot window 250 and the aft window 191. In an embodiment, the intermediate member 186 can include the forward window 190, the dilution slot window 250, and the aft window 191. Air flow can additionally pass through cooling holes 242 or 244 by stop features 216 or 218 into the combustion chamber. Air passing through the cooling holes 242 or 244 can avoid hot gas ingestion into the cavity formed between the intermediate member 186 and the forward or aft liner segments 108 or 110. This can improve hot section life of the engine 10. Sealing interfaces 251 and 253 can reduce leakage between the intermediate member 186 and the forward and aft liner segments 108 and 110.

Windows 248 in the support 246 can help distribute air through the intermediate member 186 resulting in a more uniform distribution of air exiting the dilution slot 114 into the combustion chamber.

Referring to FIG. 35, the stop feature 216 can extend into the combustion chamber 106 a radial distance past the forward liner segment 108. The stop feature 216 can prevent the forward liner segment 108 from deflecting in at least the longitudinal direction beyond a maximum deflection distance. Similar to the stop feature 216, the stop feature 218 may prevent the aft liner segment 110 from deflecting in at least the longitudinal direction beyond a maximum deflection distance.

A channel 252 can be disposed between the stop feature 216 and the fence 116 to fluidly couple the combustion chamber 106 with cooling medium entering the combustion chamber 106 through the windows 190 of the intermediate member 186. In an embodiment, one or more connecting members 254 can extend across the channel 252. The connecting members 254 can extend between the stop feature 216 and the fence 116. Adjacent connecting members 254 can be spaced apart from one another so as to define channel openings 256. The connecting members 254 can maintain the channel 252 in a desired state, e.g., maintain the channel 252 at a relatively fixed size and prevent collapse of the channel 252, e.g., if the forward or aft liner segments 108 or 110 deform so as to bias the stop features 216 or 218 sufficiently to close the channel 252. Cooling medium, e.g., dilution air, can enter the channel openings 256 and pass through the channel 252 into the combustor chamber 106.

In an embodiment, at least one of the first or second sets of cooling holes 242 or 244 can pass cooling medium into the combustion chamber 106 through the dilution slot 114 between the intermediate member 186 and the forward or aft liner segment 108 or 110, respectively. That is, the fluid flow path through the cooling holes 242 or 244 can be separate from the fluid flow path through the channel 252. In a more particular embodiment, the fluid flow path through the cooling holes 242 or 244 can be in fluid communication with the fluid flow path through the channel 252 into the combustion chamber 106.

In another embodiment, cooling medium entering the cooling holes 242 or 244, or back pressure generated elsewhere in the system, can purge through spacers 258 disposed between the intermediate member 186 and the forward and aft liner segments 108 and 110. The spacers 258 and 258 can be disposed in at least one of the sealing interfaces 251 or 253. In an embodiment, the spacers 258 and 258 can have similar modes of operation. That is, for example, both of the spacers 258 and 258 can provide a sealing interface for controlling air flow into the combustion chamber 106. In another embodiment, the spacers 258 and 258 can have one or more different characteristics or functions as compared to the other. For instance, the spacer 258 in contact with the aft liner segment 110 can prevent high amounts of stress from developing on the aft liner segment 110. The spacer 258 in contact with the aft liner segment 110 may also provide cooling medium to the backside of the fence 116, thereby increasing operational longevity of the intermediate member 186. Meanwhile, the spacer 258 in contact with the forward liner segment 108 can permit purging of cooling medium and prevent hot gas ingestion into the combustion chamber 106.

The first or second set of cooling holes 242 or 244 can include a plurality of cooling holes. In certain instances, each of the cooling holes can have the same relative size or shape as compared to one another. In other instances, at least one of the cooling holes can have a different size or shape as compared to another cooling hole. In an embodiment, the cooling holes have a dimension in a range of 5 mils and 100 mils, such as in a range of 10 mils and 50 mils, such as in a range of 20 mils and 35 mils. In a particular embodiment, the cooling holes have a diameter of approximately 30 mils. In certain instances, the cooling holes of the first or second set of cooling holes 242 or 244 can be configured to inject at least 1% of the total cooling medium into the combustion chamber 106, such as at least 2% of the total cooling medium, such as at least 3% of the total cooling medium, such as at least 4% of the total cooling medium, such as at least 5% of the total cooling medium, such as at least 10% of the total cooling medium, such as at least 15% of the total cooling medium. The remainder of the cooling medium injected into the combustion chamber 106 may come from, for example, the channel 252.

Figure 36:
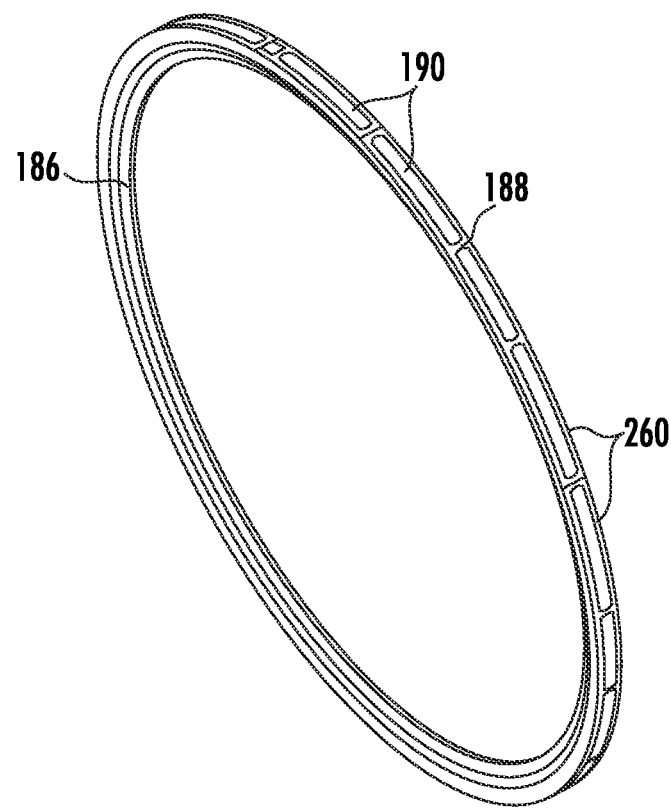
FIG. 36 is a perspective view of an intermediate member in accordance with an exemplary embodiment of the present disclosure.

Referring to FIG. 36, the intermediate member 186 can comprise an annular body 188 defining a plurality of segments 260. The segments 260 can each define a portion of the circumference of the intermediate member 186. In an embodiment, the intermediate member 186 can include at least two segments 260, such as at least three segments 260, such as at least four segments 260, and so on. Each segment 260 can define one or more windows 190 configured to pass cooling medium to the combustion chamber 106.

Figure 37:
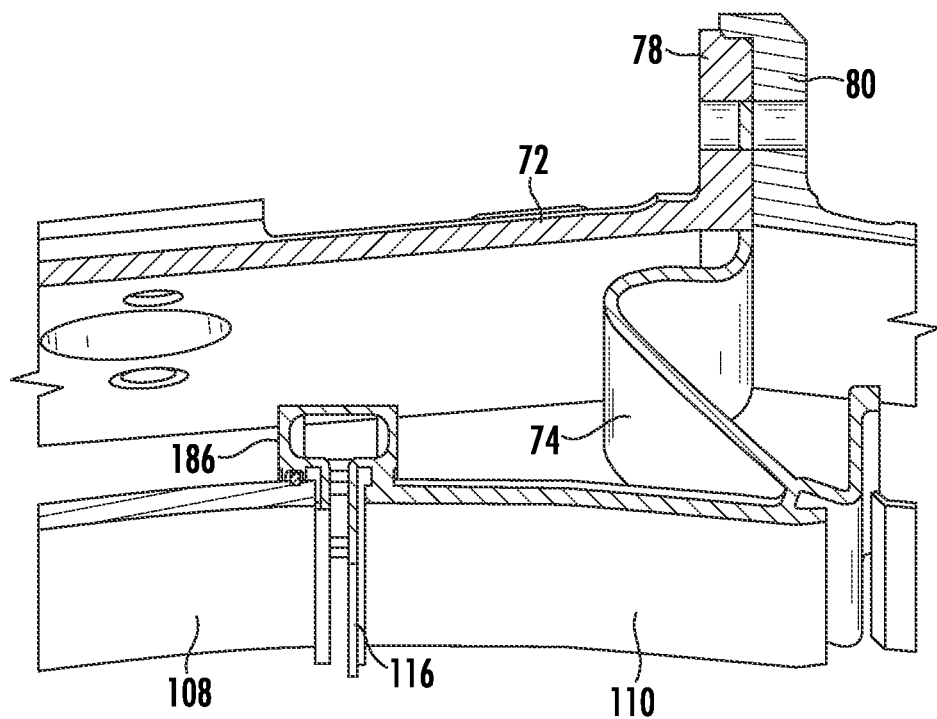
FIG. 37 is a partially cut away cross-sectional view of an outer liner and intermediate member of a combustion section of a gas turbine engine in accordance with an exemplary embodiment of the present disclosure.

FIG. 37 illustrates a cross-sectional view of a portion of the gas turbine engine 10 in accordance with an embodiment where the intermediate member 186 is coupled to the aft liner segment 110. The aft liner segment 110 is coupled to the case 72 through the connecting member 74. The connecting member 74 includes a portion which is disposed between, i.e., compressed by, a first portion 78 of the case 72 and a second portion 80 of the case 72. The first and second portions 78 and 80 can correspond with different portions of the case 72 which are mated together. In certain instances, the connecting member 74 can utilize this mating point as a location for coupling with the case 72. Connecting member 74 may have windows to pass air to an aft side of the engine 10 or the aft liner segment 110.

FIGS. 38 to 43 depict other exemplary attachment protocol which can be utilized to secure the intermediate member 186 within the gas turbine engine 10.

Figure 38:
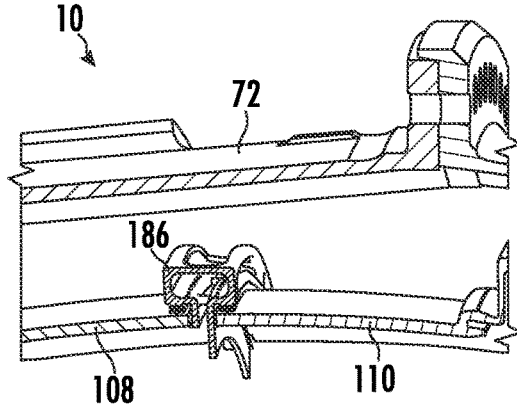
FIG. 38 is a partially cut away cross-sectional view of a free floating intermediate member in accordance with an exemplary embodiment of the present disclosure.

Referring initially to FIG. 38, in an embodiment, the intermediate member 186 can be configured to float relative to at least one of the case 72, the forward liner segment 108, the aft liner segment 110, or a combination thereof. As used herein, the term "float" is intended to refer to a non-fixed connection whereby two or more elements are configured to move relative to one another. In certain instances, floating connections can include press fit connections, spring loaded connections, and other adjustable interfaces whereby the two or more elements can move relative to one another. In the embodiment illustrated in FIG. 38, the intermediate member 186 is free floating relative to the case 72, the forward liner segment 108, and the aft liner segment 110. As used herein, "free floating" may refer to a condition with at least one degree of freedom (e.g., along the longitudinal centerline 12) relative to the feature of reference. For example, the intermediate member 186 may have at least one degree of freedom relative to the forward liner segment 108, the aft liner segment 110, or both. In such a manner, the intermediate member 186 can be moveable relative to at least one of the forward liner segment 108 or aft liner segment 110 in at least one way, e.g., the longitudinal centerline 12. Alternatively, the intermediate member 186 may define at least two degrees of freedom (e.g., along both the longitudinal centerline 12 and the radial direction) relative to the forward liner segment 108, the aft liner segment 110, or both. The free floating intermediate member 186 may thus be free to move in at least two ways, e.g., the longitudinal and radial directions, relative to at least one of the forward and aft liner segments 108 or 110.

The intermediate member 186 forms a press fit, or the like, with the forward and aft liner segments 108 and 110.

Figure 39:
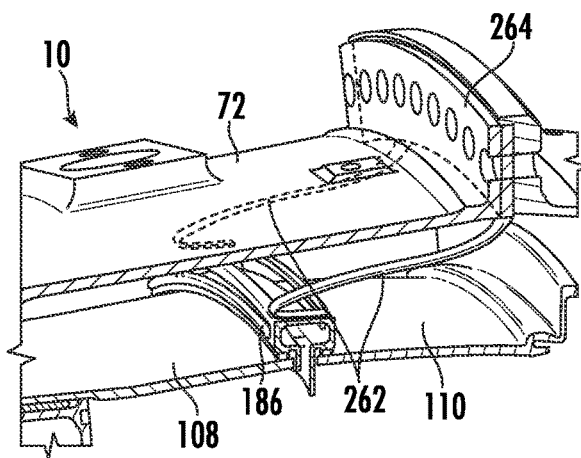
FIG. 39 is a partially cut away cross-sectional view of a free floating intermediate member in accordance with an exemplary embodiment of the present disclosure.

FIG. 39 illustrates an embodiment where the intermediate member 186 is free floating. However, unlike the embodiment depicted in FIG. 38, the embodiment depicted in FIG. 39 includes one or more rods 262 extending from the case 72 to bias the intermediate member 186. As used herein, the term "bias" is intended to refer to the application of force so as to load an element which may or may not cause that element to move. The one or more rods 262 may form a spring bias against the intermediate member 186, biasing the intermediate member 186 into at least one of the forward or aft liner segments 108 or 110. The rods 262 can be secured to the case 72 through an intermediate member 264 which is coupled to the case 72, such as through one or more threaded or non-threaded fasteners.

Figure 40:
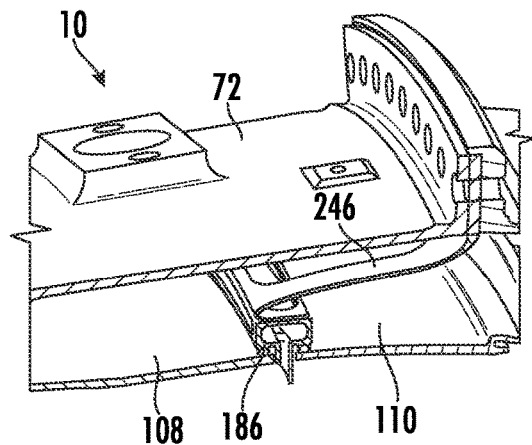
FIG. 40 is a partially cut away cross-sectional view of a free floating intermediate member in accordance with an exemplary embodiment of the present disclosure.

FIG. 40 illustrates an embodiment where the intermediate member 186 is free floating. However, similar to the embodiment depicted in FIG. 39, the embodiment depicted in FIG. 40 utilizes the support 246 to bias the intermediate member 186. The support 246 includes window 248 to permit flow of cooling medium downstream of the support 246.

Figure 41:
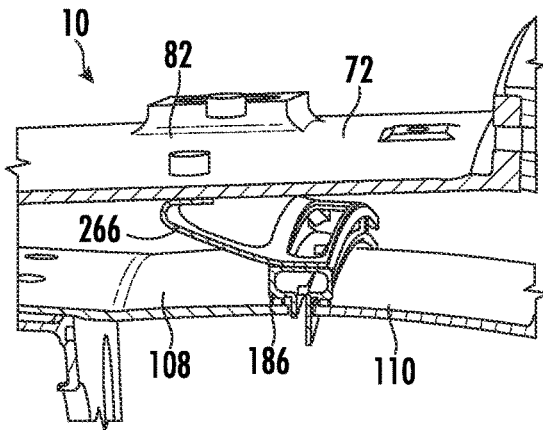
FIG. 41 is a partially cut away cross-sectional view of a free floating intermediate member in accordance with an exemplary embodiment of the present disclosure.

FIG. 41 illustrates an embodiment where the intermediate member 186 is free floating. However, unlike the embodiments depicted in FIGS. 39 and 40, the embodiment depicted in FIG. 41 utilizes a support 266 coupled to a combustor middle case portion 82 disposed upstream of the intermediate member 186. That is, the intermediate member 186 can be biased from a support 246 extending from a position longitudinally downstream of the intermediate member 186 or from a support 266 extending from a position longitudinally upstream of the intermediate member 186. Alternatively, a support approximately longitudinally centered on the intermediate member 186 can also be used.

Figure 42:
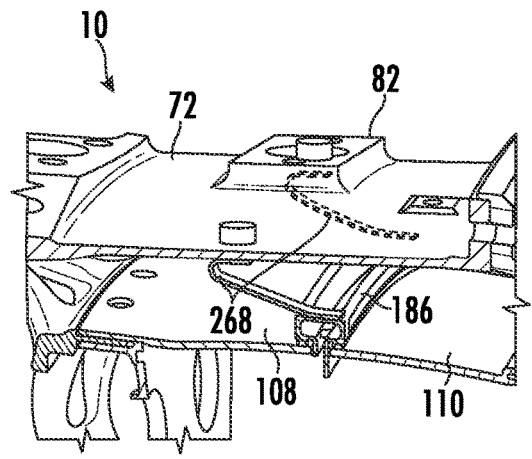
FIG. 42 is a partially cut away cross-sectional view of a free floating intermediate member in accordance with an exemplary embodiment of the present disclosure.

FIG. 42 illustrates an embodiment where the intermediate member is coupled to the combustor middle case portion 82 using rods 268 extending from the case 72 to bias the intermediate member 186.

Figure 43:
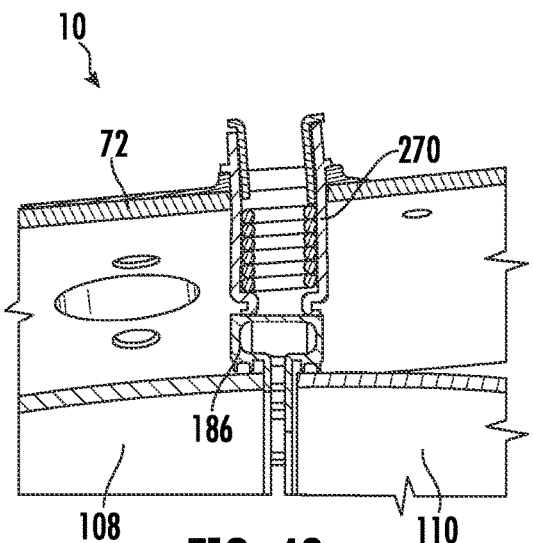
FIG. 43 is a partially cut away cross-sectional view of a free floating intermediate member in accordance with an exemplary embodiment of the present disclosure.

FIG. 43 illustrates an embodiment where the intermediate member 186 is free floating. However, the intermediate member 186 is biased by a spring-loaded element 270 configured to generate biasing force through compression of a spring, e.g., a helical spring. The spring-loaded element 270 can extend generally between the intermediate member 186 and the case 72.

Figure 44:
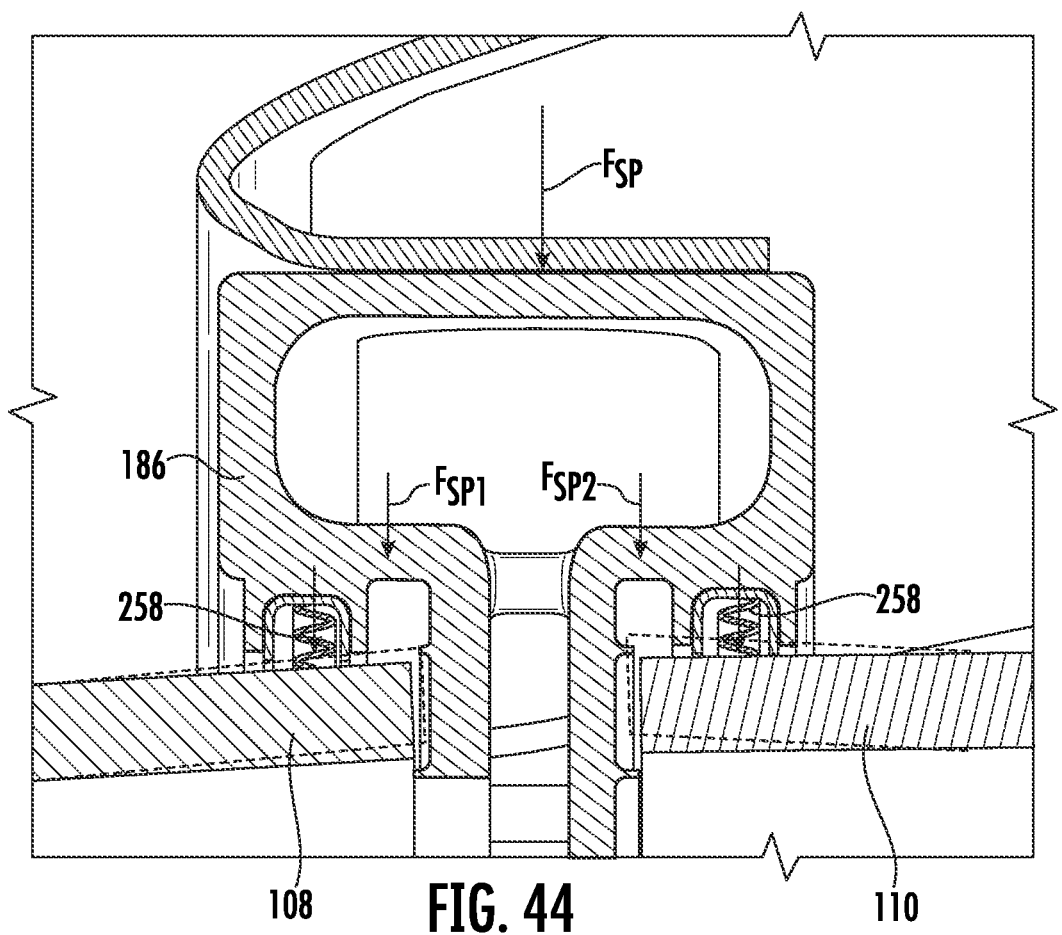
FIG. 44 is an enlarged cross-sectional view illustrating forces transferred through the intermediate member in accordance with an exemplary embodiment of the present disclosure.

FIG. 44 illustrates a vector diagram of forces acting on or through the intermediate member 186. The forces can include a force, $F_{SP}$, biasing the intermediate member 186. The force, $F_{SP}$, can be generated, for example, by the support 246, the support 266, the rods 262, or the rods 268. The force, $F_{SP}$, can bias the intermediate member 186 into the forward and aft liner segments 108 and 110. In particular, the force, $F_{SP}$, can be split into two components, $F_{SP1}$ and $F_{SP2}$, with $F_{SP1}$ biasing the forward liner segment 108 and $F_{SP2}$ biasing the aft liner segment 110. In an embodiment, the two forces, $F_{SP1}$ and $F_{SP2}$ can bias the forward and aft liner segments 108 and 110, respectively, through the spacers 258. In this regard, in certain embodiments, the spacers 258 can be configured to deform to absorb some of the radial loading force created by $F_{SP}$. The two forces, $F_{SP1}$ and $F_{SP2}$, can bias the forward and aft liner segments 108 and 110 to control radial deflection (which is shown by dashed lines). In certain instances, $F_{SP}$ can be tuned to provide a desired biasing force in view of material selection for one or both of the forward or aft liner segments 108 or 110, the operational conditions of the gas turbine engine 10, or the like. Tuning of $F_{SP}$ can be performed, for example, through material selection of the support 246 or 266 or rods 262 or 268, through design choice, and the like.

Figure 45:
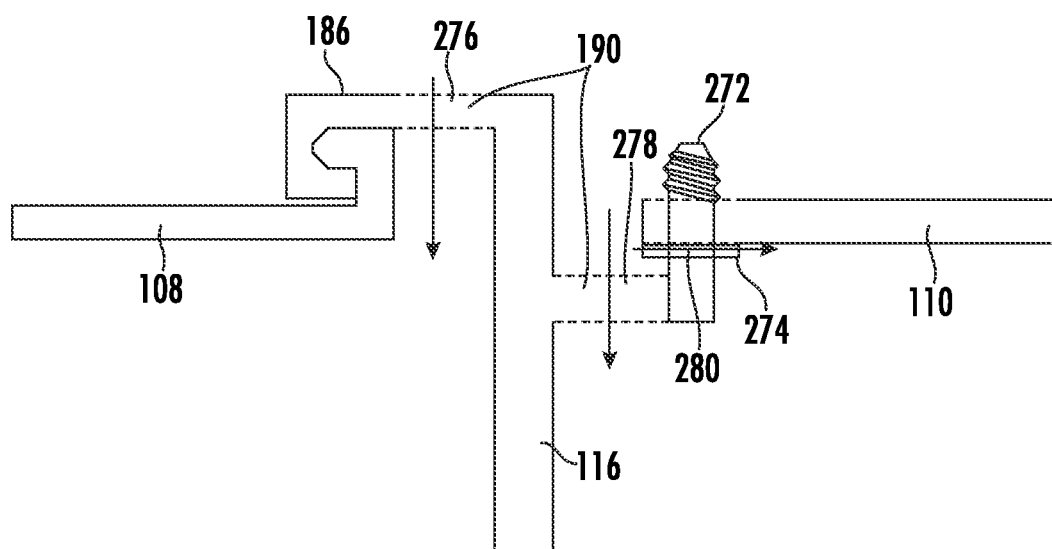
FIG. 45 a cross-sectional view of an outer liner and intermediate member of a combustion section of a gas turbine engine in accordance with an exemplary embodiment of the present disclosure.

As previously described with respect to FIGS. 22 and 23, in certain instances, the intermediate member 186 can be coupled to the forward or aft liner segment 108 or 110. Additional exemplary attachment protocols for attaching the intermediate member 186 to the forward or aft liner segment 108 or 110 are illustrated in FIGS. 45 to 50. Referring initially to FIG. 45, the forward and aft liner segments 108 and 110 can be connected to the intermediate member 186 each using different attachment protocol. By way of non-limiting example, the forward liner segment 108 can be coupled to the intermediate member 186 through a press fit, or swage fit. The aft liner segment 110 can receive an extension 272 from the intermediate member 186. The extension 272 may be threaded and configured to receive a nut to couple the aft liner segment 110 to the intermediate member 186. A spacer 274, such as a washer, can be disposed along the extension 272 so as to form an opening extending in the longitudinal direction between the intermediate member 186 and aft liner segment 110. The intermediate member 186 depicted in FIG. 45 can thus effectively define three windows 190—a first window 276 disposed in front of the fence 116, a second window 278 disposed behind the fence 116, and a third window 280 disposed behind the second window 278.

Figure 46:
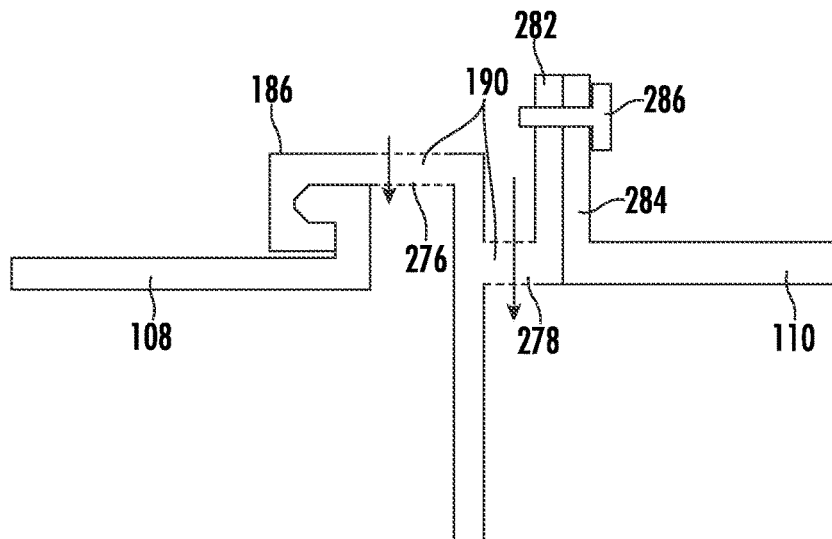
FIG. 46 a cross-sectional view of an outer liner and intermediate member of a combustion section of a gas turbine engine in accordance with an exemplary embodiment of the present disclosure.

FIG. 46 illustrates another attachment protocol where the intermediate member 186 includes a flange 282 configured to be engaged with a flange 284 of the aft liner segment 110. A fastener, such as a bolt 286, can couple the flanges 282 and 284 together. In another embodiment, the flanges 282 and 284 can be coupled together through a brazing process, a weld, a fluid coupling, or another type of engagement interface. In the illustrated embodiment, the flange 282 is disposed downstream of the second window 278 of the windows 190. In another embodiment, the flange 282 can be disposed upstream of the second window 278 or at any other relative position.

Figure 47:
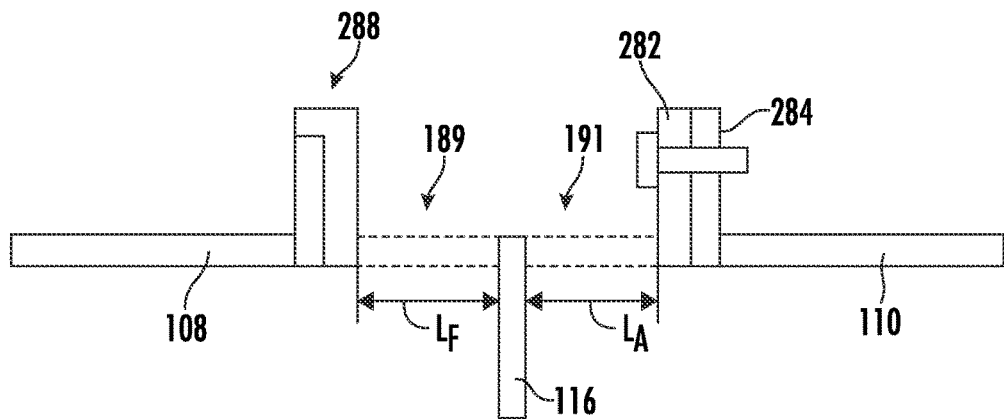
FIG. 47 a cross-sectional view of an outer liner and intermediate member of a combustion section of a gas turbine engine in accordance with an exemplary embodiment of the present disclosure.

FIG. 47 illustrates another attachment protocol where the intermediate member 186 is coupled to the aft liner segment 110 using the same protocol as that described above with respect to FIG. 46. The forward liner segment 108 is coupled to the intermediate member 186 using a rabbit fit 288. The fence 116 is equidistant, or approximately equidistant, from the forward liner segment 108 and the aft liner segment 110. In an embodiment, the fence 116 can be disposed closer to the forward liner segment 108 or aft liner segment 110. In certain instances, the fence 116 can define a forward window 189 disposed upstream of the fence 116 and an aft window 191 disposed downstream of the fence 116. A ratio of a length, $L_F$, of the forward window 189 to a length, $L_A$, of the aft window 191 [$L_F:L_A$] can be in a range of 0.1:10 and 10:0.1. In a particular embodiment, the ratio $L_F:L_A$ is in a range of 1:9 and 9:1. The relative ratio of $L_F:L_A$ can affect the turbulent kinetic energy (TKE) at the trailing edge of the fence 116 and thus improve mixing and reducing $NO_X$ formation.

Figure 48:
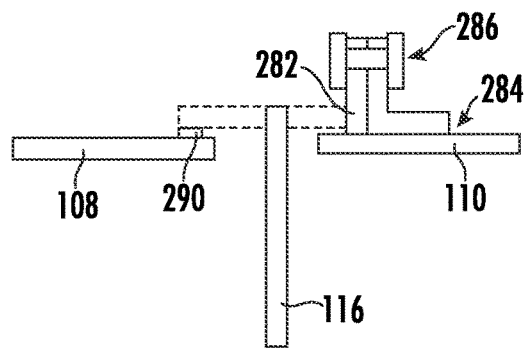
FIG. 48 a cross-sectional view of an outer liner and intermediate member of a combustion section of a gas turbine engine in accordance with an exemplary embodiment of the present disclosure.

FIG. 48 illustrates another attachment protocol where the flange 282 of the intermediate member 186 is coupled to the flange 284 of the aft liner segment 110. However, unlike FIG. 46, in the embodiment depicted in FIG. 48, the flange 284 comprises a discrete piece from the aft liner segment 110. The flange 284 can be coupled to the aft liner segment 110 through welding, brazing, through one or more fasteners, or the like. The flanges 282 and 284 can be coupled together through the bolt 286, a rivet, or the like. The intermediate member 186 can be attached to the forward liner segment 108 through, e.g., swaged fit, press fit, brazed, welded, or the like. In certain instances, a separate element 290 can be disposed between the intermediate member 186 and the forward liner segment 108.

FIG. 49 illustrates another attachment protocol where the intermediate member 186 is coupled to the forward liner segment 108 through a swaged fit and the intermediate member 186 is coupled to the aft liner segment 110 through a swage fit with another separate element 292.

FIG. 50 illustrates another attachment protocol where the separate element 292 is coupled to the aft liner segment 110, e.g., through a welding operation, and a bolting insert is receivable in the separate element 292. A bolt 294 can be inserted through the intermediate member 186 and secure with the bolting insert to couple the intermediate member 186 to the aft liner segment 110.

In an embodiment, the intermediate member 186 can have a multi-piece construction. For example, referring to FIG. 51, in an embodiment the intermediate member 186 can include a plurality of segments 193 which together form an annular body. In an embodiment, the segments 193 can be positioned in use such that at least two adjacent segments 193 are spaced apart from each other by a gap 195 in the circumferential direction. The gap 195 can allow cooling medium to enter the combustion chamber 106. The gap 195 can be configured to accommodate deformation of the segments 193, such as caused, for example, by thermal expansion during use. In an embodiment, the gap 195 can define a gap distance, as measured between adjacent segments 193, in a range of 0.01 mm and 5 mm, such as in a range of 0.1 mm and 1 mm. In a particular embodiment, the gap distance is in a range of 0.25 mm and 0.5 mm. Use of an intermediate member 186 having a multi-piece construction, e.g., including segments 193, can allow easier replacement of damaged portions of the intermediate member 186. For instance, during servicing and repair operations, only damaged segments 193 need to be replaced while other (nondamaged) segments 193 remain unchanged. FIG. 52 illustrates a view of the gap 195 between adjacent segments 193.

Figure 53:
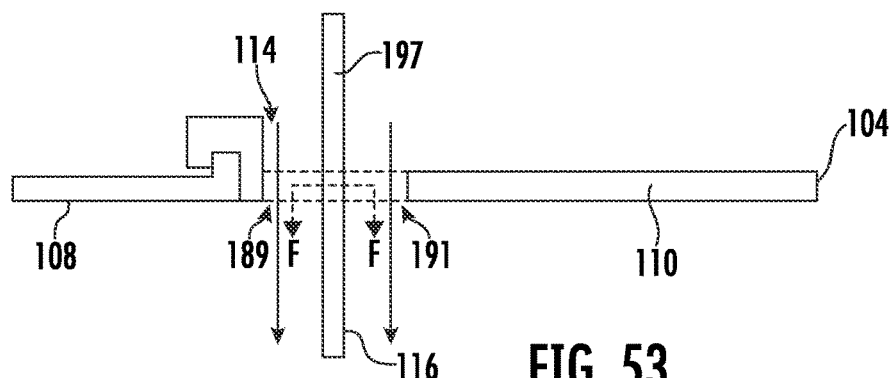
FIG. 53 is a radial view of an outer liner and a fence of a combustion section of a gas turbine engine in accordance with an exemplary embodiment of the present disclosure.

FIG. 53 illustrates an embodiment similar to the one depicted in FIG. 47 in that the fence 116 splits the dilution slot 114 into forward and aft windows 189 and 191. However, unlike the embodiment depicted in FIG. 47, the fence 116 in the embodiment illustrated in FIG. 53 is formed from the aft liner segment 110. In a non-illustrated embodiment, the fence 116 can instead be formed from the forward liner segment 108. A portion 197 of the outer liner 104 is depicted extending in radially outward direction into a cold side passage of the gas turbine engine 10. The portion 197 may be integral with the fence 116. While the fence 116 and portion 197 are depicted as lying along a common plane, in other embodiments the fence 116 and portion 197 may be offset in the longitudinal direction. The forward and aft liner segments 108 and 110 can be joined together through any suitable technique, such as for example, brazing, welding, one or more fasteners, or the like.

Figure 54:
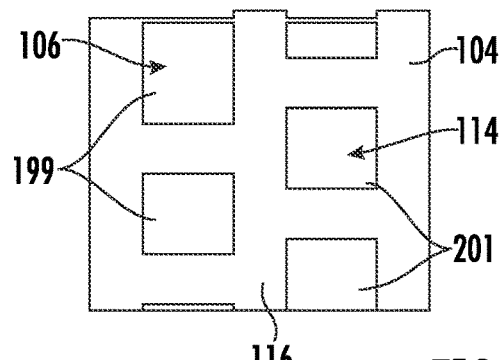
FIG. 54 is a partial cross-section of a segment of a fence with a fastener coupling the segment to an outer liner of the gas turbine engine in accordance with an exemplary embodiment of the present disclosure.

FIG. 54 illustrates a cross-sectional view of the outer liner 104 as seen along Line F-F in FIG. 53. The fence 116 extends through the center of the dilution slot 114. One or more forward windows 199 can be formed upstream of the fence 116. One or more aft windows 201 can be formed downstream of the fence 116. In certain instances, the forward and aft windows 199 and 201 can have the same number of windows as compared to one another. In other instances, the forward and aft windows 199 and 201 can have a different number of windows as compared to one another. The one or more forward windows 199 can be aligned or staggered in the circumferential direction with respect to the one or more aft windows 201. In an embodiment, the forward windows 199 can be configured to pass more cooling medium into the combustion chamber 106 as compared to the aft windows 201. It should be understood that forward and aft windows 199 and 201 can be used with other embodiments described herein. For instance, by way of non-limiting example, the embodiments of FIGS. 7 to 10 and 15 to 21 can additionally include aft windows 201 disposed downstream of the fence 116.

Figure 55:
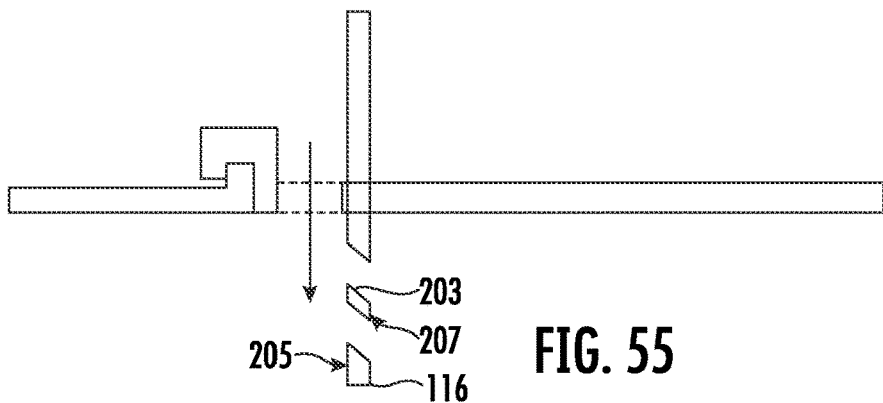
FIG. 55 is a longitudinal view of a fence including a plurality of segments in accordance with an exemplary embodiment of the present disclosure.

FIG. 55 illustrates an embodiment where the fence 116 includes a plurality of passageways 203 extending from a forward side 205 of the fence 116 to an aft side 207 of the fence 116. The passageways 203 can pass cooling medium through the fence 116 to cool the outer liner 104. The passageways 203 can include a plurality of holes. Each hole can extend through the fence 116 in one or more straight line segments or one or more arcuate segments. In an embodiment, at least one of the passageways 203 has a central axis oriented normal to at least one of the forward and aft sides 205 or 207 of the fence 116. The passageways 203 can provide a protective layer of cooling medium on the aft liner segment 110 and wash off trapped hot gasses. In another embodiment, at least one of the passageways 203 has a central axis canted at an angle with respect to at least one of the forward and aft sides 205 or 207 of the fence 116. For instance, central axis of the passageway 203 may be angularly offset from the forward side 205 of the fence 116 by at least 10 degrees, such as at least 20 degrees, such as at least 30 degrees, such as at least 40 degrees.

Figure 56:
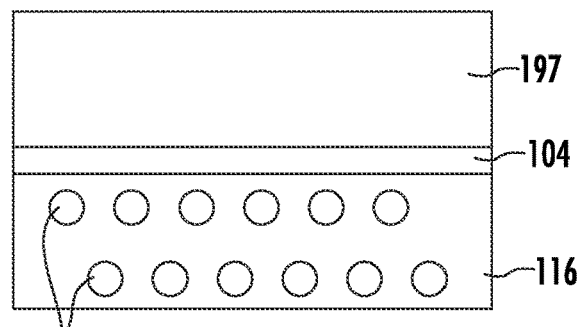
FIG. 56 is a side view of a fence including a plurality of segments in accordance with an exemplary embodiment of the present disclosure.

FIG. 56 illustrates a longitudinal view of the fence 116 including passageways 203 arranged in a staggered pattern. In another embodiment, the passageways 203 can be aligned in one or more rows or columns. The outer liner 104 is disposed between the fence 116 and the portion 197 extending radially outward.

FIGS. 57 to 62 illustrate another embodiment of the outer liner 104 including a fence 296 configured to be coupled therewith. The fence 296 can be similar to the fence 116 previously described. However, in the embodiments depicted in FIGS. 57 to 62, the fence 296 does not extend through the dilution slot 114. Instead, the fence 296 is coupled directly to an inside of the outer liner 104, such as an inside of the aft liner segment 110. The fence 296 can be coupled to the aft liner segment 110 at a location longitudinally downstream of the dilution slot 114. One or more scooped interfaces 148 can be formed along the outer liner 104 to generate air flow into the dilution slot 114. The air flow can form a film, as previously described, against the fence 296 so as to be injected further into the combustion chamber 106.

Figure 57:
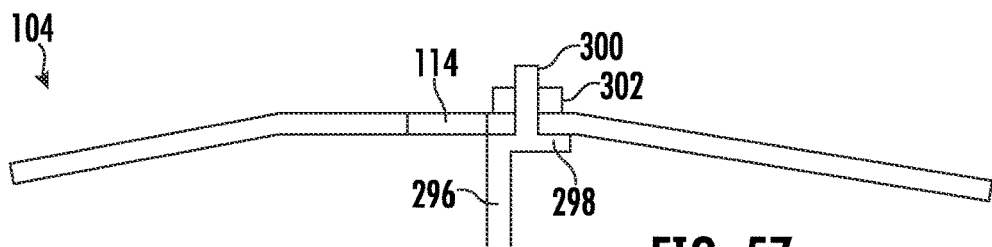
FIG. 57 is a radial view of an outer liner and an intermediate member of a combustion section of a gas turbine engine in accordance with an exemplary embodiment of the present disclosure.
Figure 58:
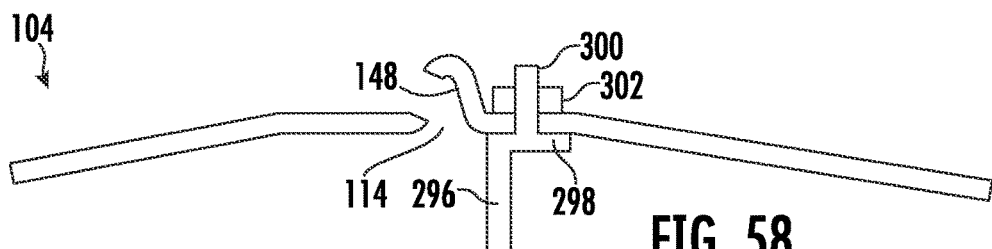
FIG. 58 is a cross-sectional view of the outer liner and intermediate member of FIG. 57 as seen along Line C-C in FIG. 57.
Figure 59:
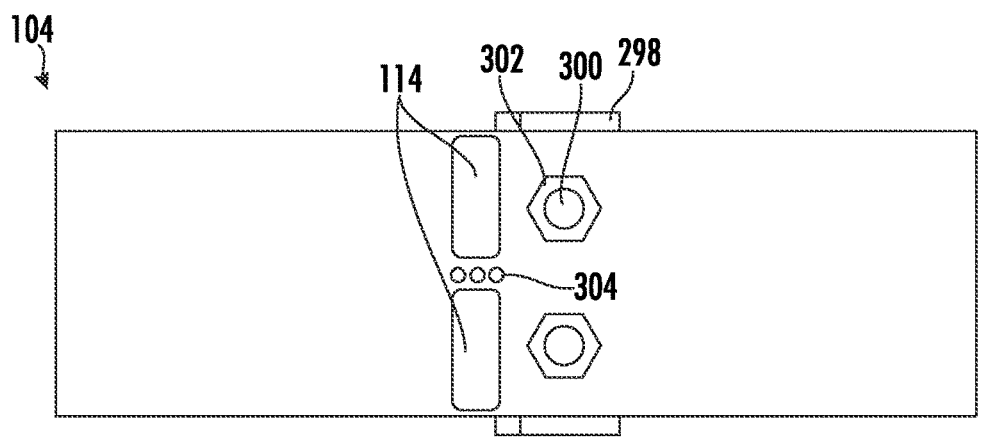
FIG. 59 is a cross-sectional view of a portion of the intermediate member of FIG. 58 as seen along Line D-D in FIG. 58.
Figure 60:
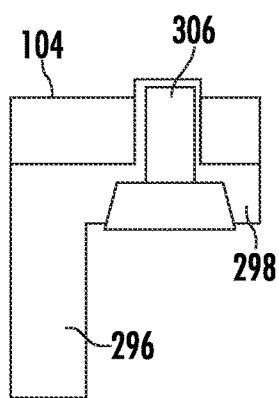
FIG. 60 is a partial cross-section of a segment of a fence with a fastener coupling the segment to an outer liner of the gas turbine engine in accordance with an exemplary embodiment of the present disclosure.

Referring to FIGS. 57 to 59, the fence 296 can extend from a support, such as a flange 298, configured to be coupled to the outer liner 104. The flange 298 can include an extension 300 configured to pass through an opening in the outer liner 104 and be secured therewith by a securing element, such as a nut 302. As illustrated in FIG. 59, the outer liner 104 can include one or more holes 304 disposed between adjacent dilution slots 114. The holes 304 can form purge openings which can reduce, or even eliminate, secondary recirculation zones. Reduction or elimination of secondary recirculation zones may facilitate creation of a more annular sheet of dilution air flowing from the dilution slots 114 to the combustion chamber 106. This can significantly reduce $NO_X$ and increase engine performance.

Figure 61:
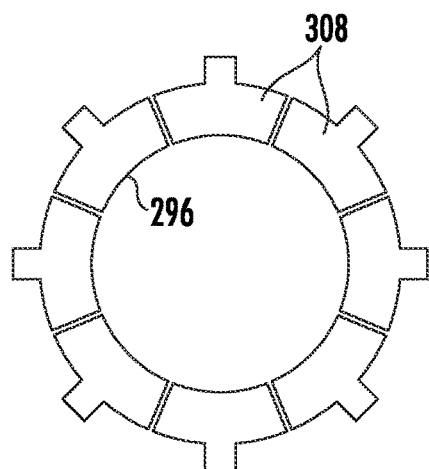
FIG. 61 is a longitudinal view of a fence including a plurality of segments in accordance with an exemplary embodiment of the present disclosure.

FIG. 61 illustrates a simplified cross-sectional view of another embodiment where the fence 296 is coupled to the outer liner 104 by a fastener 306 extending through the flange 298. The fastener 306 may be secured to the aforementioned nut 302, another securing element, through a mechanical or structural action to the fastener 306, or the like.

Figure 62:
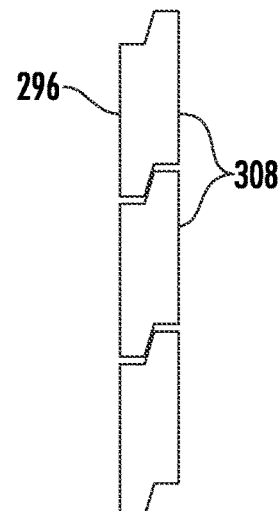
FIG. 62 is a side view of a fence including a plurality of segments in accordance with an exemplary embodiment of the present disclosure.

In certain instances, the fence 296 can have a multi-piece construction. For example, the fence 296 can include a plurality of segments 308 which together form an annular body. FIG. 61 illustrates a longitudinal view of the plurality of segments 308 arranged as they may appear during use in accordance with an exemplary embodiment. FIG. 62 illustrates a side view of the fence 296, showing some of the segments 308, from a side view. As illustrated in FIG. 62, in certain instances the segments 308 may be configured to overlap one another. In an embodiment, at least one adjacent pair of segments 308 can define an interlocking shape configured to maintain the segments 308 in a desired position relative to one another. In the depicted embodiment, the interlocking shape is a stepped shape shared by adjacent segments 308.

Figure 63:
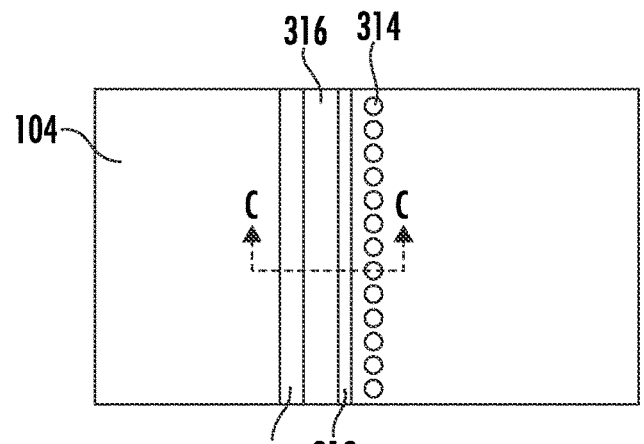
FIG. 63 is a radial view of an outer liner and an intermediate member of a combustion section of a gas turbine engine in accordance with an exemplary embodiment of the present disclosure.
Figure 64:
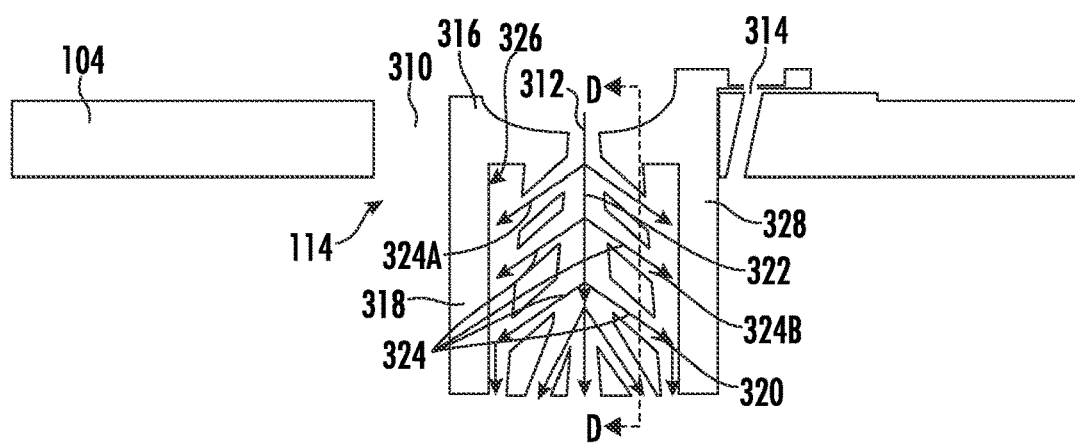
FIG. 64 is a cross-sectional view of the outer liner and intermediate member of FIG. 57 as seen along Line C-C in FIG. 63.

FIG. 63 depicts an exemplary embodiment of the outer liner 104 as seen in a radial view in a direction toward the combustion chamber 106. The outer liner 104 and an intermediate member 316 can define a plurality of rows of openings extending around the circumference of the outer liner 104 in the circumferential direction. The openings can include a first opening 310, a second opening 312, and a third opening 314. All of the openings 310, 312, and 314 can be in fluid communication with the combustion chamber 106. The relative amount of air passing through the openings 310, 312, and 314 can be tuned. For instance, the first opening 310 may be configured to pass 5% to 95% of the cooling medium into the combustion chamber 106 while the second opening 312 can be configured to pass the remaining, or a majority of the remaining, cooling medium into the combustion chamber 106. At least two of the first, second and third openings 310, 312, or 314 can define a multi-stage cooling arrangement. The multi-stage cooling arrangement can be configured to cool the combustion chamber 106, improve efficiency and performance, and decrease $NO_X$ emissions. For instance, the first openings 310 can represent a first cooling stage configured to pass cooling medium into the combustion chamber 106 upstream of the fence 318 (FIG. 64). The second openings 312 can represent a second cooling stage configured to pass cooling medium into the combustion chamber 106 through the fence 318. The third openings 314 can represent a third cooling stage configured to pass cooling medium into the combustion chamber 106 downstream of the fence 318.

In an embodiment, cooling medium entering the first opening 310 can reduce temperature of the intermediate member 316 at the fence 318, form a flow of cooling medium against the fence 318 to prevent oxidizing the surface of the leading surface of the fence 318. Cooling medium passing through the second opening 312 can cool the back surface 326 of the fence 318 and the internal structure of the intermediate member 316. Differences in velocity of the cooling medium passing through the first opening 310 and the second opening 312 can form a shear layer within the combustion chamber 106 which can improve mixing of dilution air with products from the primary zone so that the temperature in the core of the combustion chamber 106 is lowered, which can reduce $NO_X$ emissions. Cooling medium passing through the second opening 312 can also act as a hydraulic support, i.e., form a high velocity film of dilution air entering the combustion chamber 106 upon which the cooling medium passing through the first opening 310 can be supported. As a result, cooling medium penetrates further into the combustion chamber 106. This can reduce temperature in the center of the combustion chamber and reduce $NO_X$ emissions.

In an embodiment, at least two of the openings can be associated with the dilution slot 114. For instance, referring to FIG. 64, the first opening 310 can be disposed upstream of an intermediate member 316 and extend through the dilution slot 114. The second opening 312 can extend through the intermediate member 316 and thus through the dilution slot 114. The third opening 314 can be disposed behind the intermediate member 316. For instance, the third opening 314 can extend through the aft liner segment 110.

The intermediate member 316 can include any one or more of the features or characteristics as described above with respect to the intermediate member 316. In an embodiment, the intermediate member 316 can define a fence 318 including any one or more of the features or characteristics as described above with respect to the fence 116. The fence 318 is depicted in FIG. 64 at an upstream end of the intermediate member 316. The fence 318 can facilitate turning of cooling medium entering the first opening 310 and direct the cooling medium into the combustion chamber 106.

In certain instances, the intermediate member 316 may be referred to as a cool fence. Cooling can be performed by passing cooling medium through one or more internal passageways 320 of the intermediate member 316, including for example, through a main internal passageway 322 extending into the combustion chamber 106 and one or more secondary internal passageways 324 branching off the main internal passageway 322. Cooling medium can enter the third opening 312 and pass through at least one of the main internal passageway 322 and one or more secondary internal passageways 324 and enter the combustion chamber 106. Cooling medium passing through the one or more secondary internal passageways 324 may pass along a back surface 326 of the fence 318 at a leading side of the intermediate member 316 and a back wall 328 of the intermediate member 316. The secondary internal passageways 324 can converge towards each other to create a relatively lower pressure at the exits of the secondary internal passageways 324. This may pull more flow of cooling medium closer to the core of the combustion chamber 106.

In an embodiment, cooling medium can pass through an upstream secondary internal passageways 324A at a first volumetric flow rate and cooling medium can pass through a downstream secondary internal passageway 324B at a second volumetric flow rate less than the first volumetric flow rate. For instance, a ratio of the first volumetric flow rate to the second volumetric flow rate may be at least 1.5:1, such as at least 2:1, such as at least 3:1, such as at least 4:1. This may enhance cooling along the fence 318 where temperatures may be highest. Additionally, cooling medium may penetrate further into the core of the combustion chamber 106 when emerging from the upstream secondary internal passageway 324A. The back wall 328 can be cooled by the downstream secondary internal passageway 324B before cooling flow is discharged into the combustion chamber 106.

In an embodiment, an entrance of the second opening 312 can have a recessed profile, such as a curved shape (e.g., a bowl shape) recessed into a body of the intermediate member 316. Use of a recessed profile can facilitate increased air flow, e.g., to the one or more internal passageways 320 of the intermediate member 316.

In an embodiment, the first opening 310 can define a height, as measured in the longitudinal direction, of at least 1 mil, such as at least 5 mils, such as at least 20 mils, such as at least 50 mils, such as at least 95 mils. In another embodiment, the second opening 312 can define a height, as measured in the longitudinal direction, of at least 1 mil, such as at least 5 mils, such as at least 20 mils, such as at least 30 mils. In another embodiment, the intermediate member 316 can have a dimension, as measured in the radial direction, of at least 50 mils, such as at least 75 mils, such as at least 100 mils, such as at least 150 mils, such as at least 200 mils, such as at least 250 mils, such as at least 275 mils.

Figure 65:
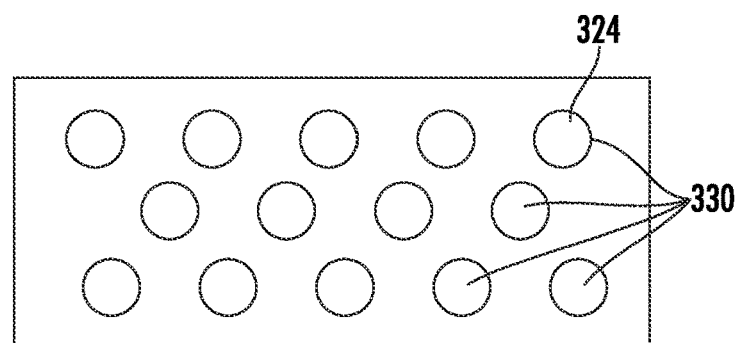
FIG. 65 is a cross-sectional view of a portion of the intermediate member of FIG. 58 as seen along Line D-D in FIG. 64.

FIG. 65 illustrates an exemplary view of exits of the secondary internal passageway 324 as seen along line D-D in FIG. 64. Each cooling hole 330 of the secondary internal passageways 324 can be staggered to provide increased cooling performance. The cooling holes 330 can be arranged in rows, columns, staggered arrangements, random placement, or in another suitable spatial arrangement.

Figure 66:
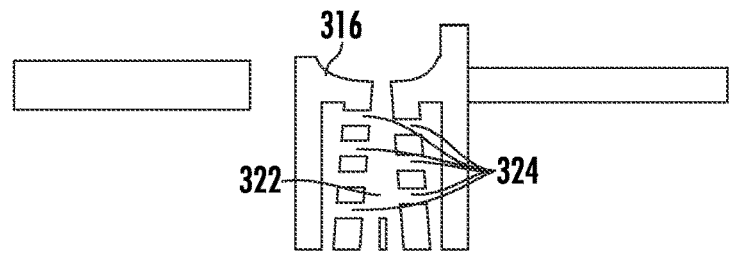
FIG. 66 is a cross-sectional view of the outer liner and intermediate member of FIG. 57 as seen along Line C-C in FIG. 63.
Figure 67:
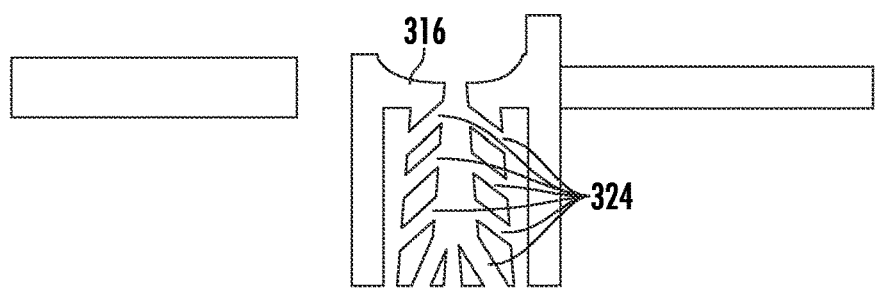
FIG. 67 is a cross-sectional view of the outer liner and intermediate member of FIG. 57 as seen along Line C-C in FIG. 63.

Referring to FIG. 66, in certain embodiments, the secondary internal passageways 324 can have tangential flow directions relative to the main internal passageway 322. Tangential flow directions may impart uniform, or generally uniform, flow on the back wall 328 and fence 318 to cool the back wall 328 and fence 318. The swirl flow can then be discharged into the combustion chamber 106 with a high amount of swirl that further helps improve turbulence of the cooling medium and contents in the combustion chamber 106. Improved turbulence may improve mixing of dilution/cooling air with the combustion products of the gases 70. This reduces temperature in the center of the combustion chamber 106 and thus reduce $NO_X$. Cooling holes can also be configured to have axial directions such that they impinge on the fence 318 and back wall 328 at a 90 degree, or approximately 90 degree, angle. FIG. 67 illustrates another embodiment of the intermediate member 316 without the back wall 328 (FIG. 65). The secondary internal passageways 324 can thus discharge cooling medium directly into the combustion chamber 106.

Figure 68:
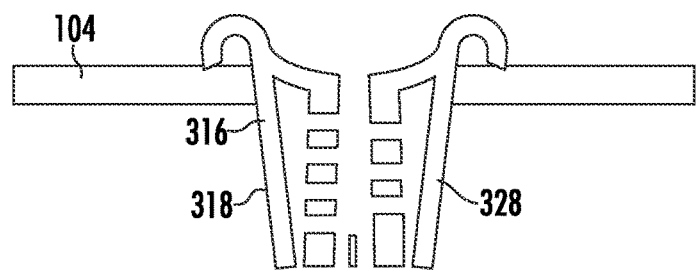
FIG. 68 is a cross-sectional view of the outer liner and intermediate member of FIG. 57 as seen along Line C-C in FIG. 63.

FIG. 68 illustrates an embodiment of the intermediate member 316 where at least one of the fence 318 or back wall 328 are converging. That is, at least one of the fence 318 or back wall 328 can be canted, or angularly offset, from a tangential orientation relative to the outer liner 104. Converging fence 318 or back wall 328 can form the cooling medium passing through the intermediate member 316 into a more discrete plane which can further improve penetration of the cooling medium into the combustion chamber 106. In instances where the fence 318 and back wall 328 are both converging, the fence 318 and back wall 328 can have different angles relative to each other. For instance, the fence 318 can be canted at a first angle relative to a tangential direction and the back wall 328 can be canted at a second angle relative to the tangential direction, wherein absolute values of the first and second angles are different from one another. By converging the flow at one location, high turbulence levels can be achieved. This can improve mixing of dilution air with incoming primary zone products. Furthermore, internal passages can be oriented perpendicular to the outer liner 104 such that cooling passages within the fence 318 converge. This can cause lower pressure as the cooling flow path converges and can drive more cooling flow into the combustion chamber 106.

Figure 69:
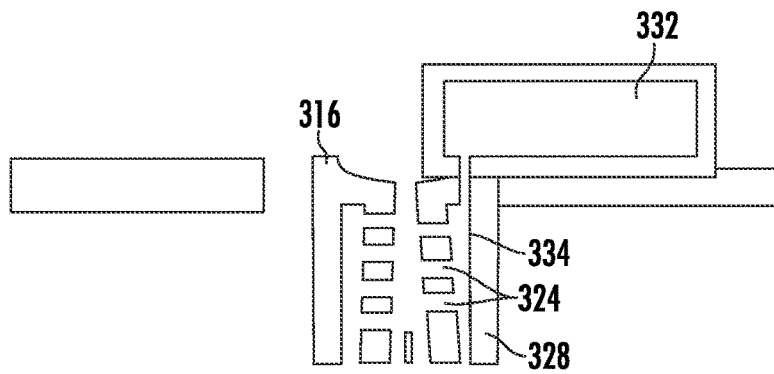
FIG. 69 is a cross-sectional view of the outer liner and intermediate member of FIG. 57 as seen along Line C-C in FIG. 63.

FIG. 69 illustrates an embodiment of the intermediate member 316 including a damper 332. The damper 332 can be a cold side damper which can provide additional volume 334 to the intermediate member 316 along a backside of the intermediate member 316. Alternatively, or in addition, the damper 332 can be a hot side damper. The damper 332 can reduce frequencies of vibration in the combustion chamber. The damper 332 can capture a broad range of frequencies of vibration. The specific shape or size of the damper 332 can be tuned in view of the vibrations encountered during operation. In certain instances, the damper 332 can include a plurality of discrete dampers 332 each configured to operate on a particular frequency, or range of frequencies, of vibration. The damper 332 can be compartmentalized or otherwise segregated into multiple independent volumes or include one single volume. The volumes can be segmented circumferentially. Other configurations and positions for the damper 332 are possible.

Figure 70:
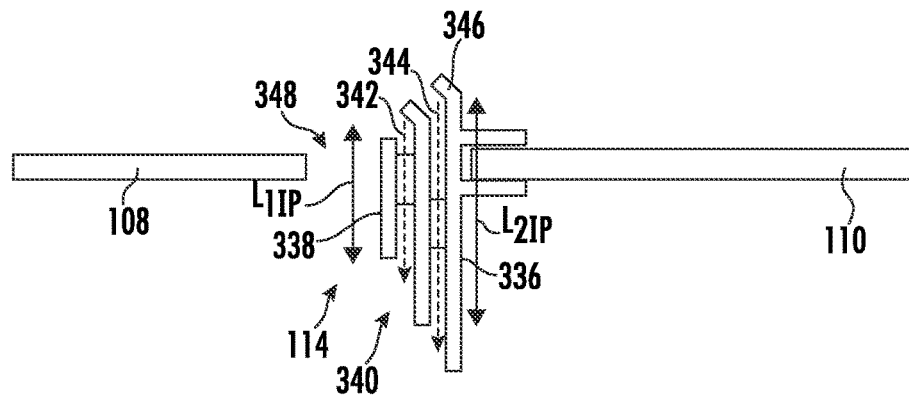
FIG. 70 is a cross-sectional view of the outer liner and intermediate member in accordance with an embodiment.

FIG. 70 illustrates an embodiment of an intermediate member 336 including a fence 338 having internal passageways 340. The internal passageways 340 can define a plurality of fluid passageways extending through the fence 338. In the depicted embodiment, the internal passageways 340 include a first internal passageway 342 and a second internal passageway 344. The first and second internal passageways 342 and 344 are illustrated extending in parallel in a direction generally toward the combustion chamber 106. In another embodiment, described below, at least a portion of at least one of the internal passageways 340 can lie along a different plane as compared to one or more of the other internal passageway(s) 340.

In an embodiment, the internal passageways 340 may all define the same relative lengths, as measured in the radial direction. In another embodiment, the internal passageways 340 may have variable lengths, as measured in the radial direction. For instance, the first internal passageway 342 can define a first length, $L_{1IP}$, that is less than a length, $L_{2IP}$, of the second internal passageway 344. In an embodiment, the most upstream of the internal passageways 340 may define the shortest length of the internal passageways 340. In another embodiment, the most downstream of the internal passageways 340 may define the longest length of the internal passageways 340.

In an embodiment, the intermediate member 336 can be disposed within the dilution slot 114 to form a gap 348 between the most upstream point of the intermediate member 336 and the most downstream point of the forward liner segment 108. Airflow can pass through the gap 348.

One or more scooped interfaces 346 can be configured to direct airflow into the internal passageways 340. As depicted, the scooped interfaces 346 can be disposed at a radially outer end of the internal passageways 340. The scooped interfaces 346 may be integral with the fence 338, or part of another component coupled therewith or integral to the outer liner 104.

The intermediate member 336 depicted in FIG. 70 is coupled to the aft liner segment 110 through an interference fit. However, other methods of attachment may be used in accordance with other embodiments or the intermediate member 336 can be free floating relative to the forward and aft liner segments.

Figure 71:
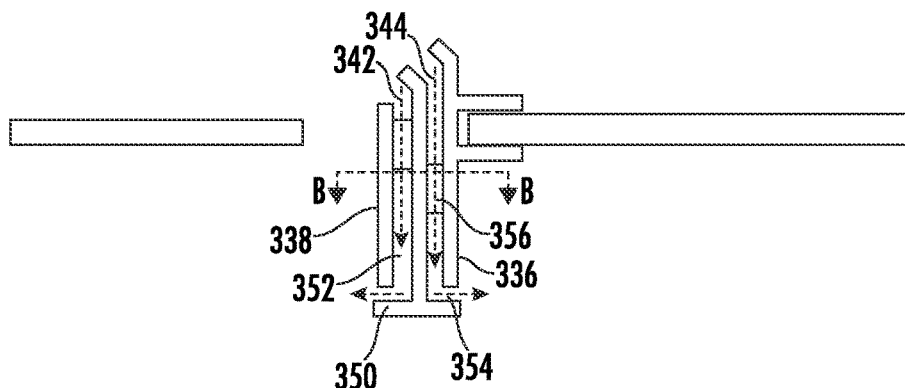
FIG. 71 is a cross-sectional view of the outer liner and intermediate member in accordance with another embodiment.

FIG. 71 illustrates another embodiment of the intermediate member 336 including the fence 338. The first internal passageway 342 includes a longitudinal portion 350 extending from a radial portion 352 in an upstream direction. The second internal passageway 344 includes a longitudinal portion 354 extending from a radial portion 356 in a downstream direction. Thus, airflow can be controlled and redirected into the combustion chamber 106 at a desired entry angle. While depicted at a right angle, the angle between the longitudinal portions 350 and 354 relative to the radial portions 352 and 356 may be different in certain embodiments. In such a manner, the longitudinal portions 350 and 354 can be angularly displaced from the longitudinal direction by at least 1°, such as by at least 5°, such as by at least 15°, such as by at least 30°, such as by at least 45°. In an embodiment, a gap formed between adjacent passageways (e.g., between the first internal passageway 342 and the second internal passageway 344) can be in a range of 0.01 inches and 0.1 inches.

Figure 72:
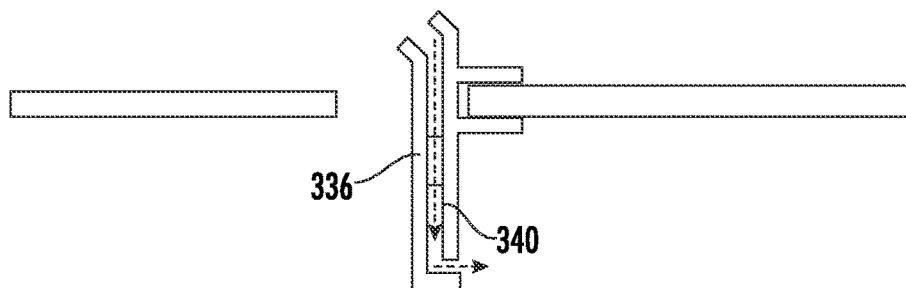
FIG. 72 is a cross-sectional view of the outer liner and intermediate member in accordance with another embodiment.

FIG. 72 illustrates an embodiment of the intermediate member 336 with a single internal passageway 340. The internal passageway 340 can be similar to the first internal passageway 342 or the second internal passageway 344. Alternatively, the internal passageway can have yet a different configuration. This can help to direct portions of the cooling medium towards the forward side of the combustor and other portions of the cooling medium towards the aft side of the combustor. This can reduce temperature in the combustor (particularly at the core of the combustor) and reduce $NO_X$ emissions.

Figure 73:
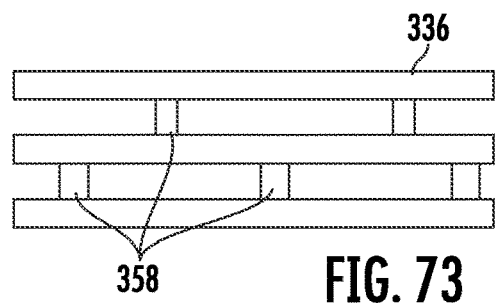
FIG. 73 is a cross-sectional view of the outer liner and intermediate member as seen along Line B-B of FIG. 71.

FIG. 73 illustrates a cross-sectional top view of the intermediate member 336 as seen along Line B-B in FIG. 71. As depicted, in certain instances, the intermediate member 336 includes internal ribs 358. The internal ribs 358 may be welded to or integral with the intermediate member 336. The internal ribs 358 may be formed of a similar material as the adjacent portion of the intermediate member 336 or include a different material. Exemplary materials include metal, alloys, ceramic-matrix composite (CMC), and the like. The internal ribs 358 can connect the walls of the intermediate member 336. In this regard, the internal ribs 358 may increase structural integrity of the intermediate member 336.

Figure 74:
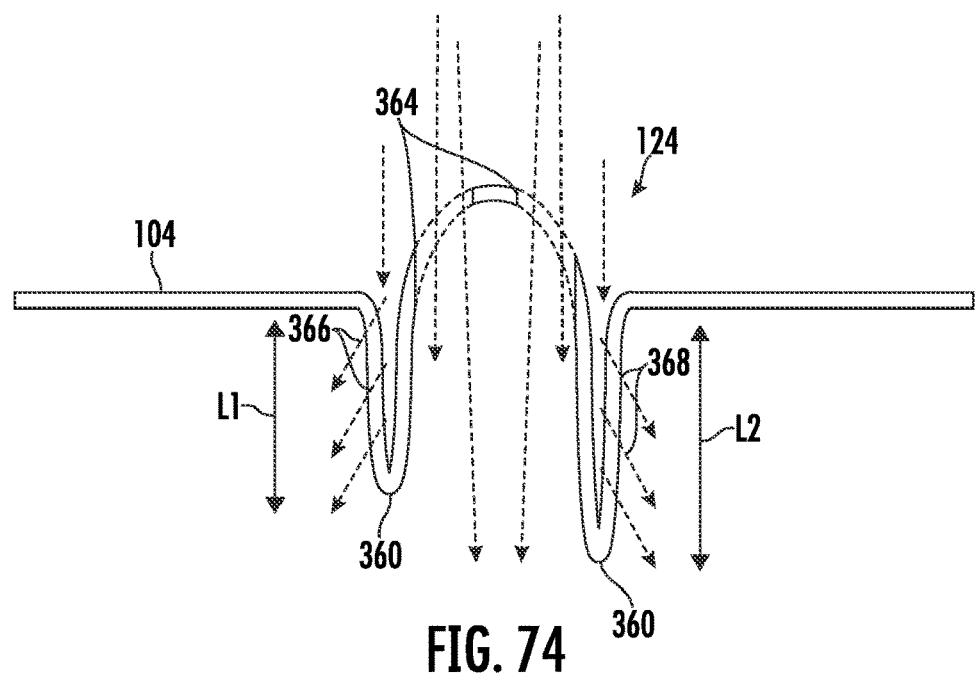
FIG. 74 is a cross-sectional view of the outer liner in accordance with another embodiment.

FIG. 74 illustrates an embodiment of the outer liner 104 including a looped feature 124 with a multi-fence arrangement. In particular, the illustrated looped feature 124 includes a multi-looped structure defining a first fence (e.g., at a first loop 360) and a second fence (e.g., at a second loop 362). The first loop 360 can be a forward loop and the second loop 362 can be an aft loop. The first and second loops 360 and 362 can be spaced apart from one another in the longitudinal direction, the radial direction, the circumferential direction, or any combination thereof. In an embodiment, the looped feature 124 can include one or more windows 364 disposed between the first and second loops 360 and 362. The one or more windows 364 can be arranged in one or more rows. The one or more windows 364 can be staggered or aligned with respect to one another. Dilution air can pass through the one or more windows 364 into the combustion chamber.

The first and second loops 360 and 362 can be configured to pass cooling air through first and second openings 366 and 368, respectively, into the combustion chamber. The first and second openings 366 and 368 can function similar to the longitudinal portions 350 and 354 of the internal passageway 340 described above with respect to FIG. 71.

In an embodiment, the first and second loops 360 and 362 can each define different lengths, L1 and L2, respectively. In an embodiment a ratio [L1:L2] of lengths of the first and second loops 360 and 362 can be in a range of approximately 1:1 and 1:5. For instance, the ratio [L1:L2] can be 1:1, or 1:1.5, or 1:2, or 1:2.5, or 1:3, or 1:3.5, or 1:4, or 1:4.5, or 1:5. The first loop 360 can act as a fence to increase penetration of dilution air into the combustion chamber. The second loop 362 can further increase penetration of dilution air into the combustion chamber. That is, the use of a staged fence structure, like that illustrated in FIG. 74, can cause dilution air to penetrate deeper into the combustion chamber which can help reduce temperature in the combustor core and reduce $NO_X$ emissions.

Figure 75:
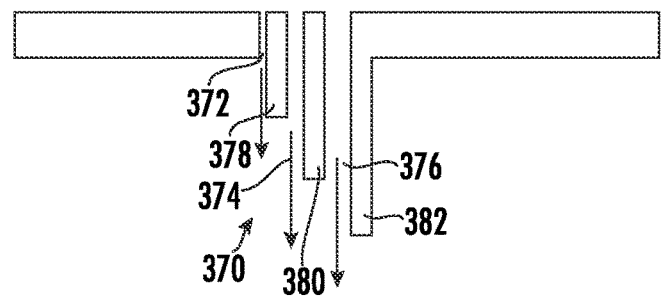
FIG. 75 is a cross-sectional view of the outer liner and a staged interface or introducing dilution air into the combustion chamber in accordance with another embodiment.

FIG. 75 illustrates an embodiment of a dilution slot including a staged (stepped) interface 370. The staged interface 370 defines a plurality of discrete dilution slot air flows 372, 374, and 376 separated from each other by a plurality of fences 378, 380, and 382. The fences 378, 380, and 382 can extend around the circumference of the dilution slot. The fences 378, 380, and 382 can have different relative lengths as compared to one another. In a particular embodiment, the fences 378, 380, and 382 can have increasing lengths as measured from the forward fence 378 to the aft fence 382. In operation, the forward fence 378 can generate a swirl of cooling medium, biasing the cooling medium into the combustion chamber. Air flows 374 and 376 can successively introduce dilution films of cooling medium through the dilution slot so as to increase penetration depth into the combustion chamber.

Distribution of cooling medium through the air flows 372, 374, and 376 creates axially staged dilution air flow which can improve penetration of cooling medium. Staging the air flow can permit better control over penetration of the cooling medium. Staging can allow for better control quenching of incoming products from a primary zone of the combustion chamber to improve $NO_X$ emissions. Additionally, differences between air flows 372, 374, and 376 creates shear between the air flows 372, 374, and 376 thereby creating high turbulence levels in the core of the combustor that further enhances mixing of cooling medium with products of combustion.

Figure 76:
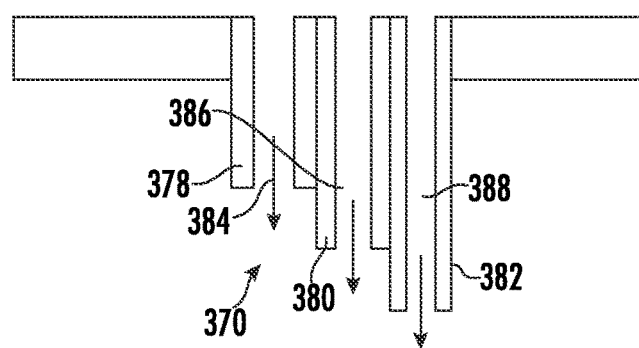
FIG. 76 is a cross-sectional view of the outer liner and a staged interface for introducing dilution air into the combustion chamber in accordance with another embodiment.

FIG. 76 illustrates another embodiment of the staged interface 370. Instead of air flows 372, 374, and 376 passing by the fences 378, 380, and 382 as depicted in the embodiment of FIG. 75, the fences 378, 380, and 382 of the embodiment depicted in FIG. 76 define internal passageways 384, 386, and 388, respectively. Similar to the air flows 372, 374, and 376, the internal passageways 384, 386, and 388 can improve penetration of cooling medium and provide better control quenching of incoming products to improve $NO_X$ emissions while also creating shear between airflow exiting the different internal passageways 384, 386, and 388.

Figure 77:
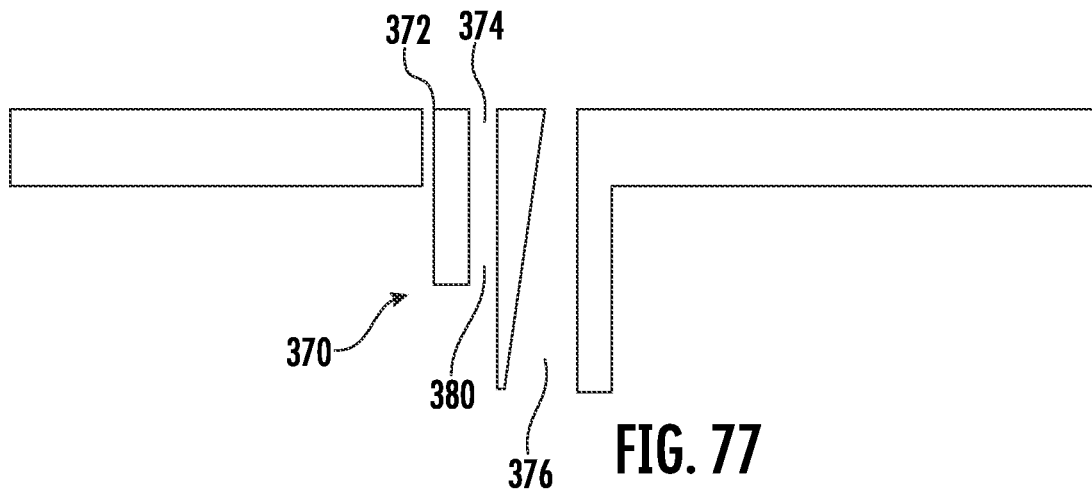
FIG. 77 is a cross-sectional view of the outer liner and a staged interface for introducing dilution air into the combustion chamber in accordance with another embodiment.

FIG. 77 illustrates an embodiment of the staged interface 370 where the middle fence 380 has a variable profile such that at least one of a shape, size, or speed of the air flow 376 entering the combustion chamber is different from at least one of the shape, size, or speed of at least one of the air flows 372 and 374. For instance, the air flow 376 may define a thicker layer of dilution air film. The air flow 376 may be travelling at a slower speed. In the illustrated embodiment, the middle fence 380 defines a triangular cross section. In other, non-illustrated embodiments, the middle fence 380 (or any one or more of the fences of the staged interface 370) can define another polygonal shape such as a pentagonal shape, a shape including linear segments, a shape including arcuate segments, a shape including arcuate and linear segments, or another shape which changes the air flow 376 (or any one or more other air flows of the staged interface 370).

Figure 78:
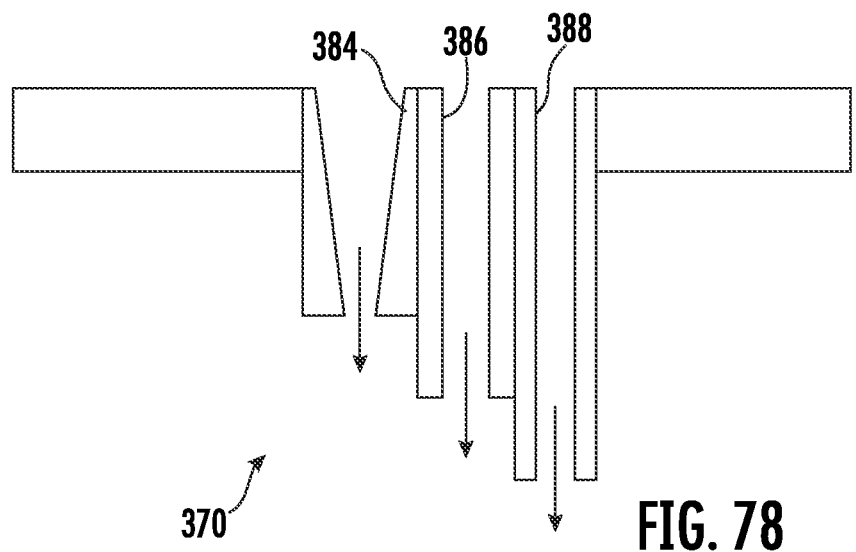
FIG. 78 is a cross-sectional view of the outer liner and a staged interface for introducing dilution air into the combustion chamber in accordance with another embodiment.

FIG. 78 illustrates an embodiment of the staged interface 370 where the internal passageways 384, 386, and 388 define converging flow paths. That is, for example, the side walls of at least one of the internal passageways 384, 386, or 388 can define a tapered profile. The resulting air flow can accelerate through the internal passageways 384, 386, or 388 into the combustion chamber. In the depicted embodiment, the relative amount of convergence of the internal passageways 384, 386, and 388 is different. That is, the taper angles of the internal passageways 384, 386, and 388 are all different. In another embodiment, the relative amount of convergence of at least two of the internal passageways 384, 386, and 388 can be the same, or substantially the same.

Figure 79:
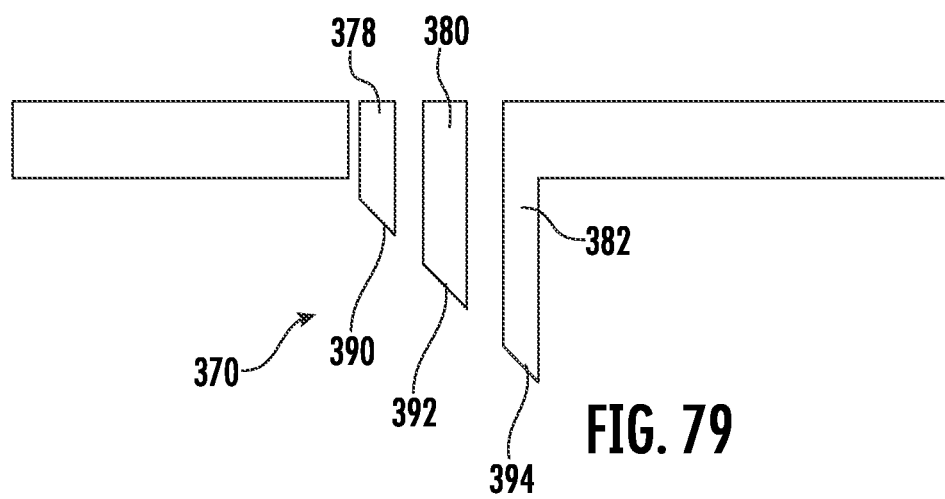
FIG. 79 is a cross-sectional view of the outer liner and a staged interface for introducing dilution air into the combustion chamber in accordance with another embodiment.

FIG. 79 illustrates an embodiment of the staged interface 370 where trailing edges 390, 392, and 394 of each of the fences 378, 380, and 382 are canted relative to the longitudinal centerline 12 of the engine 10 (FIG. 1). The canted trailing edges 390, 392, and 394 can avoid the creation of a relatively lower velocity region within the combustion chamber at the innermost edge of the fences 378, 380, and 382.

Figure 80:
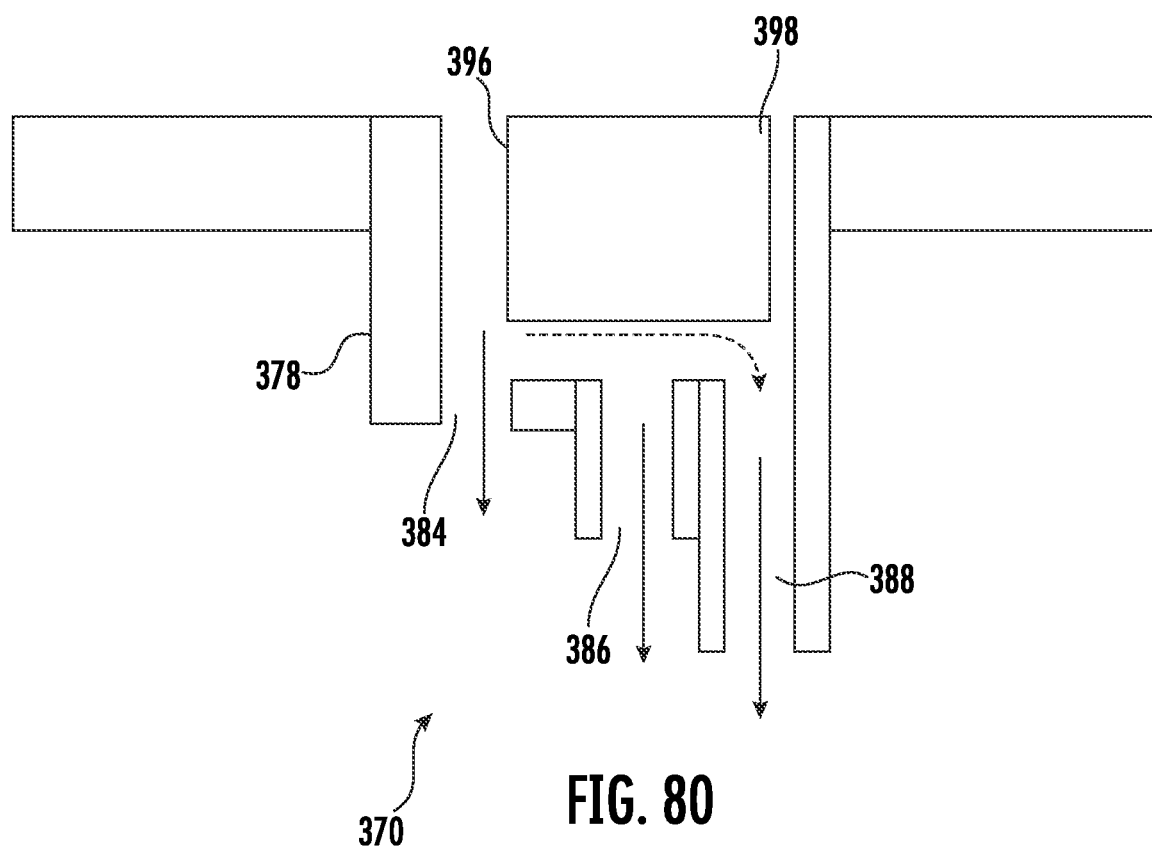
FIG. 80 is a cross-sectional view of the outer liner and a staged interface for introducing dilution air into the combustion chamber in accordance with another embodiment.

In certain instances, at least two of the internal passageways 384, 386, and 388 can be connected together. For example, referring to FIG. 80, the staged interface 370 can define two windows 396 and 398 which are both in fluid communication with all of the internal passageways 384, 386, and 388. The forward window 396 may be larger than the rear window 398 or otherwise shaped to receive a greater percentage of airflow through the staged interface 370. In this regard, greater cooling medium may pass by the hottest part of the staged interface 370—the front fence 378. After passing by at least a portion of the front fence 378, airflow through at least the forward window 396 can be distributed to at least two of the internal passageways 384, 386, and 388. In the illustrated embodiment, airflow through the forward window 396 can pass through all of the internal passageways 384, 386, and 388. However, it should be understood that other configurations are contemplated herein.

Combustors in accordance with one or more embodiments described herein may reduce the generation of $NO_X$, decrease core temperature, increase performance and efficiency, and otherwise improve the combustion process in gas turbine engines. In particular, use of one or more of a looped feature, scooped interface, intermediate member, fence, or any other feature described herein may result in a more efficient engine operation, which in turn can reduce operating costs and decrease environmental impact.

Further aspects of the disclosure are provided by the subject matter of the following clauses:

Clause 1. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a forward liner segment; an aft liner segment disposed downstream from the forward liner segment relative to a direction of flow through the combustor, the forward and aft liner segments at least partially defining a combustion chamber; and a fence disposed between the forward and aft liner segments, wherein the fence extends in the circumferential direction, and wherein the fence extends into the combustion chamber along the radial direction.

Clause 2. The combustor of any one or more of the clauses, wherein the forward and aft liner segments are part of a unitary liner, wherein the forward liner segment is disposed upstream of a dilution opening of the combustion chamber, and wherein the aft liner segment is disposed downstream of the dilution opening.

Clause 3. The combustor of any one or more of the clauses, wherein the fence is part of an intermediate member, and wherein the intermediate member comprises a damper configured to reduce frequencies of vibration in the combustion chamber.

Clause 4. The combustor of any one or more of the clauses, wherein the fence comprises a multi-fence arrangement comprising a first fence and a second fence, and wherein the first and second fences converge.

Clause 5. The combustor of any one or more of the clauses, wherein the fence comprises a multi-piece construction including a plurality of segments configured to at least partially overlap one another in the circumferential direction.

Clause 6. The combustor of any one or more of the clauses, wherein the fence comprises one or more cooling openings configured to pass cooling medium through the fence.

Clause 7. The combustor of any one or more of the clauses, wherein at least a portion of the fence is configured to move relative to at least one of the forward liner segment or the aft liner segment.

Clause 8. The combustor of any one or more of the clauses, wherein the combustor comprises a multi-stage cooling arrangement configured to cool the combustion chamber, the multi-stage cooling arrangement comprising: a first cooling stage configured to pass cooling medium into the combustion chamber upstream of the fence, and a second cooling stage configured to pass cooling medium into the combustion chamber through the fence.

Clause 9. The combustor of any one or more of the clauses, wherein cooling medium passing through both the first and second cooling stages is utilized in a combustion process in the combustion chamber.

Clause 10. A fence for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor having a forward liner segment and an aft liner segment, the forward and aft liner segments at least partially defining a combustion chamber, the fence comprising: an annular body configured to extend into the combustion chamber in the radial direction; and a cooling arrangement configured to cool the combustion chamber.

Clause 11. The fence of any one or more of the clauses, wherein the cooling arrangement comprises a multi-stage cooling arrangement comprising: a first cooling stage configured to pass cooling medium into the combustion chamber upstream of the fence, and a second cooling stage configured to pass cooling medium into the combustion chamber through the fence.

Clause 12. The fence of any one or more of the clauses, wherein the cooling medium comprises air passing through the gas turbine engine outside of the combustion chamber.

Clause 13. The fence of any one or more of the clauses, wherein the combustion chamber comprises an opening disposed between the forward and aft liner segments and extending in a circumferential direction, wherein the fence extends through the opening in the radial direction, and wherein the first cooling stage comprises a portion of the opening disposed upstream of the fence.

Clause 14. The fence of any one or more of the clauses, wherein the multi-stage cooling arrangement further comprises a third cooling stage configured to pass cooling medium into the combustion chamber downstream of the fence.

Clause 15. The fence of any one or more of the clauses, wherein the cooling arrangement comprises one or more internal passageways extending through the annular body of the fence in the radial direction, and wherein the one or more internal passageways comprises a plurality of secondary internal passageways configured to redirect a flow of cooling medium towards at least a back surface of the fence.

Clause 16. The fence of any one or more of the clauses, wherein the one or more internal passageways are in fluid communication with the combustion chamber, and wherein the one or more internal passageways are configured to pass cooling medium into the combustion chamber.

Clause 17. The fence of any one or more of the clauses, wherein the fence comprises a recess extending into the annular body at a location adjacent to an entrance of the one or more internal passageways.

Clause 18. A fence for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor having a forward liner segment and an aft liner segment, the forward and aft liner segments at least partially defining a combustion chamber, the fence comprising: an annular body configured to be disposed between the forward and aft liner segments and extend into the combustion chamber in the radial direction; and one or more thermal expansion features configured to accommodate thermally-induced stress.

Clause 19. The fence of any one or more of the clauses, wherein the annular body comprises a multi-piece construction including a plurality of segments configured to at least partially overlap one another in the circumferential direction.

Clause 20. The fence of any one or more of the clauses, wherein the one or more thermal expansion features comprise a looped feature of at least one of the forward or aft liner segments.

Clause 21. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a forward liner segment; an aft liner segment disposed downstream from the forward liner segment relative to a direction of flow through the combustor, the forward and aft liner segments at least partially defining a combustion chamber; and an intermediate member disposed at least partially between the forward and aft liner segments and extending in the circumferential direction.

Clause 22. The combustor of any one or more of the clauses, wherein the forward and aft liner segments are coupled together through the intermediate member.

Clause 23. The combustor of any one or more of the clauses, wherein the intermediate member is additively manufactured.

Clause 24. The combustor of any one or more of the clauses, wherein a coupling between the aft liner segment and the forward liner segment or the intermediate member is a brazed connection, a bolted connection, a welded connection, an interference fit, a swaged connection, or any combination thereof.

Clause 25. The combustor of any one or more of the clauses, wherein the intermediate member is free floating relative to the forward and aft liner segments.

Clause 26. The combustor of any one or more of the clauses, wherein the intermediate member comprises a fence extending into the combustion chamber in the radial direction.

Clause 27. The combustor of any one or more of the clauses, wherein the intermediate member is integral to at least one of the forward and aft liner segments.

Clause 28. The combustor of any one or more of the clauses, wherein the forward liner segment comprises a first material, wherein the aft liner segment comprises a second material, wherein the intermediate member comprises a third material, and wherein the third material is different than at least one of the first and second materials.

Clause 29. The combustor of any one or more of the clauses, wherein the intermediate member comprises one or more spacers disposed between the intermediate member and at least one of the forward or aft liner segments, and wherein the spacer is a piston seal, a spring seal, or another seal, configured to control airflow through the intermediate member.

Clause 30. The combustor of any one or more of the clauses, wherein the intermediate member is biased toward the forward and aft liner segments by a support extending from a case of the gas turbine engine to the intermediate member.

Clause 31. The combustor of any one or more of the clauses, wherein the intermediate member comprises one or more windows configured to pass cooling medium into the combustion chamber of the gas turbine engine, the one or more windows being in fluid communication with a dilution slot extending between the forward and aft liner segments.

Clause 32. The combustor of any one or more of the clauses, wherein the intermediate member comprises an annular support ring and a plurality of spokes each extending from the annular support ring, wherein at least one of the plurality of spokes is configured to contact at least one of the forward or aft liner segments.

Clause 33. The combustor of any one or more of the clauses, wherein at least one of the spokes further comprises a feature configured to tune the spoke.

Clause 34. The combustor of any one or more of the clauses, wherein the intermediate member forms a moveable interface relative to at least one of the forward and aft liner segments.

Clause 35. An intermediate member for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor having a forward liner segment and an aft liner segment, the forward and aft liner segments at least partially defining a combustion chamber, the intermediate member comprising: an annular body configured to be disposed at least partially within a gap formed between the forward and aft liner segments.

Clause 36. The intermediate member of any one or more of the clauses, wherein the annular body comprises one or more windows configured to pass dilution air through a dilution slot formed between the forward and aft liner segments and into the combustion chamber.

Clause 37. The intermediate member of any one or more of the clauses, wherein the annular body further comprises a fence configured to extend into the combustion chamber in the radial direction.

Clause 38. The intermediate member of any one or more of the clauses, wherein the annular body is configured to move in the longitudinal direction relative to at least one of the forward and aft liner segments.

Clause 39. The intermediate member of any one or more of the clauses, wherein the annular body comprises a plurality of segments arranged in a circumferential arrangement, and wherein the plurality of segments overlap one another in the circumferential direction.

Clause 40. The intermediate member of any one or more of the clauses, wherein the annular body comprises one or more internal passageways configured to transmit dilution air through the annular body to the combustion chamber.

Clause 41. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a forward liner segment; and an aft liner segment disposed downstream from the forward liner segment relative to a direction of flow through the combustor, the forward and aft liner segments at least partially defining a combustion chamber, wherein the forward and aft liner segments are coupled together at a moveable interface.

Clause 42. The combustor of any one or more of the clauses, wherein a portion of one of the forward or aft liner segments is configured to contact the other one of the forward or aft liner segments and move relative thereto.

Clause 43. The combustor of any one or more of the clauses, wherein the portion of one of the forward or aft liner segments is configured to form a press fit with the other one of the forward or aft liner segments.

Clause 44. The combustor of any one or more of the clauses, wherein the moveable interface formed between the portion of one of the forward or aft liner segments and the other one of the forward or aft liner segments comprises a wear coating, a low friction coating, a spacer, or any combination thereof.

Clause 45. The combustor of any one or more of the clauses, wherein the moveable interface comprises an intermediate member disposed between the forward and aft liner segments, the intermediate member being configured to be moveably coupled with at least one of the forward and aft liner segments.

Clause 46. The combustor of any one or more of the clauses, wherein at least one of the forward liner segment, the aft liner segment, and the intermediate member comprises one or more piston seals configured to form a sealed interface at the moveable interface.

Clause 47. The combustor of any one or more of the clauses, wherein the moveable interface comprises a size controlling feature configured to control a size of a gap between the forward and aft liner segments.

Clause 48. The combustor of any one or more of the clauses, wherein the size control feature comprises a feature integral to at least one of the forward or aft liner segments.

Clause 49. The combustor of any one or more of the clauses, wherein the size control feature comprises: a projection extending from at least one of the forward or aft liner segments; and an interface disposed on the other of the at least one of the forward or aft liner segments, the interface being configured to receive the projection.

Clause 50. The combustor of any one or more of the clauses, wherein the combustor defines one or more dilution slots disposed between the forward and aft liner segments, the one or more dilution slots being configured to fluidly couple the combustion chamber with cooling medium, wherein an intermediate member is disposed in at least one of the one or more dilution slots, and wherein the intermediate member comprises one or more windows configured to communicate cooling medium to the combustion chamber.

Clause 51. The combustor of any one or more of the clauses, wherein the intermediate member or the liner comprises a fence extending into the combustion chamber in the radial direction.

Clause 52. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a forward liner segment; an aft liner segment disposed downstream from the forward liner segment relative to a direction of flow through the combustor, the forward and aft liner segments at least partially defining a combustion chamber; and an intermediate member disposed longitudinally between the forward and aft liners, the intermediate member configured to form a moveable interface with at least one of the forward liner segment and the aft liner segment.

Clause 53. The combustor of any one or more of the clauses, wherein the moveable interface comprises one or more piston seals configured to form a sealed interface at the moveable interface.

Clause 54. The combustor of any one or more of the clauses, wherein the intermediate member comprises a fence extending into the combustion chamber in the radial direction.

Clause 55. The combustor of any one or more of the clauses, wherein the intermediate member further comprises a secondary fence extending into the combustion chamber upstream of the fence, wherein the secondary fence is spaced apart from the fence in the longitudinal direction, wherein the secondary fence is spaced apart from the forward liner in the longitudinal direction by a first deflection distance corresponding with deflection of the forward liner during operation.

Clause 56. The combustor of any one or more of the clauses, wherein the intermediate member comprises a channel extending in the radial direction between the fence and the secondary fence, wherein the channel is in fluid communication with a dilution slot of the liner.

Clause 57. The combustor of any one or more of the clauses, wherein the forward and aft liner segments define one or more dilution slots, wherein the intermediate member is disposed in at least one of the one or more dilution slots, and wherein the intermediate member comprises one or more fluid passageways configured to communicate cooling medium to the at least one of the one or more dilution slots.

Clause 58. The combustor of any one or more of the clauses, wherein the intermediate member is biased in the radial direction by a support extending from a case of the gas turbine engine.

Clause 59. The combustor of any one or more of the clauses, wherein the intermediate member is free floating relative to at least one of the forward or aft liner segments.

Clause 60. The combustor of any one or more of the clauses, wherein at least one of the forward or aft liner segments is configured to deflect in at least one of the longitudinal direction and the radial direction upon thermal loading during operational use, and wherein the intermediate member is configured to mitigate deflection of the forward or aft liner segment.

Clause 61. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a liner at least partially defining a combustion chamber, the liner further defining a gap; an intermediate member disposed at least partially within the gap of the liner and in fluid communication with the combustion chamber, and a support extending from the intermediate member, the support configured to extend to a case of the gas turbine engine to retain the intermediate member in position with respect to the case.

Clause 62. The combustor of any one or more of the clauses, wherein the support is integral with the intermediate member.

Clause 63. The combustor of any one or more of the clauses, wherein the support comprises a discrete component from the intermediate member.

Clause 64. The combustor of any one or more of the clauses, wherein the support comprises sheet metal.

Clause 65. The combustor of any one or more of the clauses, wherein the support is coupled to the case at a location along an aft side of the casing or a middle of the casing.

Clause 66. The combustor of any one or more of the clauses, wherein the support defines one or more windows configured to allow passage of cooling medium through the support to a location downstream of the support.

Clause 67. The combustor of any one or more of the clauses, wherein the intermediate member is free floating relative to the liner.

Clause 68. The combustor of any one or more of the clauses, wherein the intermediate member comprises a fence configured to extend into the combustion chamber in the radial direction, the fence being configured to direct cooling medium into the combustion chamber.

Clause 69. The combustor of any one or more of the clauses, wherein the intermediate member further comprises a secondary fence extending into the combustion chamber upstream of the fence, and wherein the secondary fence is spaced apart from the fence in the longitudinal direction.

Clause 70. The combustor of any one or more of the clauses, wherein the liner comprises a forward liner segment and an aft liner segment, wherein the intermediate member is disposed between the forward and aft liner segments, and wherein the intermediate member is configured to have a slidable interface with at least one of the forward and aft liner segments.

Clause 71. The combustor of any one or more of the clauses, wherein at least one of the forward or aft liner segments comprises a projection extending across the gap and configured to control a size of the gap.

Clause 72. The combustor of any one or more of the clauses, wherein the liner comprises a forward liner segment and an aft liner segment spaced apart from one another by the gap, and wherein the intermediate member is coupled to one of the forward or aft liner segments through one or more piston seals.

Clause 73. The combustor of any one or more of the clauses, wherein the support comprises a spring loaded connection configured to bias the intermediate member.

Clause 74. The combustor of any one or more of the clauses, wherein at least one of the one or more piston seals comprises at least one purging hole configured to permit purging of excess cooling medium before entering the combustion chamber.

Clause 75. The combustor of any one or more of the clauses, wherein the intermediate member comprises at least one seal configured to form a sealing interface relative to the liner.

Clause 76. An intermediate member used in a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor having a liner defining a combustion chamber, the intermediate member comprising: an annular body configured to be disposed at an opening in the liner; and a support configured to extend between the intermediate member and a case of the gas turbine engine.

Clause 77. The intermediate member of any one or more of the clauses, wherein the annular body is free floating relative to the liner.

Clause 78. The intermediate member of any one or more of the clauses, wherein the annular body is coupled to the case through the support, and wherein the support is configured to bias the annular body into the liner in a radial direction.

Clause 79. The intermediate member of any one or more of the clauses, wherein the annular body comprises a plurality of spokes extending from the liner to a case of the gas turbine engine, and wherein the support comprises an annular support ring coupled to the plurality of spokes.

Clause 80. The intermediate member of any one or more of the clauses, wherein the annular body is spaced apart from the liner by one or more spacers, and wherein the spacers are configured to provide a moveable interface between the annular body and the liner.

Clause 81. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a liner at least partially defining a combustion chamber, the liner including a dilution slot in fluid communication with the combustion chamber; and one or more guides configured to redirect cooling medium into the dilution slot.

Clause 82. The combustor of any one or more of the clauses, wherein the liner comprises a forward liner segment and an aft liner segment, and wherein the dilution slot is disposed between the forward and aft liner segments.

Clause 83. The combustor of any one or more of the clauses, wherein at least one of the one or more guides is integral with at least one of the forward and aft liner segments.

Clause 84. The combustor of any one or more of the clauses, wherein the one or more guides comprise an inclined leading edge surface that is angularly offset from the radial direction by an angle, $\alpha_S$, that is at least 1°.

Clause 85. The combustor of any one or more of the clauses, wherein the one or more guides extend outward from the liner in the radial direction.

Clause 86. The combustor of any one or more of the clauses, wherein at least one of the one or more guides comprises a scooped interface.

Clause 87. The combustor of any one or more of the clauses, wherein the one or more guides comprise a leading edge surface defining one or more rows of windows extending around the combustor.

Clause 88. The combustor of any one or more of the clauses, further comprising a fence extending in the radial direction into the combustion chamber through the dilution slot.

Clause 89. The combustor of any one or more of the clauses, wherein at least one of the one or more guides is at least partially disposed upstream of the fence.

Clause 90. The combustor of any one or more of the clauses, wherein the dilution slot comprises a plurality of dilution slots extending around the combustion chamber in the circumferential direction.

Clause 91. A liner for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the liner comprising: an annular body configured to at least partially define a combustion chamber of the combustor, wherein the annular body comprises a dilution slot extending to the combustion chamber; and one or more guides configured to redirect cooling medium into the dilution slot.

Clause 92. The liner of any one or more of the clauses, wherein the one or more guides are integral with the annular body.

Clause 93. The liner of any one or more of the clauses, wherein the one or more guides include one or more rows of cooling holes.

Clause 94. The liner of any one or more of the clauses, wherein the forward liner segment and aft liner segment are coupled together through a wavy annular body disposed between the forward and aft liner segments in the radial direction.

Clause 95. The liner of any one or more of the clauses, wherein at least one of the one or more guides is integral with at least one of the forward and aft liner segments.

Clause 96. The liner of any one or more of the clauses, wherein at least one of the one or more guides comprises a scooped interface.

Clause 97. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a liner at least partially defining a combustion chamber, the liner including a dilution slot in fluid communication with the combustion chamber; and a scooped interface configured to redirect cooling medium into the dilution slot, the scooped interface defining a scooped surface configured to form a film of airflow into the combustor.

Clause 98. The combustor of any one or more of the clauses, wherein the scooped interface extends from the liner in a radially outward direction, and wherein the scooped interface is configured to redirect cooling medium to a fence of the combustor, the fence extending into the combustion chamber.

Clause 99. The combustor of any one or more of the clauses, wherein the scooped interface comprises one or more windows configured to pass cooling medium to the scooped surface, and wherein the one or more windows are arranged in one or more rows extending in the circumferential direction.

Clause 100. The combustor of any one or more of the clauses, wherein the scooped interface is coupled with an aft liner segment of the liner, and wherein the scooped interface is configured to move relative to a forward liner segment of the liner.

Clause 101. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising: a liner at least partially defining a combustion chamber of the gas turbine engine, wherein the liner comprises a looped feature.

Clause 102. The combustor of any one or more of the clauses, wherein the liner comprises a forward liner segment and an aft liner segment spaced apart from one another by one or more dilution slots, and wherein the looped feature of the liner is disposed at a longitudinal location of the liner corresponding with the one or more dilution slots.

Clause 103. The combustor of any one or more of the clauses, wherein the forward and aft liner segments are coupled together through brazing, welding, one or more fasteners, press fit, or the like.

Clause 104. The combustor of any one or more of the clauses, wherein the looped feature includes a plurality of segments interconnected by bent portions.

Clause 105. The combustor of any one or more of the clauses, wherein the looped feature extends from the liner in at least one of the radial direction or longitudinal direction.

Clause 106. The combustor of any one or more of the clauses, wherein the looped feature is configured to absorb deflection of the liner during thermal expansion.

Clause 107. The combustor of any one or more of the clauses, wherein the looped feature defines one or more fluid passageways configured to pass cooling medium to the combustion chamber.

Clause 108. The combustor of any one or more of the clauses, wherein the looped feature further comprises a fence extending into the combustion chamber in the radial direction.

Clause 109. The combustor of any one or more of the clauses, wherein the looped feature comprises a scooped interface.

Clause 110. The combustor of any one or more of the clauses, wherein the looped feature is configured to absorb thermal loading during operational use, and wherein a shape or size of the looped feature is configured to change during thermal loading.

Clause 111. A liner for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the liner comprising: an annular body configured to at least partially define a combustion chamber of the combustor, wherein the annular body comprises: a dilution slot extending to the combustion chamber; and a looped feature configured to absorb deflection during thermal expansion of the liner.

Clause 112. The liner of any one or more of the clauses, wherein the liner comprises a forward liner segment and an aft liner segment, wherein the looped feature is integral with one or both of the forward liner segment or aft liner segment.

Clause 113. The liner of any one or more of the clauses, wherein the looped feature is integral with one of the forward or aft liner segments, and wherein the other of the forward or aft liner segments is coupled to the looped feature through a brazed interface.

Clause 114. The liner of any one or more of the clauses, wherein the looped feature further comprises a flange, and wherein the other of the forward or aft liner segments is coupled to the flange.

Clause 115. The liner of any one or more of the clauses, wherein the liner comprises a single-piece construction.

Clause 116. The liner of any one or more of the clauses, wherein the looped feature comprises a fence configured to extend into the combustion chamber in the radial direction.

Clause 117. The liner of any one or more of the clauses, wherein the looped feature extends away from one or more adjacent portions of the liner in the radial direction.

Clause 118. The liner of any one or more of the clauses, wherein the looped feature further comprises one or more windows configured to pass cooling medium to the combustor.

Clause 119. The liner of any one or more of the clauses, wherein the annular body of the liner further comprises a first group of cooling holes disposed upstream of the looped feature and a second group of cooling holes disposed downstream of the looped feature.

Clause 120. The liner of any one or more of the clauses, wherein cooling holes of at least one of the first or second groups of cooling holes are canted relative to the liner.

We claim:

1. A combustor for a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor comprising:
    a forward liner segment;
    an aft liner segment disposed downstream from the forward liner segment relative to a direction of flow through the combustor, the forward liner segment and the aft liner segment at least partially defining a combustion chamber; and
    an intermediate member disposed at least partially between the forward liner segment and the aft liner segment and extending in the circumferential direction, the intermediate member comprising:
        a feature configured to interface with a radially outer surface, with respect to the longitudinal centerline, of the forward liner segment or the aft liner segment; and
        a fence extending into the combustion chamber in the radial direction, with respect to the longitudinal centerline, and continuously in the circumferential direction.

2. The combustor of claim 1, wherein the forward liner segment and the aft liner segment are coupled together through the intermediate member.

3. The combustor of claim 1, wherein the intermediate member is additively manufactured.

4. The combustor of claim 3, wherein a coupling between the aft liner segment or the forward liner segment and the intermediate member is a brazed connection, a bolted connection, a welded connection, an interference fit, a swaged connection, or any combination thereof.

5. The combustor of claim 1, wherein the intermediate member is free floating relative to the forward liner segment and the aft liner segment.

6. The combustor of claim 1, wherein the feature comprises a first sealing interface with the forward liner segment and a second sealing interface with the aft liner segment.

7. The combustor of claim 1, wherein the intermediate member is integral to at least one of the forward liner segment or the aft liner segment.

8. The combustor of claim 1, wherein the forward liner segment comprises a first material, wherein the aft liner segment comprises a second material, wherein the intermediate member comprises a third material, and wherein the third material is different than at least one of the first material or the second material.

9. The combustor of claim 1, wherein the intermediate member comprises one or more spacers disposed between the intermediate member and at least one of the forward liner segment or the aft liner segment, and wherein the spacer is a piston seal, a spring seal, or another seal, configured to control airflow through the intermediate member.

10. The combustor of claim 1, wherein the intermediate member is biased toward the forward liner segment and the aft liner segment by a support extending from a case of the gas turbine engine to the intermediate member.

11. The combustor of claim 1, wherein the intermediate member comprises one or more windows configured to pass cooling medium into the combustion chamber of the gas turbine engine, the one or more windows being in fluid communication with a dilution slot extending between the forward liner segment and the aft liner segment.

12. The combustor of claim 1, wherein the intermediate member forms a moveable interface relative to at least one of the forward liner segment or the aft liner segment.

13. An intermediate member for a combustor of a gas turbine engine, the gas turbine engine defining a longitudinal centerline extending in a longitudinal direction, a radial direction extending orthogonally outward from the longitudinal centerline, and a circumferential direction extending concentrically around the longitudinal centerline, the combustor having a forward liner segment and an aft liner segment, the forward liner segment and the aft liner segment at least partially defining a combustion chamber, the intermediate member comprising:
    an annular body configured to be disposed at least partially within a gap formed between the forward liner segment and the aft liner segment;

a feature configured to interface with a radially outer surface, with respect to the longitudinal centerline, of the forward liner segment or the aft liner segment; and a fence extending into the combustion chamber in the radial direction, with respect to the longitudinal centerline, and continuously in the circumferential direction.

14. The intermediate member of claim 13, wherein the annular body comprises one or more windows configured to pass dilution air through a dilution slot formed between the forward liner segment and the aft liner segment and into the combustion chamber.

15. The intermediate member of claim 13, wherein the feature comprises a first sealing interface with the forward liner segment and a second sealing interface with the aft liner segment.

16. The intermediate member of claim 13, wherein the annular body is configured to move in the longitudinal direction relative to at least one of the forward liner segment or the aft liner segment.

17. The intermediate member of claim 13, wherein the annular body comprises one or more internal passageways configured to transmit dilution air through the annular body to the combustion chamber.

* * * * *